(12) United States Patent
Bao et al.

(10) Patent No.: US 12,399,604 B2
(45) Date of Patent: Aug. 26, 2025

(54) ELECTRONIC DEVICE CONTROL METHOD AND ELECTRONIC DEVICE

(71) Applicant: Honor Device Co., Ltd., Shenzhen (CN)

(72) Inventors: Xintong Bao, Shenzhen (CN); Long Wang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/280,297

(22) PCT Filed: Dec. 13, 2022

(86) PCT No.: PCT/CN2022/138789
§ 371 (c)(1),
(2) Date: Sep. 5, 2023

(87) PCT Pub. No.: WO2023/130920
PCT Pub. Date: Jul. 13, 2023

(65) Prior Publication Data
US 2024/0160339 A1 May 16, 2024

(30) Foreign Application Priority Data
Jan. 10, 2022 (CN) .......................... 202210023693.0

(51) Int. Cl.
*G06F 3/048* (2013.01)
*G06F 3/0484* (2022.01)
(Continued)

(52) U.S. Cl.
CPC .......... *G06F 3/0484* (2013.01); *G06F 3/0488* (2013.01); *H04N 1/00424* (2013.01); *H04N 1/00482* (2013.01)

(58) Field of Classification Search
CPC ....................................................... G06F 3/048
See application file for complete search history.

(56) References Cited

U.S. PATENT DOCUMENTS 6,621,590 B1 * 9/2003 Livingston ............ G06F 3/1256
358/452
7,757,180 B2 * 7/2010 Nakai ................... G06F 3/0486
715/835
(Continued)

FOREIGN PATENT DOCUMENTS

CN 101150638 A * 3/2008 ......... H04N 1/00222
CN 101571793 A 11/2009
(Continued)

OTHER PUBLICATIONS

Park et al., Design and Implementation of Digital Photo Kiosk System with Auto Color-Correction Module, 2005, IEEE, 7 pages. (Year: 2005).*
(Continued)

*Primary Examiner* — Linh K Pham
(74) *Attorney, Agent, or Firm* — Leydig, Voit & Mayer, Ltd.

(57) ABSTRACT

This application provides an electronic device control method and an electronic device. The method includes: displaying a first interface, the first interface including: a first thumbnail and a first quantity of controls, the first thumbnail corresponding to a first file, the first thumbnail having a first size, and the first quantity of controls including a first control; sending a printing instruction to a printing device in response to a first operation on the first control; and displaying a second interface in response to a second operation acting on the first interface, the second interface including: a second thumbnail and a second quantity of controls, the second quantity of controls including the first control, the second thumbnail corresponding to the first file, the second thumbnail having a second size, the second size being smaller than the first size, the second quantity being greater than the first quantity.

17 Claims, 73 Drawing Sheets

(51) Int. Cl.
*G06F 3/0488* (2022.01)
*H04N 1/00* (2006.01)

(56) References Cited

U.S. PATENT DOCUMENTS

| | | | | |
|---|---|---|---|---|
| 7,952,736 | B2* | 5/2011 | Kasatani | H04N 1/32053 |
| | | | | 358/1.14 |
| 9,338,323 | B2* | 5/2016 | Tsujimoto | G06F 21/608 |
| 9,734,538 | B2* | 8/2017 | Hong | G06Q 10/10 |
| 10,200,548 | B2* | 2/2019 | Kimura | G06F 3/1204 |
| 12,200,345 | B2* | 1/2025 | Chen | G06N 3/084 |
| 2003/0030846 | A1* | 2/2003 | Mori | H04N 1/00408 |
| | | | | 358/400 |
| 2003/0065531 | A1* | 4/2003 | Satomi | G06Q 30/06 |
| | | | | 705/26.35 |
| 2004/0052543 | A1* | 3/2004 | Kato | G03G 15/5075 |
| | | | | 399/83 |
| 2004/0126122 | A1* | 7/2004 | Kanamoto | H04N 1/2175 |
| | | | | 399/20 |
| 2004/0184069 | A1* | 9/2004 | Mifune | G06K 15/00 |
| | | | | 358/1.15 |
| 2006/0129539 | A1* | 6/2006 | Nakatomi | G06F 16/16 |
| 2006/0288304 | A1* | 12/2006 | Nomoto | G06F 16/168 |
| | | | | 715/781 |
| 2010/0097628 | A1* | 4/2010 | Masuda | G06F 21/608 |
| | | | | 358/1.14 |
| 2011/0279363 | A1* | 11/2011 | Shoji | H04N 1/00482 |
| | | | | 345/156 |
| 2011/0292075 | A1* | 12/2011 | Sukenori | G06T 11/60 |
| | | | | 345/629 |
| 2012/0050779 | A1* | 3/2012 | Tani | H04N 1/00477 |
| | | | | 358/1.13 |
| 2012/0069376 | A1* | 3/2012 | Tsujimoto | H04N 1/00464 |
| | | | | 358/1.13 |
| 2014/0089840 | A1* | 3/2014 | Nakagawa | G06F 3/04847 |
| | | | | 715/810 |
| 2015/0009534 | A1* | 1/2015 | Morita | H04N 1/00458 |
| | | | | 358/1.15 |
| 2015/0146243 | A1* | 5/2015 | Tsujimoto | H04N 1/4433 |
| | | | | 358/1.15 |
| 2015/0350467 | A1* | 12/2015 | Kodimer | H04N 1/00307 |
| | | | | 358/1.13 |
| 2017/0374210 | A1* | 12/2017 | Channa | G06F 21/608 |
| 2018/0024696 | A1* | 1/2018 | Lee | H04N 5/74 |
| | | | | 345/175 |
| 2018/0183952 | A1* | 6/2018 | Imaoka | H04N 1/00411 |
| 2019/0356773 | A1* | 11/2019 | Tam | H04M 1/72463 |
| 2020/0026396 | A1* | 1/2020 | Murakami | G06F 3/1288 |
| 2020/0336622 | A1* | 10/2020 | Kunimi | H04N 1/6027 |
| 2020/0341623 | A1* | 10/2020 | Yin | G06F 3/0486 |
| 2021/0409553 | A1* | 12/2021 | Nagai | G06F 3/0488 |
| 2022/0023761 | A1* | 1/2022 | Li | A63F 13/5255 |
| 2022/0365661 | A1* | 11/2022 | Dong | G06F 3/0488 |
| 2022/0374118 | A1 | 11/2022 | Liang et al. | |
| 2022/0413671 | A1* | 12/2022 | Liu | G06F 3/0488 |

FOREIGN PATENT DOCUMENTS

| | | | | |
|---|---|---|---|---|
| CN | 101998009 A | * | 3/2011 | H04N 1/00222 |
| CN | 111338519 A | | 6/2020 | |
| CN | 111708499 A | | 9/2020 | |
| CN | 112162814 A | | 1/2021 | |
| CN | 113194454 A | | 7/2021 | |
| CN | 114115756 A | | 3/2022 | |

OTHER PUBLICATIONS

Julio Nobrega, A Method and System for Displaying a Playable Thumbnail Preview, 2018, IP.com, 2 pages. (Year: 2018).*

* cited by examiner

ELECTRONIC DEVICE CONTROL METHOD AND ELECTRONIC DEVICE

CROSS-REFERENCE TO RELATED APPLICATIONS

This application is a national stage of International Application No. PCT/CN2022/138789, filed on Dec. 13, 2022, which claims priority to Chinese Patent Application No. 202210023693.0, filed on Jan. 10, 2022, both of which are hereby incorporated by reference in their entireties.

TECHNICAL FIELD

This application relates to the field of terminal technologies, and in particular, to an electronic device control method and an electronic device.

BACKGROUND

A user may control, through an electronic device, a printer for printing. Currently, when the printer is controlled through the electronic device for printing, an interface layout is not convenient for viewing, resulting in poor user experience.

SUMMARY

This application provides an electronic device control method and an electronic device, which is helpful to reduce operation complexity of a user, improve a degree of intelligence of a terminal device, and finally improve user experience.

According to a first aspect, an embodiment of this application provides an electronic device control method. The method is applicable to an electronic device. Specifically, the method includes: displaying, by the electronic device, a first interface, the first interface including: a first thumbnail and a first quantity of controls, the first thumbnail corresponding to a first file, the first thumbnail having a first size, and the first quantity of controls including a first control; where the first control is a print control, a user triggers the print control, and the electronic device sends a printing instruction to a printing device, the printing instruction indicating printing the first file; and performing, by the user, a first operation on the first interface, the first operation being a swipe-up operation, and displaying, by the electronic device, a second interface, the second interface including: a second thumbnail and a second quantity of controls, the second quantity of controls including the first control, the second thumbnail corresponding to the first file, the second thumbnail having a second size, the second size being smaller than the first size, the second quantity being greater than the first quantity, the second interface being of a same size as the first interface.

As can be seen, in the above embodiment, the user performs a second operation in the first interface, so that more controls are displayed in the second interface than in the first interface, so as to provide more control items for the user. In addition, the first thumbnail is reduced to the second thumbnail, preventing occlusion of the thumbnail by the control, which is convenient for the user to view and improves user experience.

In a possible implementation, in response to the second operation acting on the first interface, the first thumbnail is reduced from the first size to the second size to obtain the second thumbnail; and the first quantity of controls move according to the second operation, and a third quantity of controls are added to the second interface to obtain the second quantity of controls, where a sum of the first quantity and the third quantity is the second quantity.

In a possible implementation, in the first interface, the first thumbnail is located on an upper side of the first quantity of controls, and the second operation is a swipe-up operation. The user performs the swipe-up operation on the first interface to drag out more controls.

In a possible implementation, after the displaying a second interface in response to a second operation acting on the first interface, the first interface is displayed in response to a third operation acting on the second interface. The third operation may be a swipe-down operation. The user performs the swipe-down operation in the second interface to reduce a quantity of the controls and enlarge the second thumbnail to the first thumbnail, so that the electronic device displays the first interface.

In a possible implementation, the first quantity of controls further include a second control, a third control, and a fourth control, and a third interface is displayed in response to a fourth operation acting on the second control, the third interface including: an option of a printing device; a fourth interface is displayed in response to a fifth operation acting on the third control, the fourth interface including: an option of print copies; and a fifth interface is displayed in response to a sixth operation acting on the fourth control, the fifth interface including: an option of a printing range; where the sending a printing instruction to a printing device in response to a first operation on the first control includes: sending, in response to the first operation on the first control, a printing instruction carrying a first printing parameter to a printing device selected in the third interface, the first printing parameter including print copies selected in the fourth interface and a printing range selected in the fifth interface. The second control may be a printing device selection control, the third control may be a print copies selection control, and the fourth control may be a printing range selection control.

In a possible implementation, the second quantity of controls further include a fifth control, a sixth control, a seventh control, and an eighth control, and a sixth interface is displayed in response to a seventh operation acting on the fifth control, the sixth interface including: an option of a paper type; a seventh interface is displayed in response to an eighth operation acting on the sixth control, the seventh interface including: an option of a paper size; an eighth interface is displayed in response to a ninth operation acting on the seventh control, the eighth interface including: an option of a printing manner, the printing manner including: double-sided printing and single-sided printing; and a ninth interface is displayed in response to a tenth operation acting on the eighth control, the ninth interface including: an option of a color mode, the option of the color mode including: a black-white mode and a colored mode; where the sending a printing instruction to a printing device in response to a first operation on the first control includes: sending, in response to the first operation on the first control, a printing instruction carrying a second printing parameter to the printing device, the second printing parameter including: a paper type selected in the sixth interface, a paper type selected in the seventh interface, a printing manner selected in the eight interface, and a color mode selected in the ninth interface. The fifth control may be a paper type selection control, the sixth control may be a paper size selection control, the seventh control may be a printing manner selection control, and the eighth control may be a color mode selection control.

In a possible implementation, the first quantity of controls further include a ninth control, the ninth control corresponding to a background image, an icon of the ninth control being displayed as a third thumbnail of the corresponding background image, the user may determine a to-be-selected background according to the third thumbnail and select the ninth control corresponding to the background, and in response to an eleventh operation on the ninth control, the first thumbnail is displayed on a background image selected by the eleventh operation, the background image selected by the eleventh operation being the background image corresponding to the ninth control selected by the eleventh operation.

In a possible implementation, the second quantity of controls further include a tenth control, the tenth control corresponding to a position relationship between the first thumbnail and the background image, an icon of the tenth control being a schematic diagram of the corresponding position relationship, the user may determine a to-be-selected position relationship according to the schematic diagram and select the tenth control corresponding to the position relationship, and in response to a twelfth operation on the tenth control and according to a position relationship selected by the twelfth operation, the first thumbnail is displayed on the background image selected by the eleventh operation, the position relationship selected by the twelfth operation being the position relationship corresponding to the tenth control selected by the twelfth operation.

In a possible implementation, the first thumbnail is located on an upper side of the first quantity of controls, and a tenth interface is displayed in response to a thirteenth operation acting on the first interface, the tenth interface including the first thumbnail and a fourth quantity of controls, where the first thumbnail has the first size, and the fourth quantity of controls are located on an upper side of the first thumbnail.

In a possible implementation, the thirteenth operation is a swipe-down operation.

According to a second aspect, an embodiment of this application provides an electronic device, the electronic device including a memory configured to store a computer program instruction and a processor configured to execute the program instruction. When the computer program instruction is executed by the processor, the electronic device is triggered to perform the method according to any one of the first aspect.

According to a third aspect, an embodiment of this application provides a computer-readable storage medium, the computer-readable storage medium including a stored program. When the program runs, a device in which the computer-readable storage medium is located is controlled to perform the printing method according to any one of the first aspect.

According to a fourth aspect, an embodiment of this application provides a computer program product, the computer program product including an executable instruction, the executable instruction, when executed on a computer, causing the computer to perform the printing method according to any one of the first aspect.

According to a fifth aspect, an embodiment of this application further provides a chip, the chip being coupled to a memory and configured to execute a computer program stored in the memory to perform any possible method according to any one of the above aspects.

It may be understood that, the electronic device according to the second aspect, the computer-readable storage medium according to the third aspect, the computer program product according to the fourth aspect, and the chip according to the fifth aspect that are provided above are all configured to perform the corresponding method provided above. Therefore, for beneficial effects that can be achieved, refer to beneficial effects in the corresponding method provided above, and details are not described herein again.

DESCRIPTION OF EMBODIMENTS

Technical solutions in embodiments of this application are described below with reference to the accompanying drawings in the embodiments of this application. In the descriptions of the embodiments of this application, "I" means "or" unless otherwise specified. For example, A/B may represent A or B. In this specification, "and/or" describes only an association relationship for describing associated objects and indicates that three relationships may exist. For example, A and/or B may represent the following three cases: Only A exists, both A and B exist, and only B exists. In addition, in the descriptions of the embodiments of this application, "a plurality of" represents two or more.

The terms "first" and "second" below are merely intended for descriptive purposes, and cannot be understood as an indication or implication of relative importance or implicit indication of the quantity of indicated technical features. Therefore, a feature limited by "first", "second" or "third" may explicitly or implicitly include one or more of the features.

A photographing method provided in the embodiments of this application is applicable to a terminal device such as a mobile phone, a tablet computer, a wearable device, an in-vehicle device, an augmented reality (AR) device/virtual reality (VR) device, a notebook computer, an ultra-mobile personal computer (UMPC), a netbook, or a personal digital assistant (PDA). No limitation is imposed on the specific type of the terminal device in the embodiments of this application.

Figure 1:
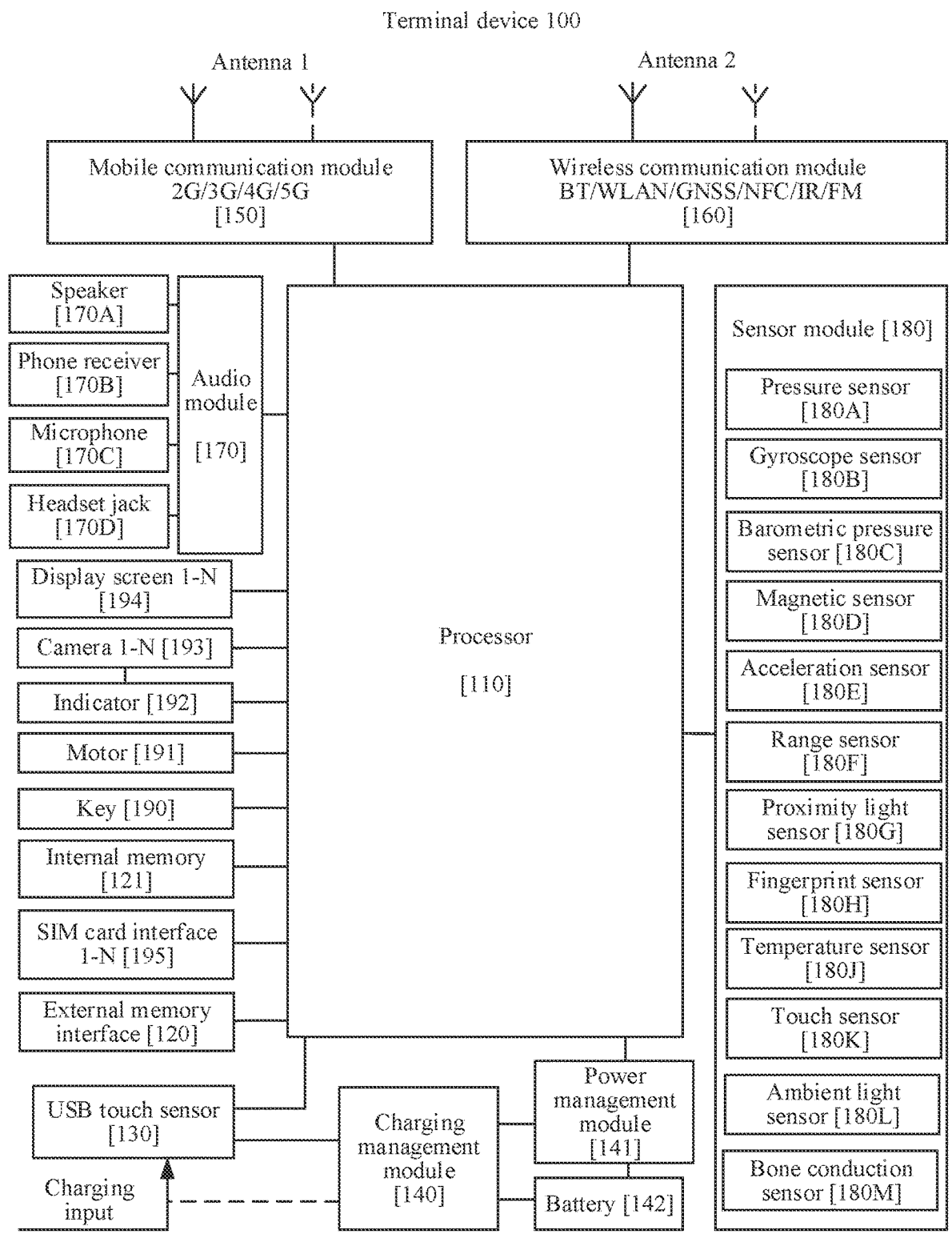
FIG. 1 is a schematic diagram of an application scenario according to an embodiment of this application.

For example, FIG. 1 is a schematic structural diagram of a terminal device 100 according to an embodiment of this application. The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a phone receiver 170B, a microphone 170C, a headset jack 170D, a sensor module 180, a key 190, a motor 191, an indicator 192, a camera 193, a display screen 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, a proximity light sensor 180G, a fingerprint sensor 180H, a temperature sensor 180J, a touch sensor 180K, an ambient light sensor 180L, a bone conduction sensor 180M, and the like.

It may be understood that an example structure in this embodiment of this application does not constitute a specific limitation on the terminal device 100. In some other embodiments of this application, the terminal device 100 may include more or fewer components than those shown in the figure, or combine some components, or split some components, or have different component arrangements. The components shown in the figure may be implemented by hardware, software, or a combination of software and hardware.

A software system of the terminal device 100 may use a layered architecture, an event driven architecture, a micro-core architecture, a micro-service architecture, or a cloud architecture. In this embodiment of this application, an Android system of the layered architecture is used as an example to illustrate a software structure of the terminal device 100.

Figure 2:
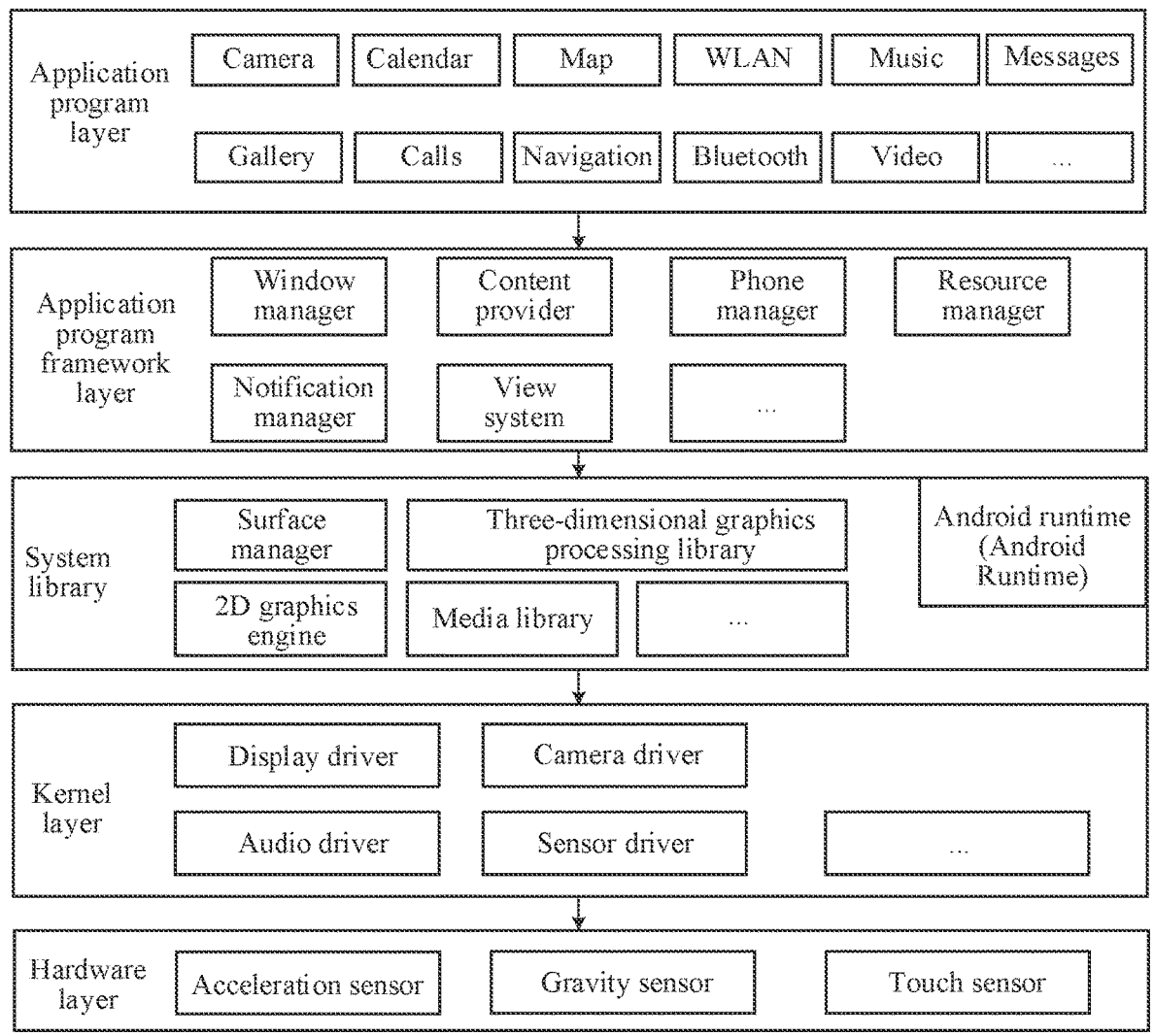
FIG. 2 is a schematic structural diagram of a mobile phone according to an embodiment of this application.

FIG. 2 is a block diagram of a software structure of the terminal device 100 according to an embodiment of this application. In the layered architecture, software is divided into several layers, and each layer has a clear role and task. The layers communicate with each other through a software interface. In some embodiments, the Android system is divided into four layers, which are a program application layer, an application framework layer, an Android runtime and system library, and a kernel layer from top to bottom. The application layer may include a series of application packages. As shown in FIG. 2, the application packages may include applications such as Camera, Gallery, Calendar, Calls, Map, Navigation, WLAN, Bluetooth, Music, Video, and Messages.

The application framework layer provides an application programming interface (API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The Android runtime includes a kernel library and a virtual machine. The Android runtime is responsible for scheduling and managing the Android system.

The core library includes two parts: one part is a performance function that the Java language needs to invoke, and the other part is a core library of Android.

The application layer and the application framework layer are run in the virtual machine. The virtual machine executes Java files of the application layer and the application framework layer as binary files. The virtual machine is used for executing functions such as object lifecycle management, stack management, thread management, security and exception management, and garbage collection.

The system library may include a plurality of function modules, for example, a surface manager, a media library (media libraries), a three-dimensional graphics processing library (for example, OpenGL ES), a 2D graphics engine (for example, SGL), and the like.

The kernel layer is a layer between hardware and software. The kernel layer includes at least a display driver, a camera driver, an audio driver, and a sensor driver.

The hardware layer may include various types of sensors, for example, the various types of sensors described in FIG. 1, the acceleration sensor, the gyroscope sensor, and the touch sensor in this embodiment of this application.

With reference to the electronic devices described above in FIG. 1 and FIG. 2, in the embodiments of this application, physical elements related to the electronic device 100 mainly include hardware components such as a sensor, a decision support systems (DSS) display chip, a touch display screen, and a fingerprint recognition module; kernel software layers such as a screen management module, a display driver, a fingerprint driver, and accidental touch prevention; application framework layer functions such as accidental touch input prevention, screen control, an always on display (AOD) service, and power management; and application layer services such as a special adaptation application (camera), a third-party application, system hibernation, and AOD.

The following illustrates working processes of software and hardware of the electronic device 100 with reference to a photographing method in the embodiments of this application. The photographing method provided in the embodiments of this application is mainly implemented through mutual cooperation between a touch panel (TP) module, one or more of the foregoing physical elements, and software architecture layers of the electronic device 100.

The TP module receives a touch operation performed by a user on the touch display screen, and transfers the touch operation performed by the user to a physical status recognition module in the system library. A physical status monitoring module performs monitoring, recognizes the touch operation performed by the user, and so on. The physical status monitoring module transfers the touch operation performed by the user to a state machine management module of the electronic device, and controls a window management system at an FWK layer by using the state machine management module, to control a series of actions, display, and the like of the electronic device.

In addition, implementation of the entire process further requires collaborative participation of a plurality of other modules and sensors, for example, a skin module at an application layer. The skin module is configured to control a display interface of a touchscreen and the like. Details are not described again in this application.

For ease of understanding, in the following embodiments of this application, with reference to the accompanying drawings and application scenarios, an electronic device having the structures shown in FIG. 1 and FIG. 2 is used as an example to specifically describe the electronic device control method provided in this application. First, a printing scenario is taken as an example.

Figure 3A:
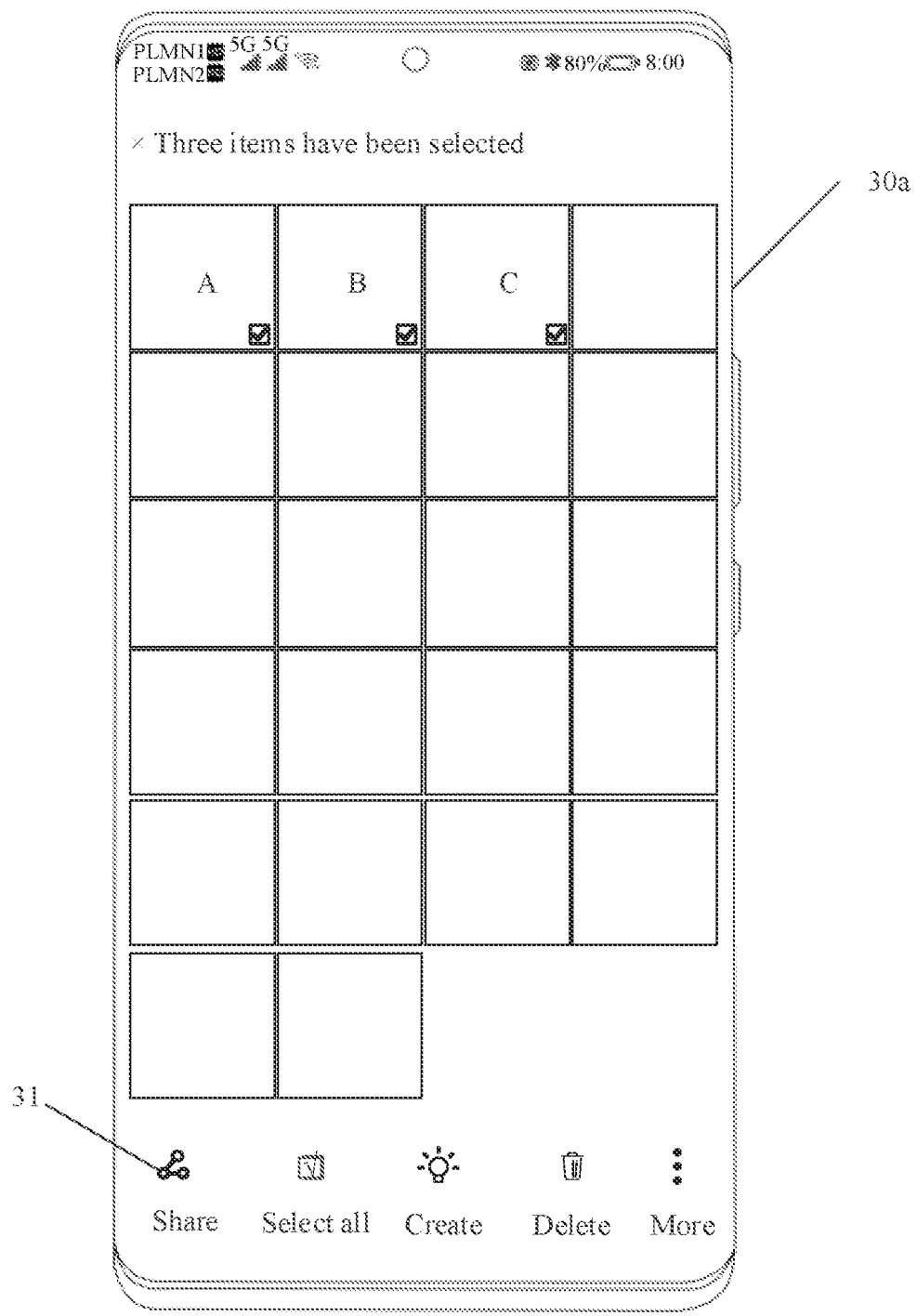
FIG. 3a is a schematic diagram of a graphical user interface of a first electronic device according to an embodiment of this application.
Figure 3B:
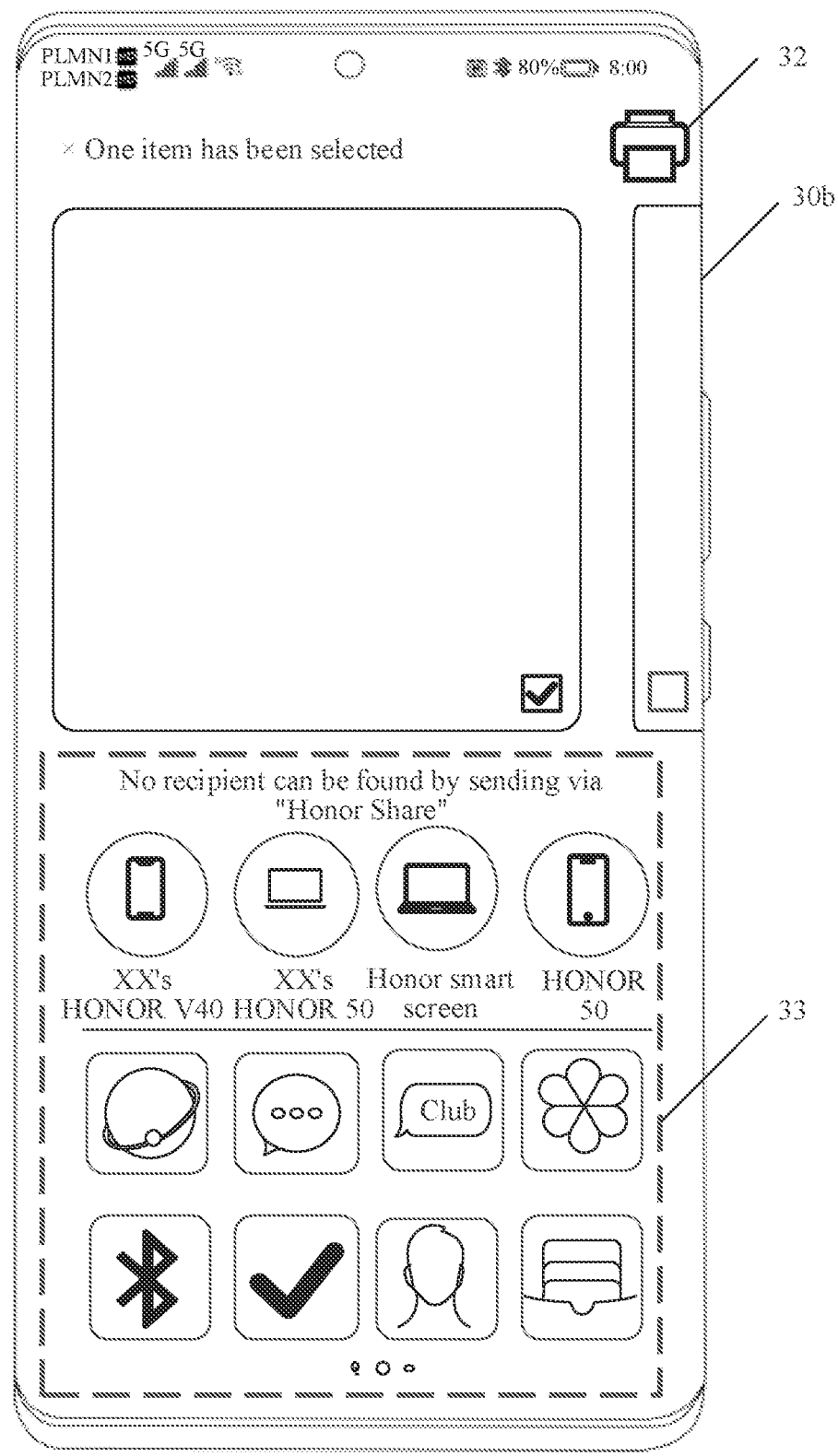
FIG. 3b is a schematic diagram of a graphical user interface of a second electronic device according to an embodiment of this application.

The electronic device has a function of generating a printing task according to a printing object. The printing object may be an image, a file, a memo, and the like. For example, the printing object is an image, and an album application for browsing images is installed on the electronic device. A user may enter an album interface by clicking an icon of the album application. The album interface has images displayed according to a preset size and a preset arrangement rule. The images in the album interface may be selected through an operation such as long press. FIG. 3a is a schematic diagram of selecting an image in the album interface of the electronic device. The user, after selecting an image A, an image B, and an image C in the album interface, enters an interface 30a as shown in FIG. 3a, a share control 31 is provided in the interface 30a, the user clicks the share control 31, and the electronic device displays an interface 30b as shown in FIG. 3b. In the interface 30b, a print control 32 and some other controls 33 are provided. The user may enter a task of printing an image object by triggering the print control 32.

Figure 3C:
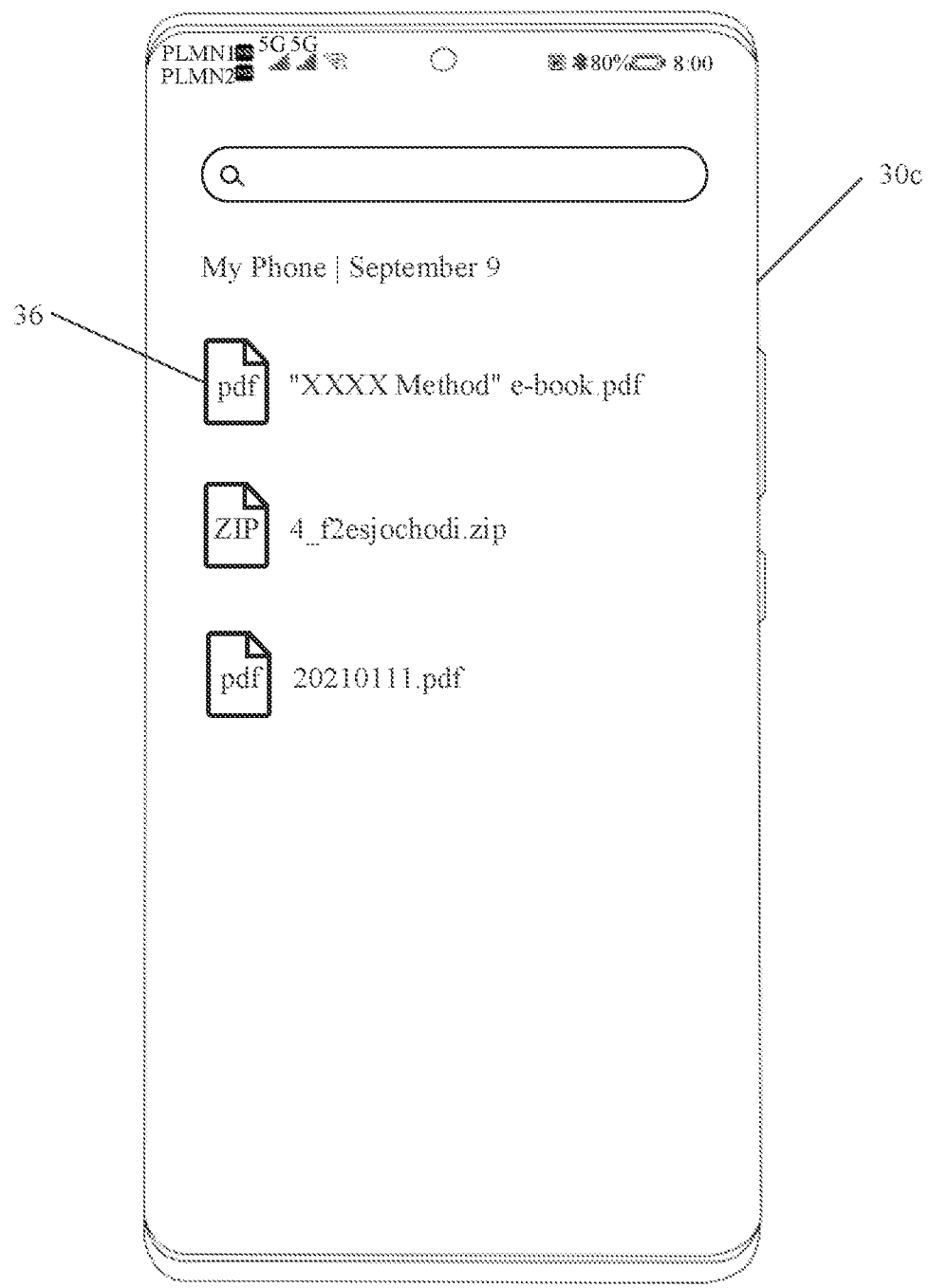
FIG. 3c is a schematic diagram of a graphical user interface of a third electronic device according to an embodiment of this application.
Figure 3D:
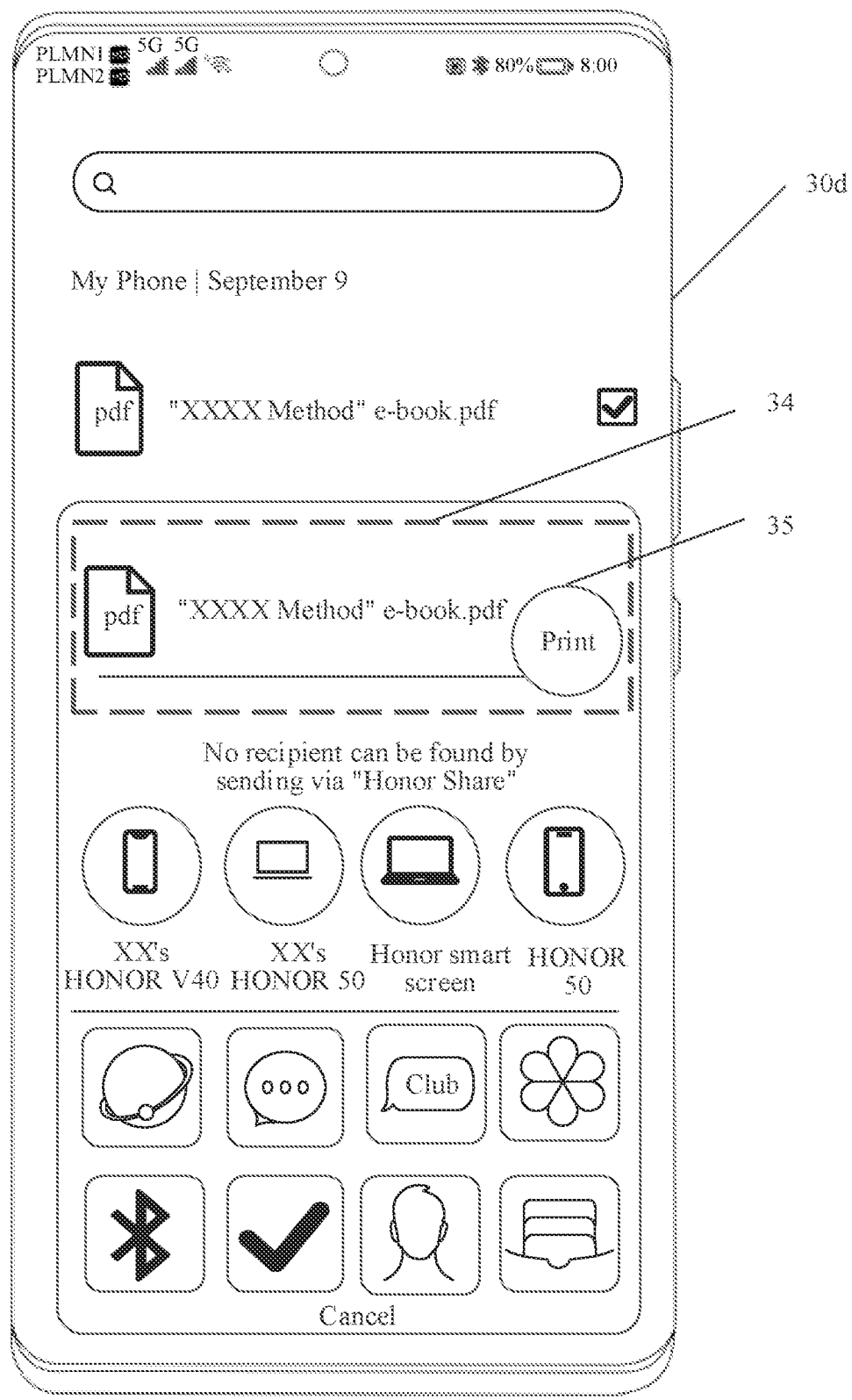
FIG. 3d is a schematic diagram of a graphical user interface of a fourth electronic device according to an embodiment of this application.

In another example, the printing object is a file. The user enters an interface 30c as shown in FIG. 3c, a file manager is displayed in the interface 30c, and the user selects a printing object 36 in the file manager by long press or another operation, and after triggering a share function of the printing object 36, enters an interface 30d as shown in FIG. 3d. A task preview area 34 is provided in the interface 30d. The user may enter a printing task corresponding to a file by triggering a print control 35 for the printing object 36 in the task preview area 34.

The above manners of entering the printing task are only examples, and the manner of entering the printing task is not limited in this application. The electronic device may further provide another manner of entering the printing task. Details are not described herein again.

Figure 4A:
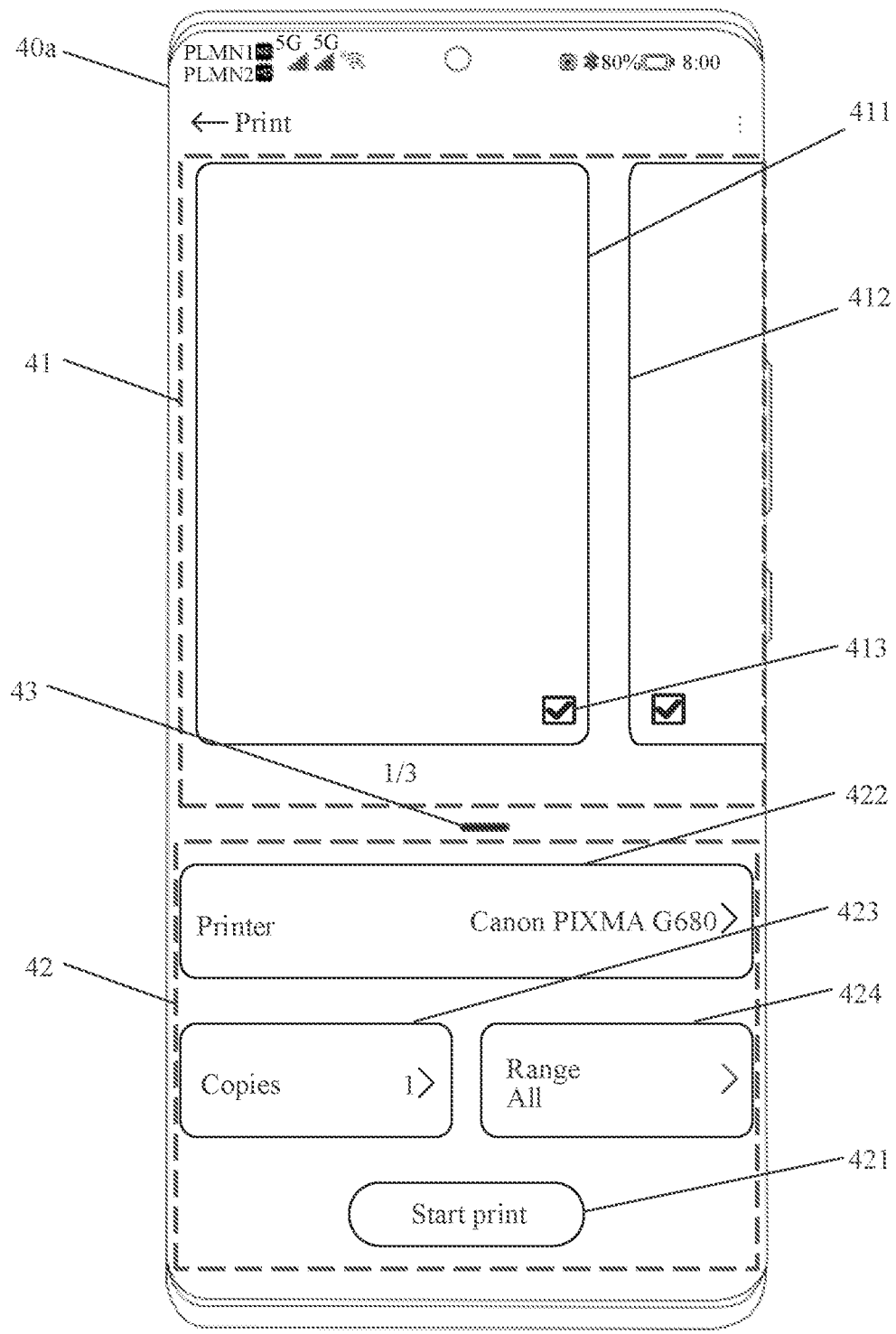
FIG. 4a is a schematic diagram of a graphical user interface of a fifth electronic device according to an embodiment of this application.

As an example, on the basis of FIG. 3b, after a printing task corresponding to an image is entered, an interface 40a shown in FIG. 4a may be obtained. The interface 40a includes at least a preview area 41 and a control area 42.

The preview area 41 is used for displaying a preview result corresponding to a printing object, that is, a preview object. The preview area 41 includes a fully displayed first preview object 411 and an incompletely displayed second preview object 412. In the preview area 41, a complete preview object may also be viewed by swiping in a preview object arrangement direction. For example, the user may swipe to the left in the preview area 41 to display, in the preview area 41, a third preview object not displayed in the interface 40a. Each preview object includes a selection control 413. After the printing task is entered, the selection control of each preview object is selected, and the user may cancel the selection of the preview object by clicking the selection control 413.

The control area 42 is used for displaying a control, and the control may specifically include a start print control 421 and a printing parameter control. The printing parameter control may include: a printer selection control 422, a copies selection control 423, a range selection control 424, and the like. When a printing parameter needs to be adjusted, the control may be clicked to trigger display of a control window on the interface 40a for the user to select.

As an example, the control displayed in the control area 42 of the interface 40a may be a common control, which may be the printer selection control 422, the copies selection control 423, and the range selection control 424, or another control in an image printing scenario. The user, after confirming a printing object and a printing parameter, may click the start print control 421 to trigger the electronic device to send a printing instruction to the printing device.

There is a sign 43 above the control area 42. The sign 43 is used for indicating that other undisplayed controls may also be provided in the control area 42 in addition to currently provided controls. The user swipes up with a single point in the interface 40a on the basis of FIG. 4a in further combination with FIG. 4b. In response to the swiping operation, the interface 40a changes to an interface 40c as shown in FIG. 4c. In the interface 40c, an area occupied by the control area 42 in an entire display interface becomes larger, and the following controls hidden in 40*a* are displayed: a paper type selection control 425, a paper size selection control 426, a printing manner selection control 427, and a color mode selection control 428. When the user clicks the above four controls, the corresponding control window can also be displayed.

In 40*c*, due to enlargement of the control area 42, an area occupied by the preview area 41 in the display interface becomes smaller. The preview object in the preview area 41 also becomes smaller accordingly. A complete first preview object 411, a complete second preview object 412, and an incomplete third preview object 414 are displayed in the preview area 41. Similarly, a complete third preview object may be displayed in the preview area 41 by swiping in the preview object arrangement direction.

In an example of FIG. 4*c*, seven controls are provided in the control area 42. As an optional example, in order to provide more controls, a scroll bar may also be added to the control area 42 of 40*c*. As shown in FIG. 4*d*, in an interface 40*d*, seven controls and a scroll bar 44 are displayed in the control area 42. When the user pulls down the scroll bar 44, hidden controls may be displayed, such as a printing direction and a page margin.

Figure 5A:
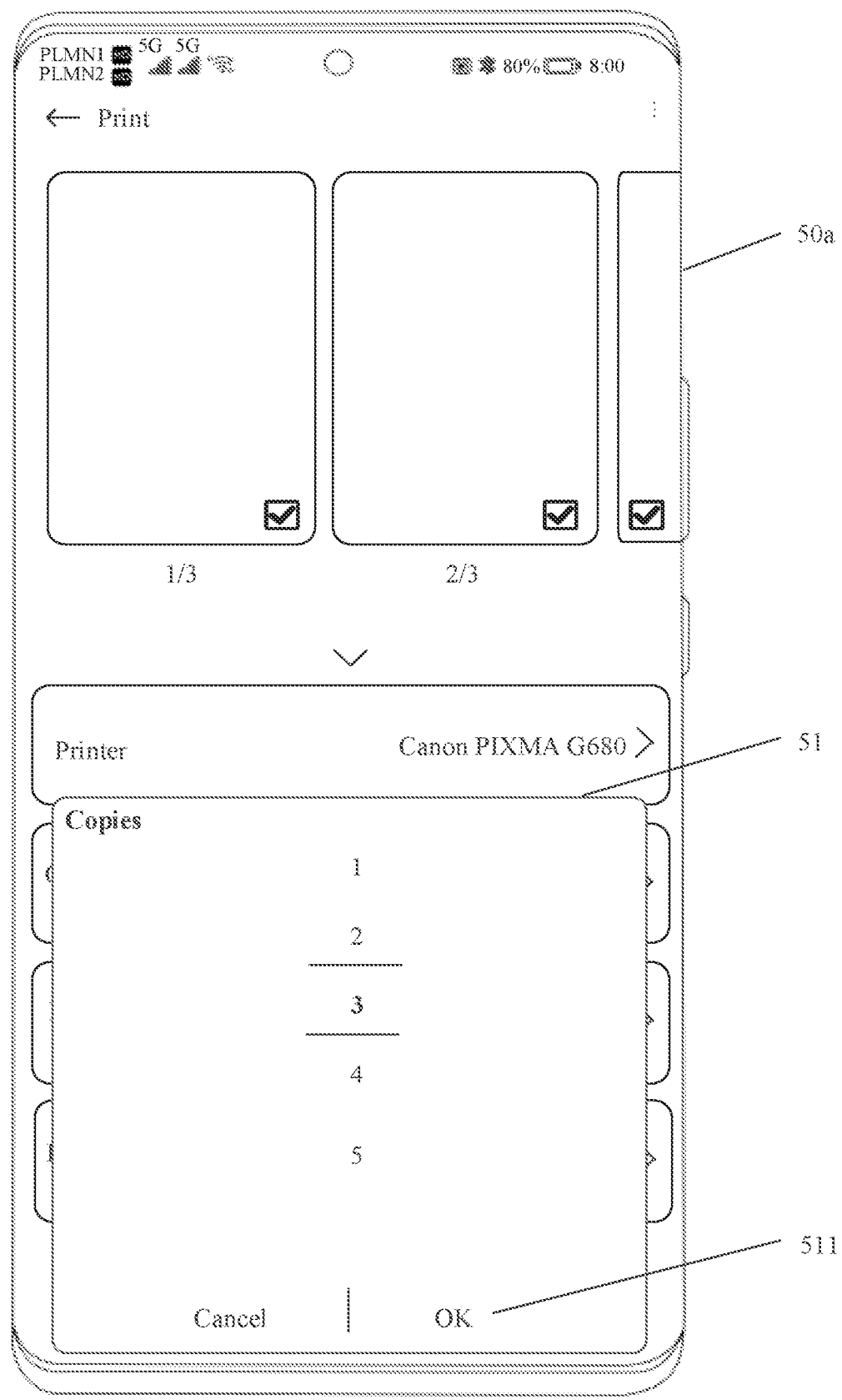
FIG. 5a is a schematic diagram of a graphical user interface of a tenth electronic device according to an embodiment of this application.

As an example, the user clicks the copies selection control 423 in the interface 40*c*, 50*a* as shown in FIG. 5*a* is displayed, a copies selection window 51 is provided in the interface 50*a*, copies required for printing may be selected in the copies selection window 51, an OK control 511 is then clicked, the copies selection window 51 disappears, and the electronic device goes back to the interface 40*c*.

Figure 5B:
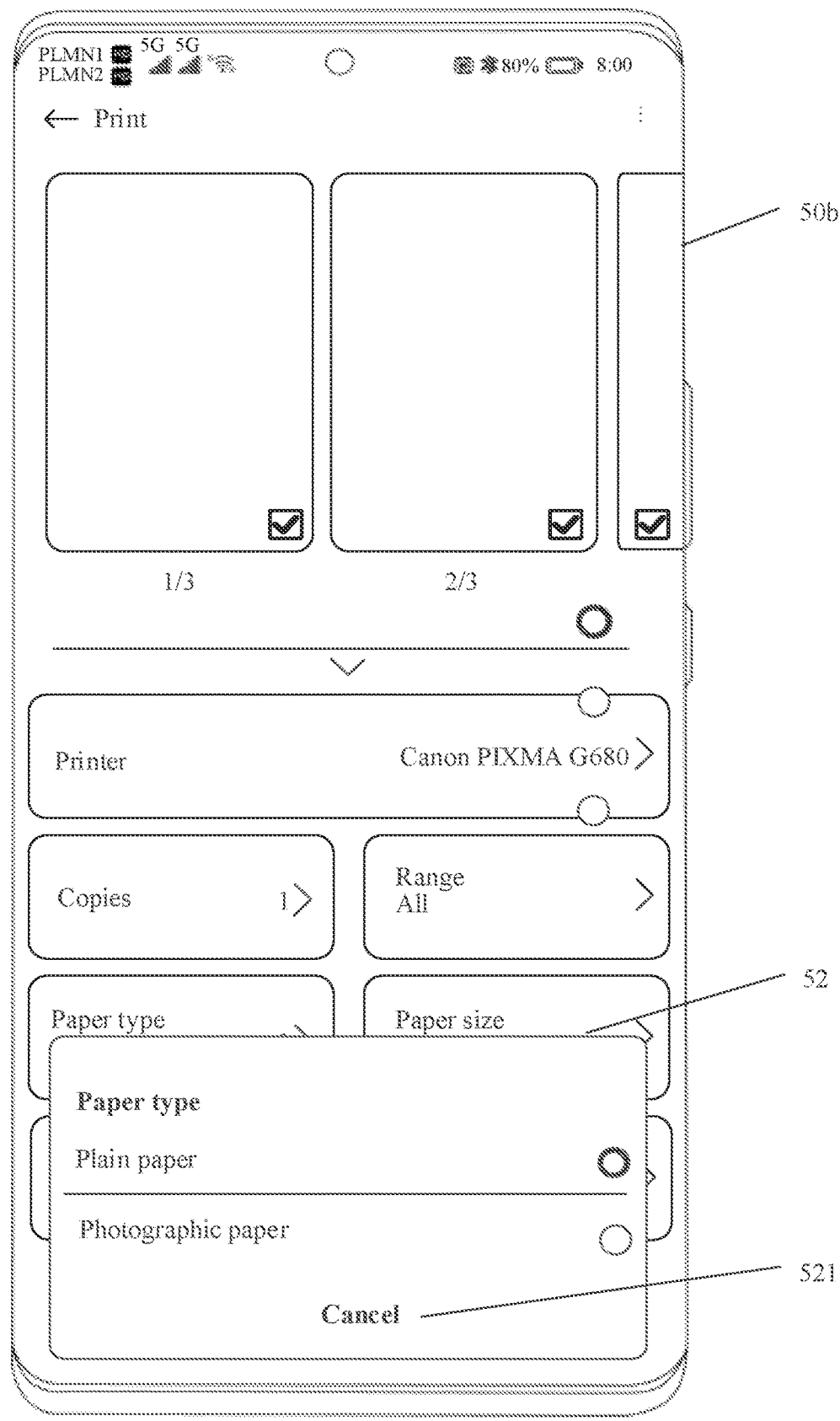
FIG. 5b is a schematic diagram of a graphical user interface of an eleventh electronic device according to an embodiment of this application.

As an example, the user clicks the paper type selection control 425 in the interface 40*c*, 50*b* as shown in FIG. 5*b* is displayed, a paper selection window 52 is provided in the interface 50*b*, and a required paper type for printing may be selected in the paper selection window 52. For example, the user selects plain paper, the paper selection window 52 disappears, and the electronic device goes back to the interface 40*c*. The paper type is plain paper. In another example, the user clicks a cancel control 521, the electronic device goes back to the interface 40*c*, and the paper type remains the same as that before the paper selection window 52 pops up.

Figure 5C:
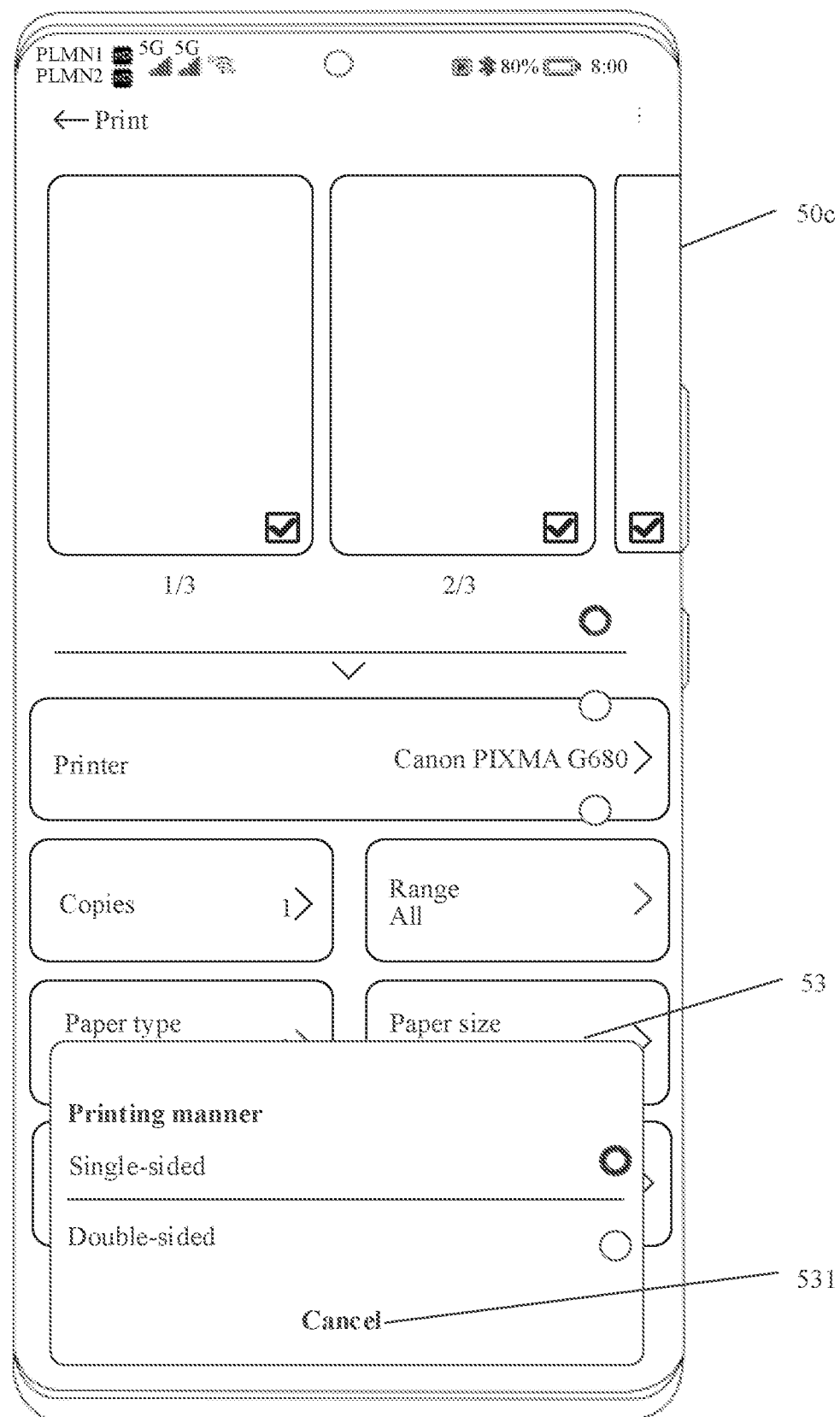
FIG. 5c is a schematic diagram of a graphical user interface of a twelfth electronic device according to an embodiment of this application.

As an example, the user clicks the printing manner selection control 427 in the interface 40*c*, 50*c* as shown in FIG. 5*c* is displayed, a printing manner selection window 53 is provided in the interface 50*c*, and a required printing manner, including double-sided printing or single-sided printing, may be selected in the printing manner selection window 53. For example, in 50*c*, the user selects single-sided printing, the printing manner selection window 53 disappears, and the electronic device goes back to the interface 40*c*. The printing manner is single-sided printing. In another example, the user clicks a cancel control 531, the electronic device goes back to the interface 40*c*, and the printing manner remains the same as that before the printing manner selection window 53 pops up.

Figure 5D:
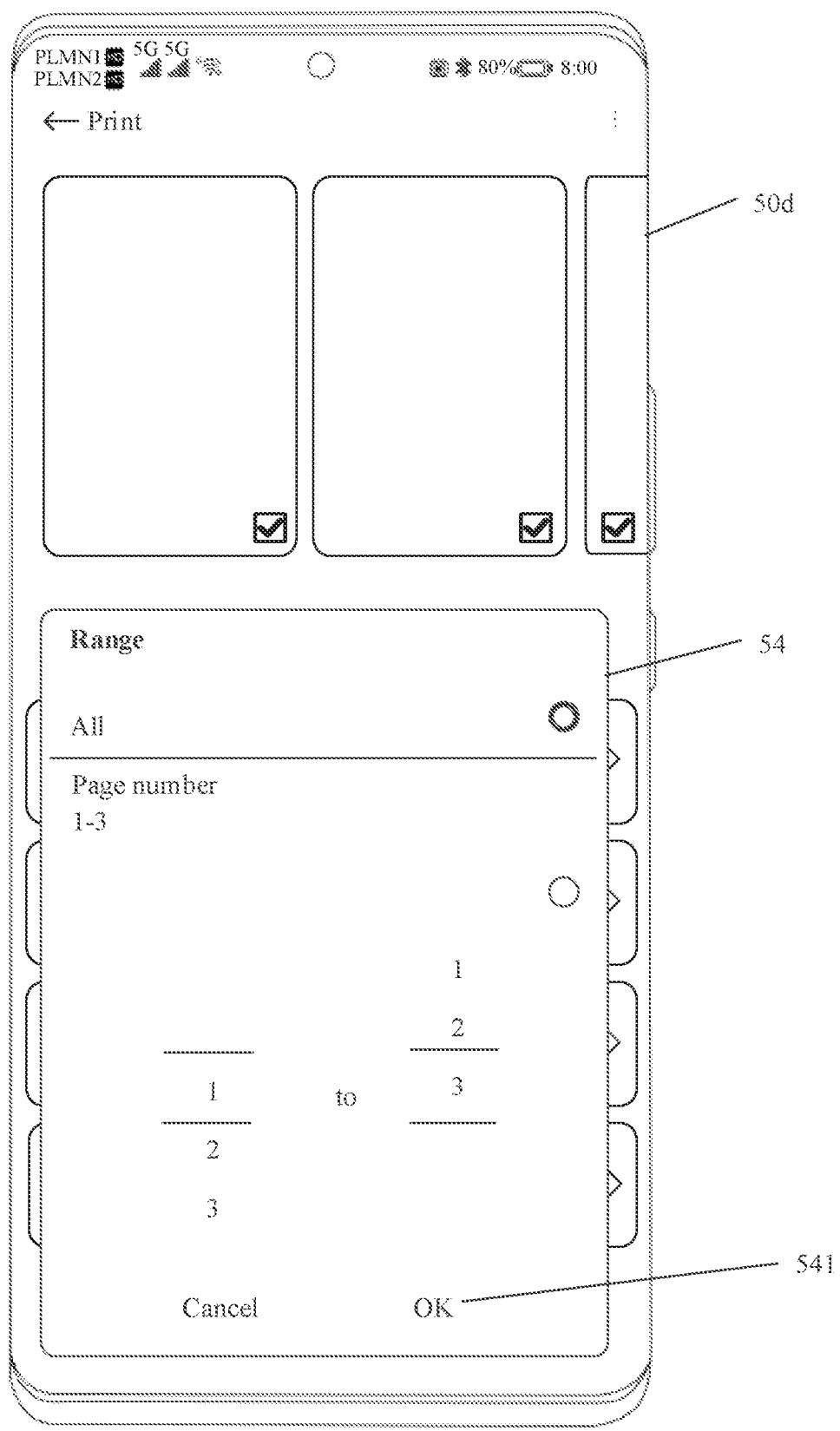
FIG. 5d is a schematic diagram of a graphical user interface of a thirteenth electronic device according to an embodiment of this application.

As an example, the first preview object, the second preview object, and the third preview object have all been selected, and the user clicks the range selection control 424 in the interface 40*c* to display an interface 50*d* as shown in FIG. 5*d*. A first range selection window 54 is provided in 50*d*. A required printing range may be selected in the first range selection window 54. The first range selection window may provide an option to print all, or provide an option to select a start page and an end page separately. For example, the user selects print all in 50*d*. The user clicks the OK control 541 in 50*d* again after selecting the printing range, the first range selection window 54 disappears, and the electronic device goes back to the interface 40*c*.

Figure 5E:
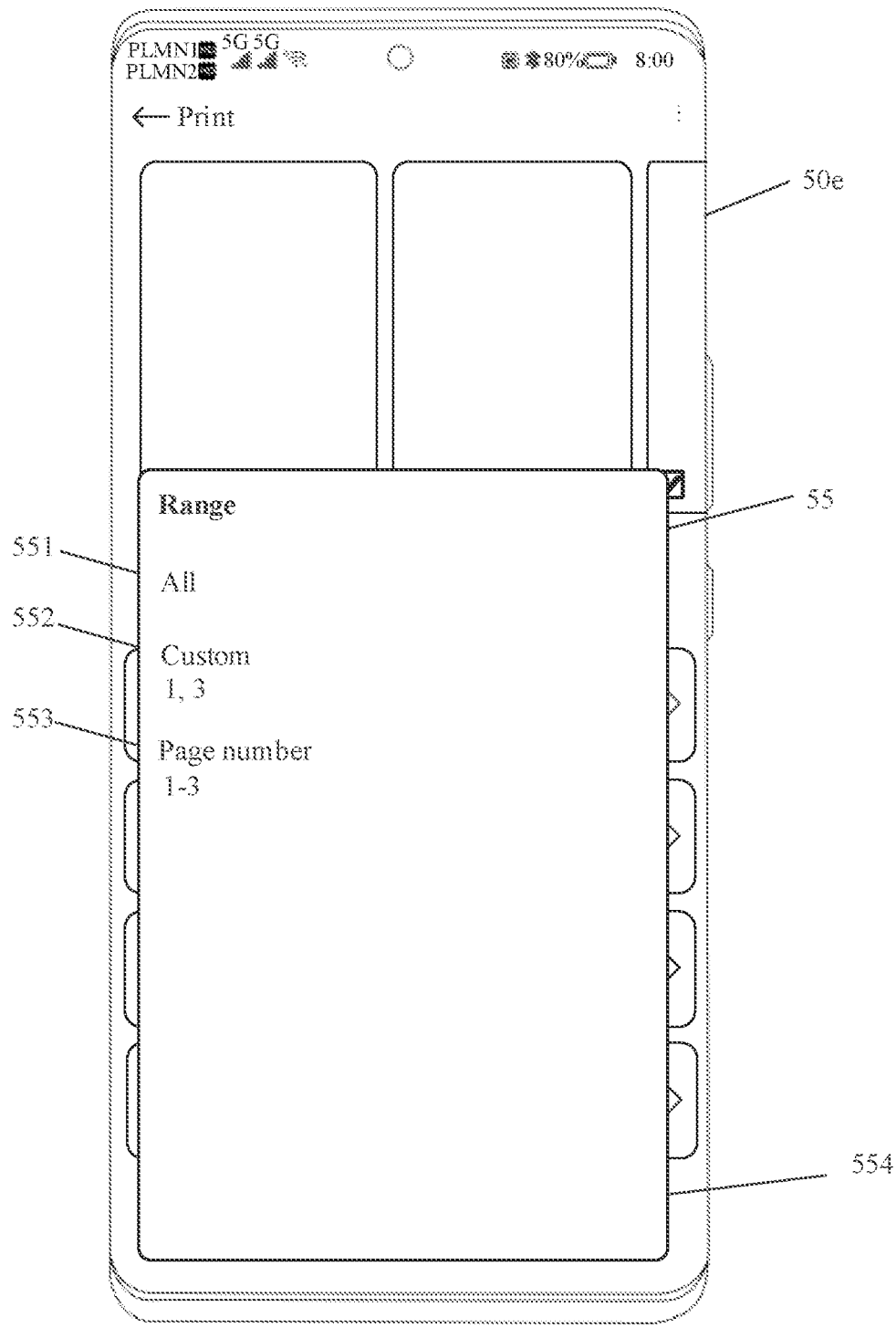
FIG. 5e is a schematic diagram of a graphical user interface of a fourteenth electronic device according to an embodiment of this application.

As an example, the first preview object and the third preview object have been selected, while the second preview object is not selected. In such a scenario, the user clicks the range selection control 424 in the interface 40*c*, an interface 50*e* as shown in FIG. 5*e* is displayed, and another second range selection widow 55 different from the first range selection window 54 is provided in the interface 50*e*. An all print option 551, a custom print option 552, and a continuous print option 553 are provided in the second range selection window 55. Optionally, the user selects the all print option 551 and clicks the OK control 554, and the second range selection window 55 disappears. Go back to the interface 40*c*. Optionally, the user selects the custom print option 552 and clicks the OK control 554, and the second range selection window 55 disappears. Go back to the interface 40*c*. Since the user selects the first preview object and the third preview object before entering the second range selection window 55, a printing range corresponding to the custom print option 552 is images corresponding to the first preview object and the third preview object. Optionally, the user selects the continuous print option 553 and selects a start page in a start page selection area and an end page in an end page selection area, and after the user clicks the OK control 554, the second range selection window 55 disappears. Go back to the interface 40*c*.

Figure 5F:
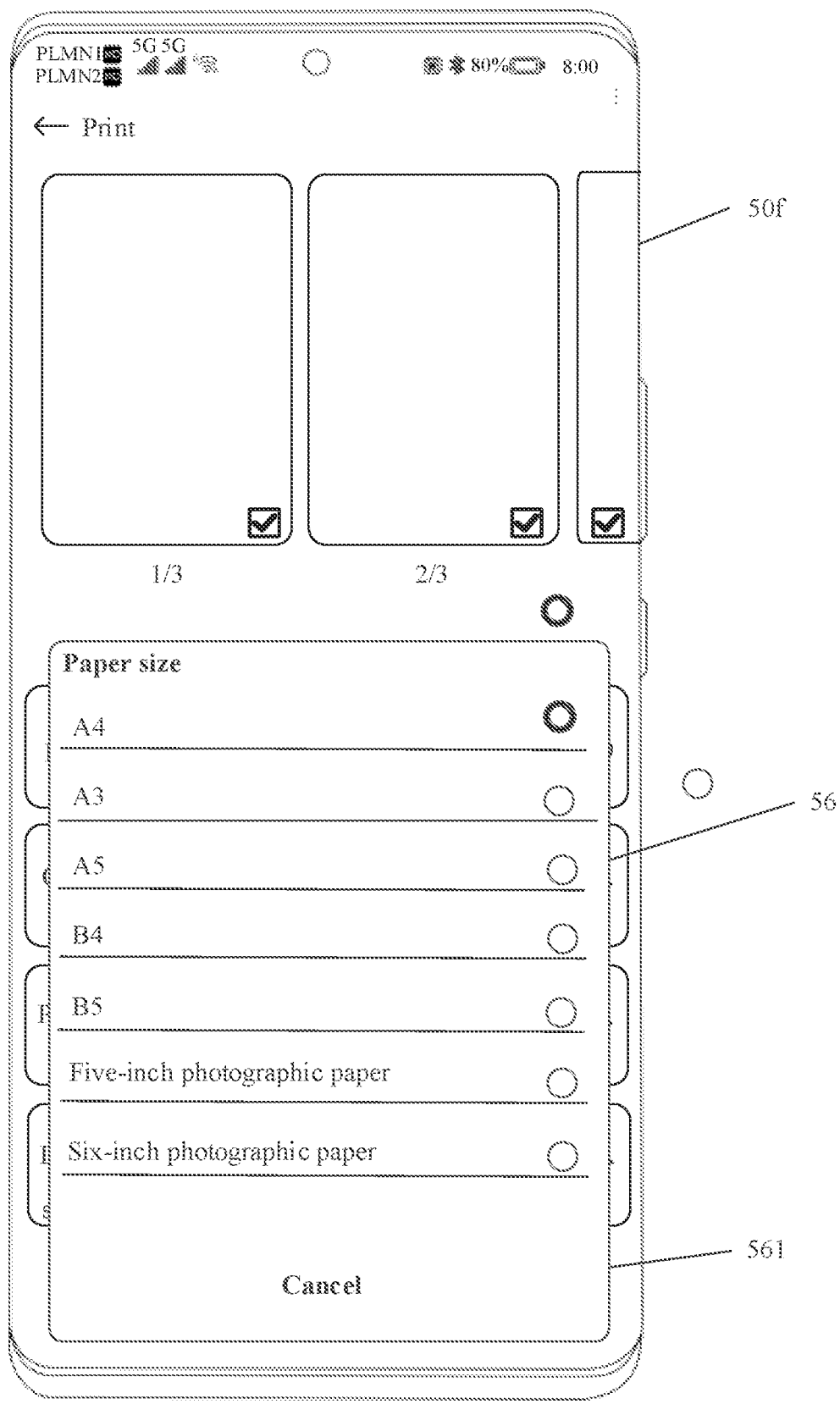
FIG. 5f is a schematic diagram of a graphical user interface of a fifteenth electronic device according to an embodiment of this application.

As an example, the user clicks the paper size selection control 426 in the interface 40*c*, an interface 50*f* as shown in FIG. 5*f* is displayed, and a paper size selection window 56 is provided in the interface 50*f*. A paper size provided in the paper size selection window 56 is a paper size that can be provided by a printing device currently connected to the electronic device. For example, the user selects A4, the paper size selection window 56 disappears, and the electronic device goes back to the interface 40*c*. The paper size is A4. In another example, the user clicks a cancel control 561, the electronic device goes back to the interface 40*c*, and the paper size remains the same as that before the paper size selection window 56 pops up.

Figure 5G:
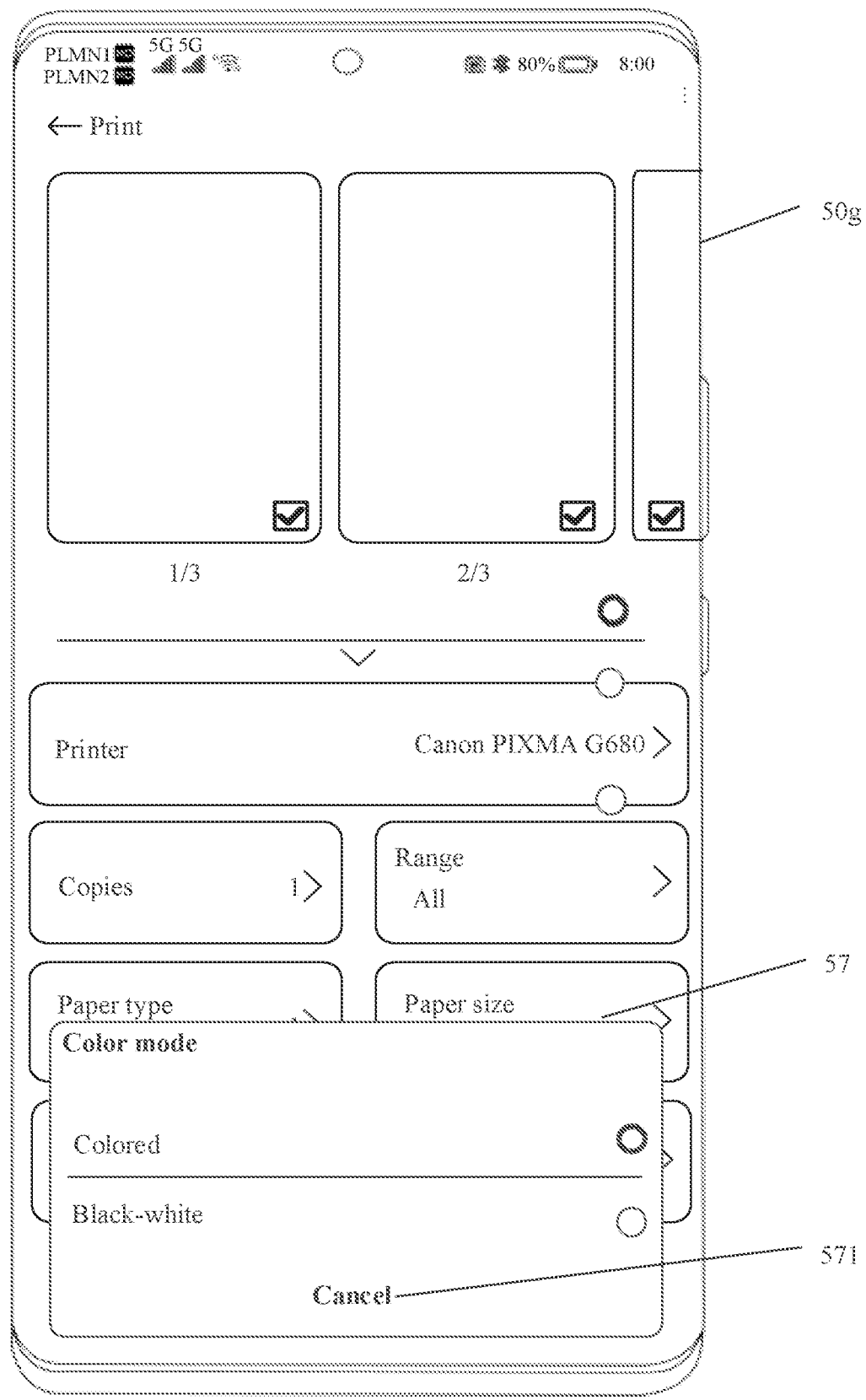
FIG. 5g is a schematic diagram of a graphical user interface of a sixteenth electronic device according to an embodiment of this application.

As an example, the user clicks the color mode selection control 428 in the interface 40*c*, an interface 50*g* as shown in FIG. 5*g* is displayed, a color mode selection window 57 is provided in 50*g*, and two options of a colored mode and a black-white mode are provided in the color mode selection window 57. Optionally, the user selects the black-white mode, and at the same time, a preview object in the preview area 42 is displayed in the black-white mode, the color mode selection window 57 disappears, and the electronic device goes back to the interface 40*c*. Optionally, the user clicks a cancel control 571, the color mode selection window 57 disappears, the electronic device goes back to the interface 40*c*, and the color mode remains the same as that before the color mode selection window 57 pops up.

Still referring to FIG. 4*c*, there is a sign 45 above the control area 42. The sign 45 is used for indicating that the current control area 42 may contract downwards. As an example, as shown in FIG. 4*e*, the user swipes down with a single point in the interface 40*c*, the control area 42 contracts downwards, the controls in the control area 42 remain in a same size and are reduced in number, and the electronic device displays an interface as shown in FIG. 4*a*.

In the solution provided in the above embodiments, both the control area and the preview area are areas that can expand or contract. When the user operates the control area to expand or contract, a size of the preview object in the preview area may change accordingly. The preview object is larger when the control area is in a contracting state. The preview object is smaller when the control area is in an expanding state, and the preview object may correspondingly change according to control in the control area. Based on the above solution, occlusion of the preview object by the control area is prevented while a perfect control is provided.

It should be noted that in the absence of an operation conflict, the single-point swipe-up operation and single-point swipe-down operation above may be operations generated at any position in the interface. For example, in the interface 40b of FIG. 4b, there is only a single-point swipe-up operation, that is, an operation of pulling out the control area 42, so the single-point swipe-up operation may be generated at any position in the interface 40a. In another example, in FIG. 4e, there is only a single-point swipe-down operation, that is, an operation of retracting the control area 42, so the single-point swipe-down operation may be generated at any position in the interface 40c.

Figure 6A:
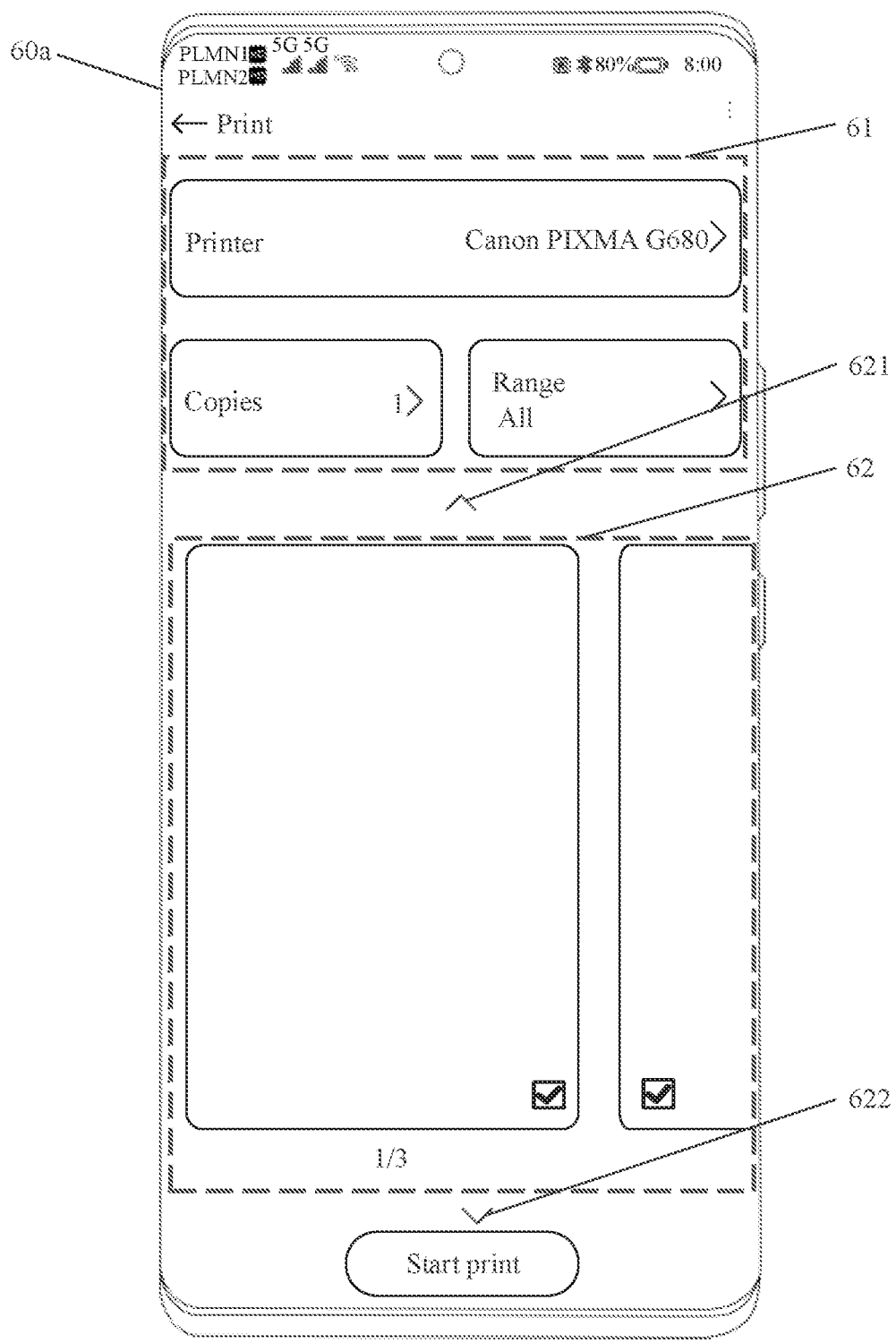
FIG. 6a is a schematic diagram of a graphical user interface of a seventeenth electronic device according to an embodiment of this application.

A second printing scenario is taken as an example. Still in the example of selecting three images in a camera interface 30a shown in FIG. 3 as printing objects, after a printing task is entered, the electronic device displays another printing task interface 60a as shown in FIG. 6a. The interface 60a includes at least a control area 61 and a preview area 62. Three frequently used controls are provided in the control area 61, and a plurality of preview objects are displayed in the preview area 62. Not all the preview objects are completely displayed in the preview area 62, and the user may view, in the preview area 62, all the preview objects by performing a swipe operation in the preview object arrangement direction.

Figure 6B:
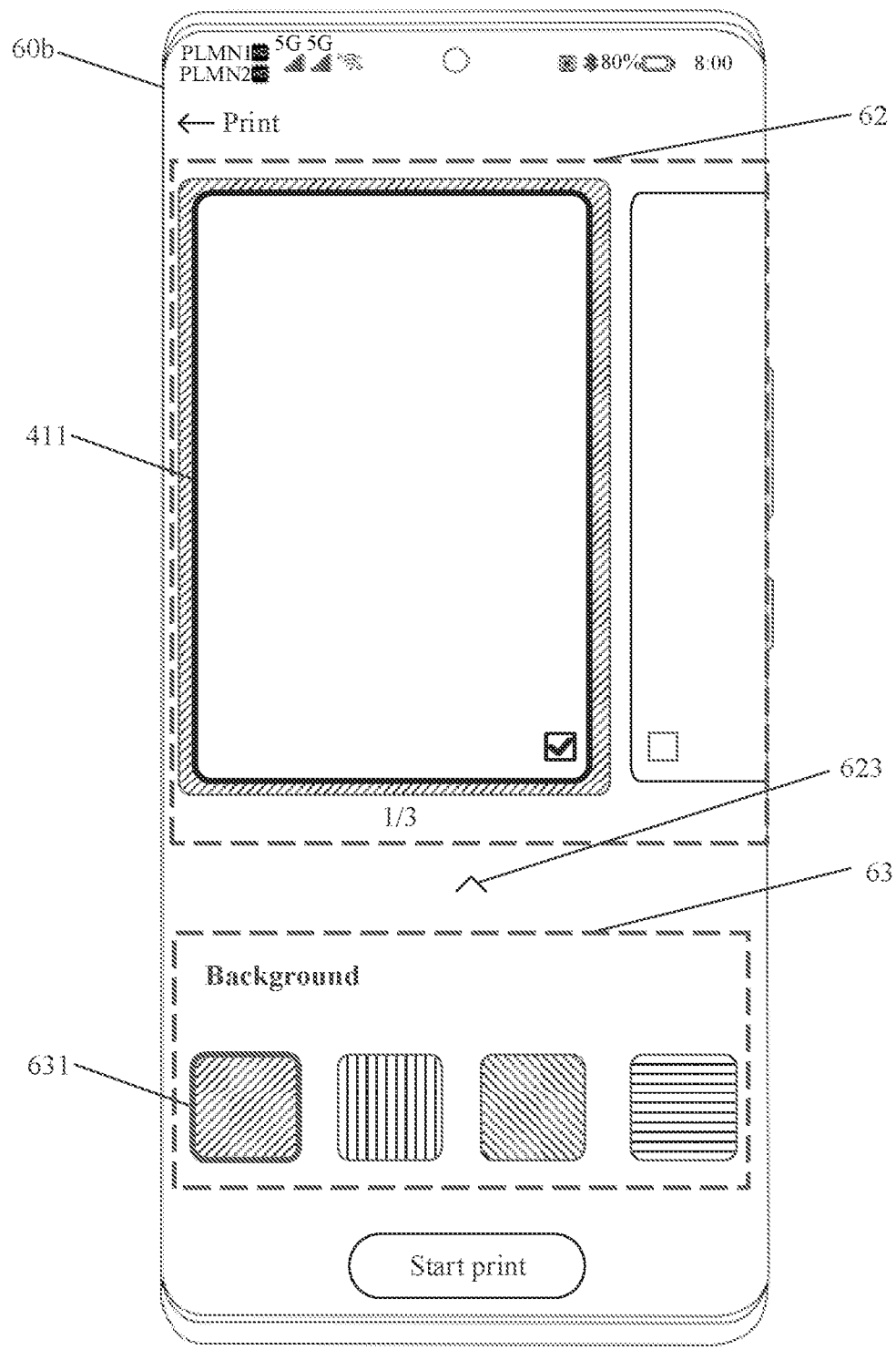
FIG. 6b is a schematic diagram of a graphical user interface of an eighteenth electronic device according to an embodiment of this application.

There is a sign 621 below the control area 61. The sign 621 is used for indicating that the control area 61 is allowed to be retracted upwards. There is a sign 622 below the preview area 62. The sign 622 is used for indicating that there is other content that can be dragged out below the preview area 62. As an example, the user swipes up with a single point in the interface 60a, and in response to the above operation, the electronic device displays an interface 60b as shown in FIG. 6b. In the interface 60b, the control area 61 is retracted upwards, the preview area 62 is moved upwards, and a background selection area 63 is displayed.

It should be noted that after the preview area 62 is moved up, the background selection area 63 is not content that may be uniquely displayed below the preview area 62, and other content may also be displayed below the preview area 62 moved up. Only the background selection area 63 is taken as an example for illustration.

A plurality of preset backgrounds are provided in the background selection area 63, and the user may swipe in a direction in which the plurality of backgrounds are arranged, to browse more backgrounds allowed to be selected. As an example, the user selects a background 631, and the first preview object 411 currently selected in the preview area 62 is displayed over the background 631.

Figure 6C:
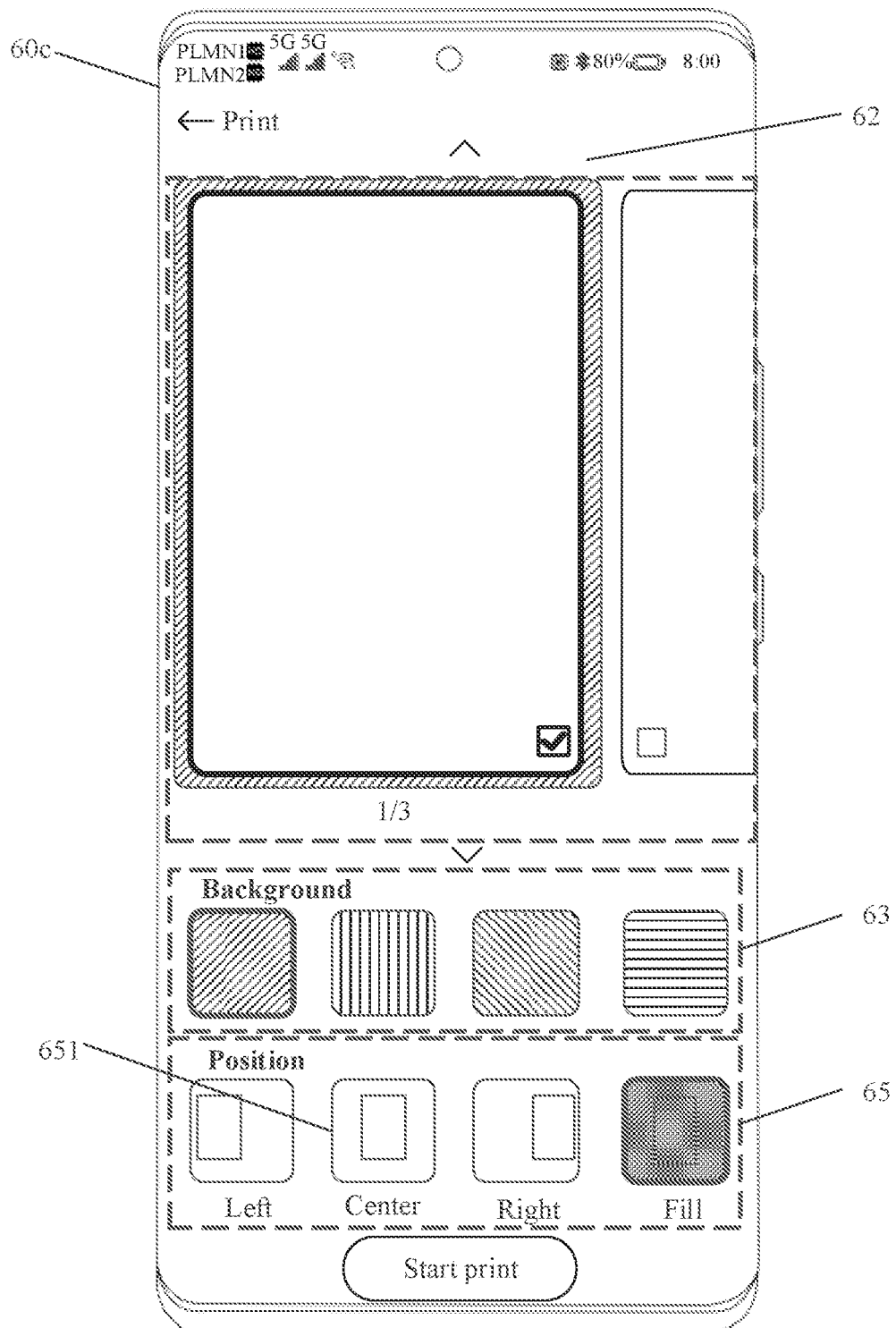
FIG. 6c is a schematic diagram of a graphical user interface of a nineteenth electronic device according to an embodiment of this application.

In the interface 60b, a sign 623 is also displayed above the background selection area 62. The sign 623 is used for indicating that the background selection area 63 is allowed to be swiped up to display more content. The user performs a single-point swipe-up operation in the interface 60b to drag out a position selection area 65, and the electronic device displays an interface 60c as shown in FIG. 6c. The position selection area 65 is used for providing a plurality of position options for the preview object in the background. In the example of the interface 60c, a center option 651 is selected, and the first preview object is centered and displayed on the selected background 631.

As an example, the user performs a single-point swipe-down operation in the interface 60c, and the display interface of the electronic device changes from 60c to the interface 60b. The user performs a single-point swipe-down operation on the interface 60b, and the display interface of the electronic device changes from 60b to 60a.

In this example, at least three states as shown in 60a, 60b, and 60c may be displayed in the printing task. In the three states, a position and a size of the preview area may change differently according to the user's operation, so that the preview object cannot be covered when the user calls up more content. When the user contracts some content, the preview object can occupy a larger area for display, thereby realizing a variable layout under different control requirements, preventing coverage of the preview object and facilitating the user to view a preview effect.

Figure 7A:
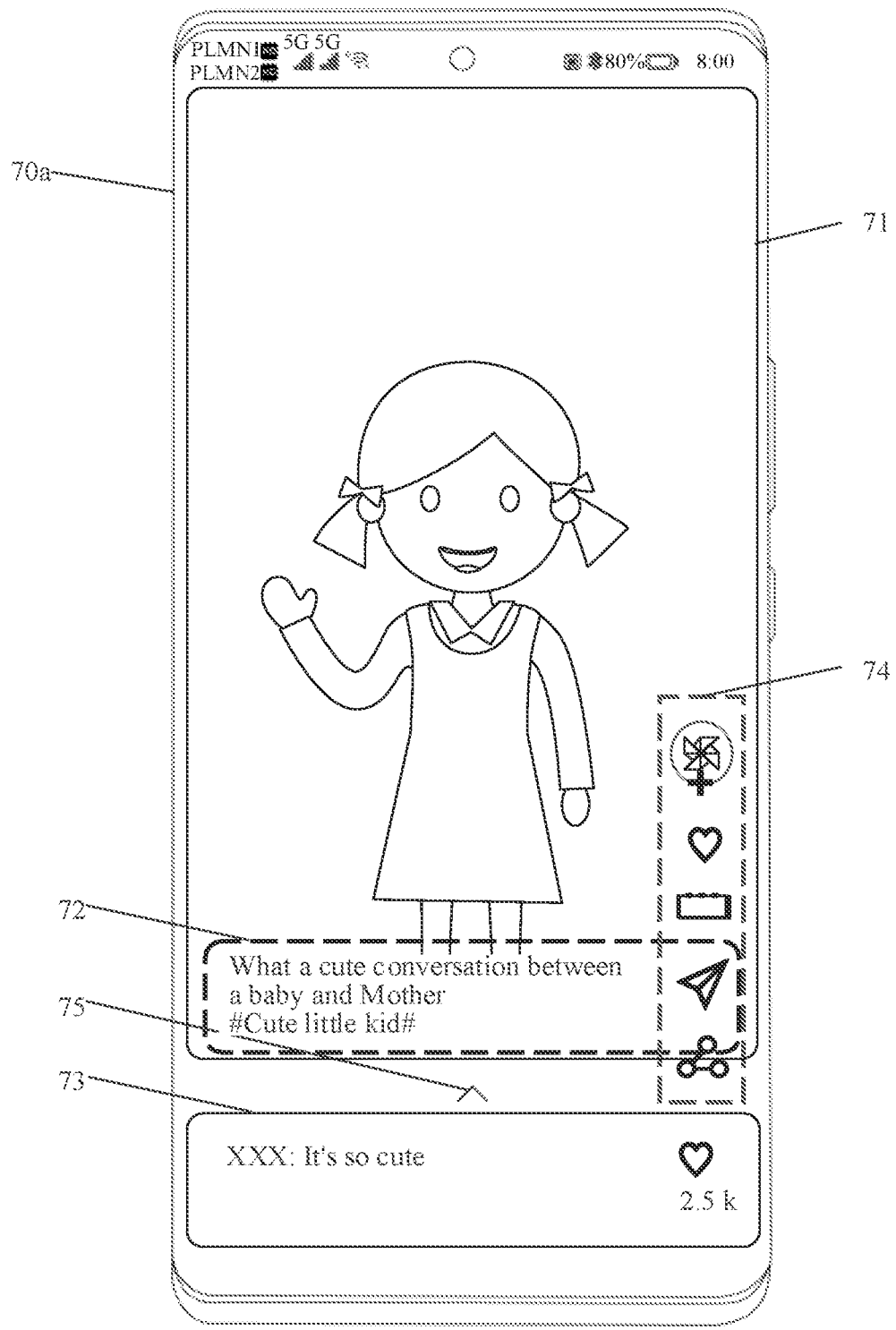
FIG. 7a is a schematic diagram of a graphical user interface of a twentieth electronic device according to an embodiment of this application.

A short video scenario is taken as an example below to illustrate the solution of this application. A short video application is installed on the electronic device, and the user starts the short video application through a preset operation on the electronic device. When the electronic device plays back a short video, the electronic device displays an interface 70a as shown in FIG. 7a. The interface 70a includes a video playback area 71, an information display area 72, and a comment area 73. The video playback area 71 is used for displaying a short video on a current page. The information display area 72 is used for displaying video information, such as a video name, video introduction information, and a topic carried by a video. The comment area 73 is used for displaying comment information of a current video. The video playback area 71 and the comment area 73 may be displayed in different areas of a same layer, and the information display area 72 may cover the video playback area 71. In another example, the information display area 72 may also be on a same layer as the video playback area 71 and the comment area 73. A plurality of operation controls 74 are also provided in an interface 70a. The operation controls 74 are all displayed on a top layer, and partially overlap with the video playback area 71, the information display area 72, and the comment area 73.

A proportion of the short video displayed in the above video playback area 71 is not limited, and the video playback area 71 may be filled with the short video when proportions of the short video and the video playback area 71 are the same. The video may be centered and displayed in the video playback area 71 when the proportions of the short video and the video playback area 71 are different.

TopN comments may be displayed in the comment area 73 according to a quantity of likes of the short video currently played back or according to a quantity of comment replies. When there is no comment on the short video, the comment area 73 may be hidden or display information for prompting the user to make comments, for example, Come and speak your mind!

Still referring to FIG. 7a, there is a sign 75 above the comment area 73. The sign 75 is used for indicating that there is other content below the comment area. This part of content may be content belonging to the comment area 73 or another functional area, such as recommendation information for recommending other highly praised videos of a current host. Expanded content is taken as comment information for illustration below.

Figure 7B:
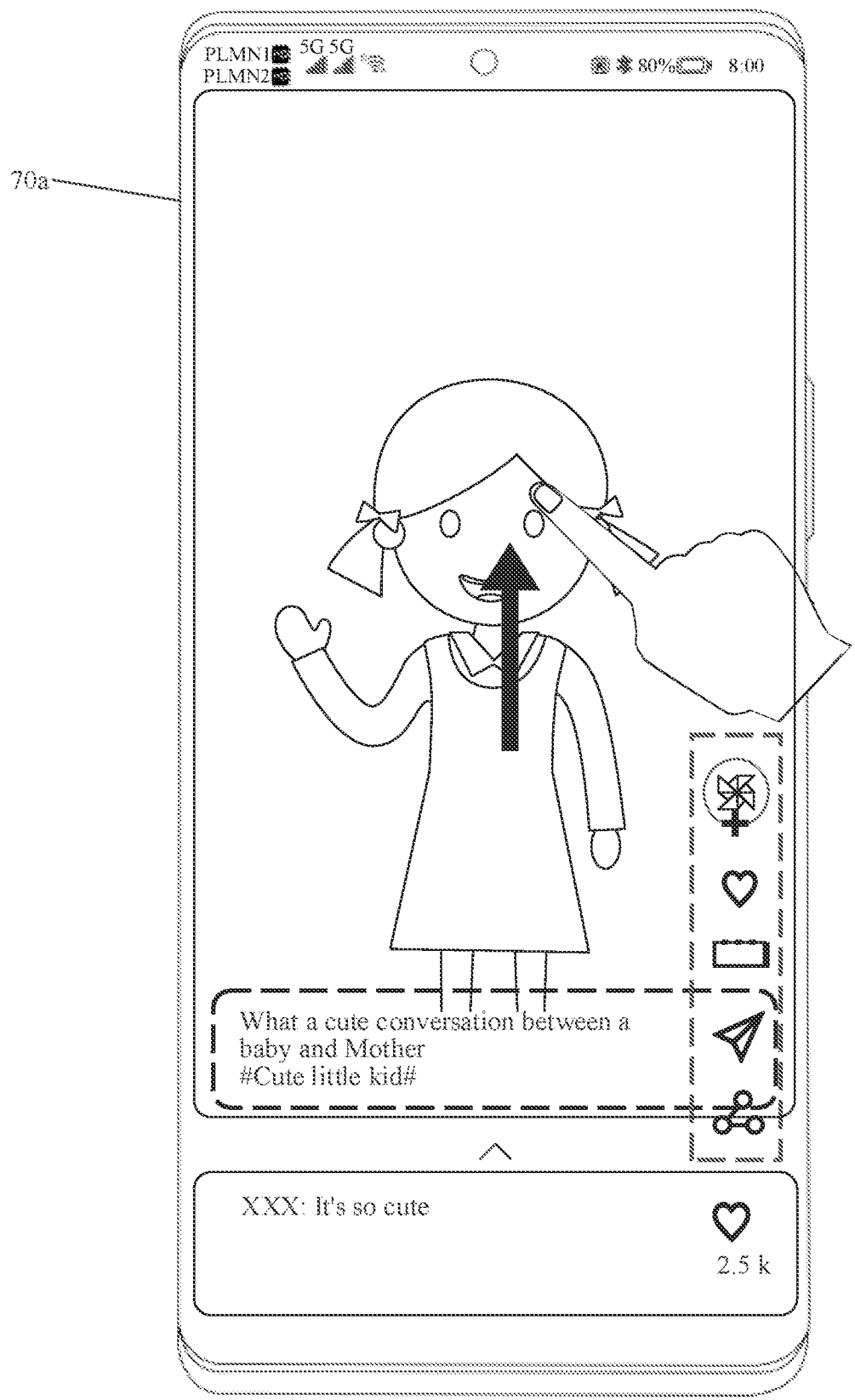
FIG. 7b is a schematic diagram of a graphical user interface of a twenty-first electronic device according to an embodiment of this application.

As an example, the user performs the single-point swipe-up operation in the interface 70a, and the single-point swipe-up operation is generated in the video playback area 71, specifically as shown in FIG. 7b. The operation triggers swiping up of the short video in the video playback area 71 and playback of next recommended short video.

Figure 7C:
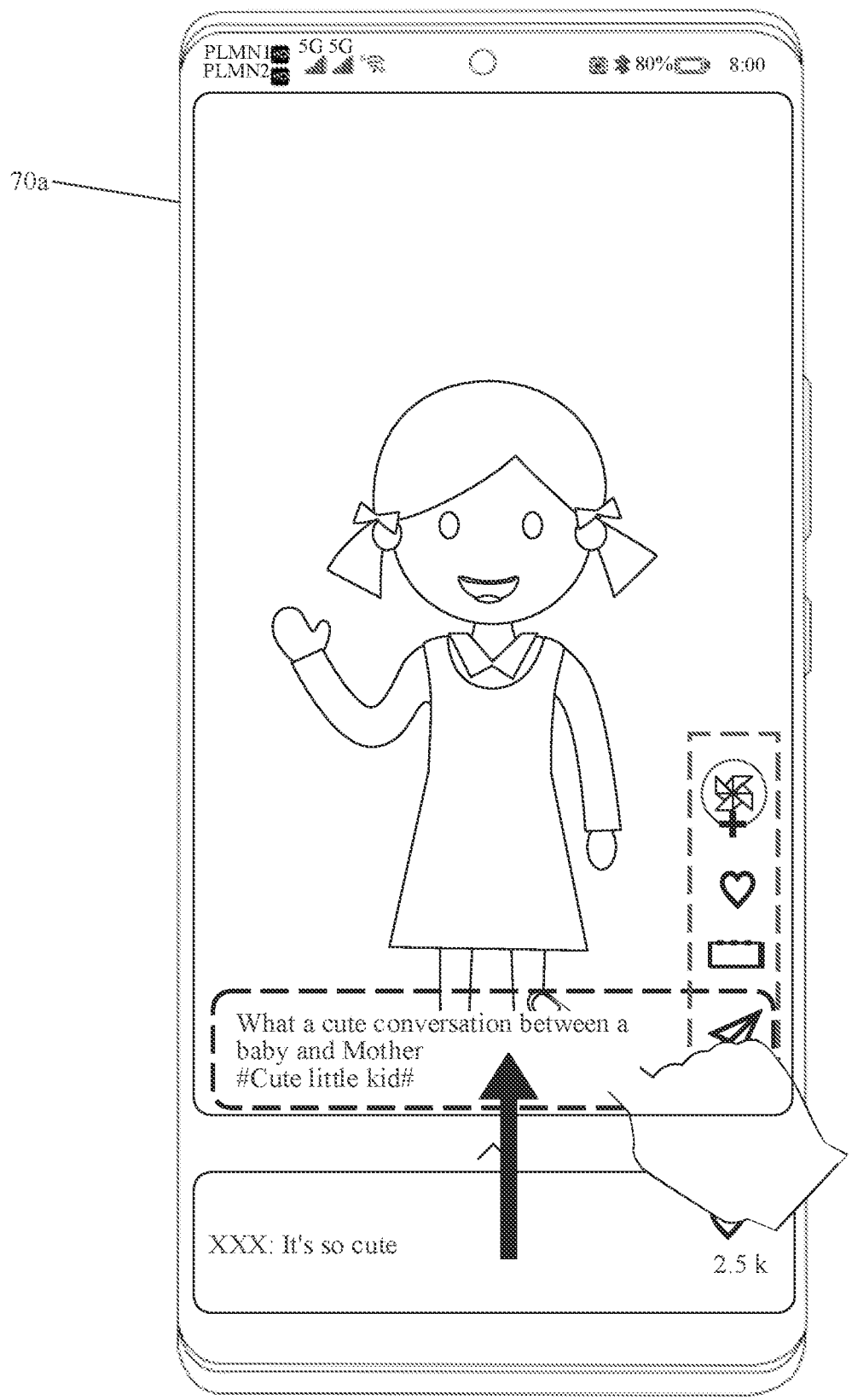
FIG. 7c is a schematic diagram of a graphical user interface of a twenty-second electronic device according to an embodiment of this application.
Figure 7D:
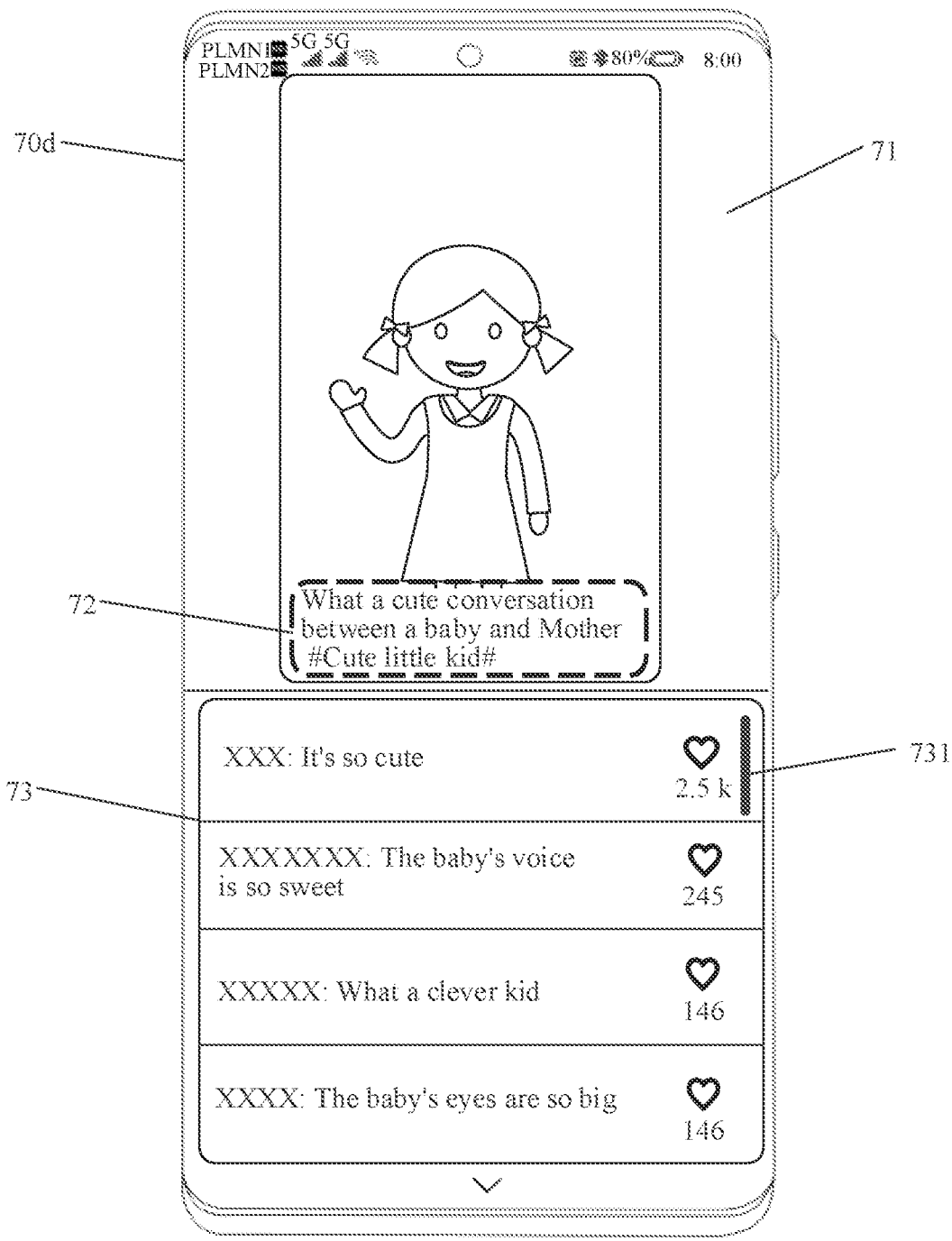
FIG. 7d is a schematic diagram of a graphical user interface of a twenty-third electronic device according to an embodiment of this application.

As an example, the user performs a single-point swipe-up operation as shown in FIG. 7c in the interface 70a, and a down point of the single-point swipe-up operation is in the comment area 73. In response to the above single-point swipe-up operation, the electronic device displays an interface 70d as shown in FIG. 7d. In the interface 70d, the comment area 73 is pulled out, the video playback area 71 moves upwards, the operation control 74 is hidden, the video playback area 71 is reduced, and the short video in the video playback area 71 is proportionally reduced and displayed.

In the case of more video comments, all the comments cannot be fully displayed in the comment area 73 pulled out. The comment area 73 pulled out includes a scroll bar 731, and all comments on a current short video may be previewed by pulling the scroll bar 731.

Figure 7E:
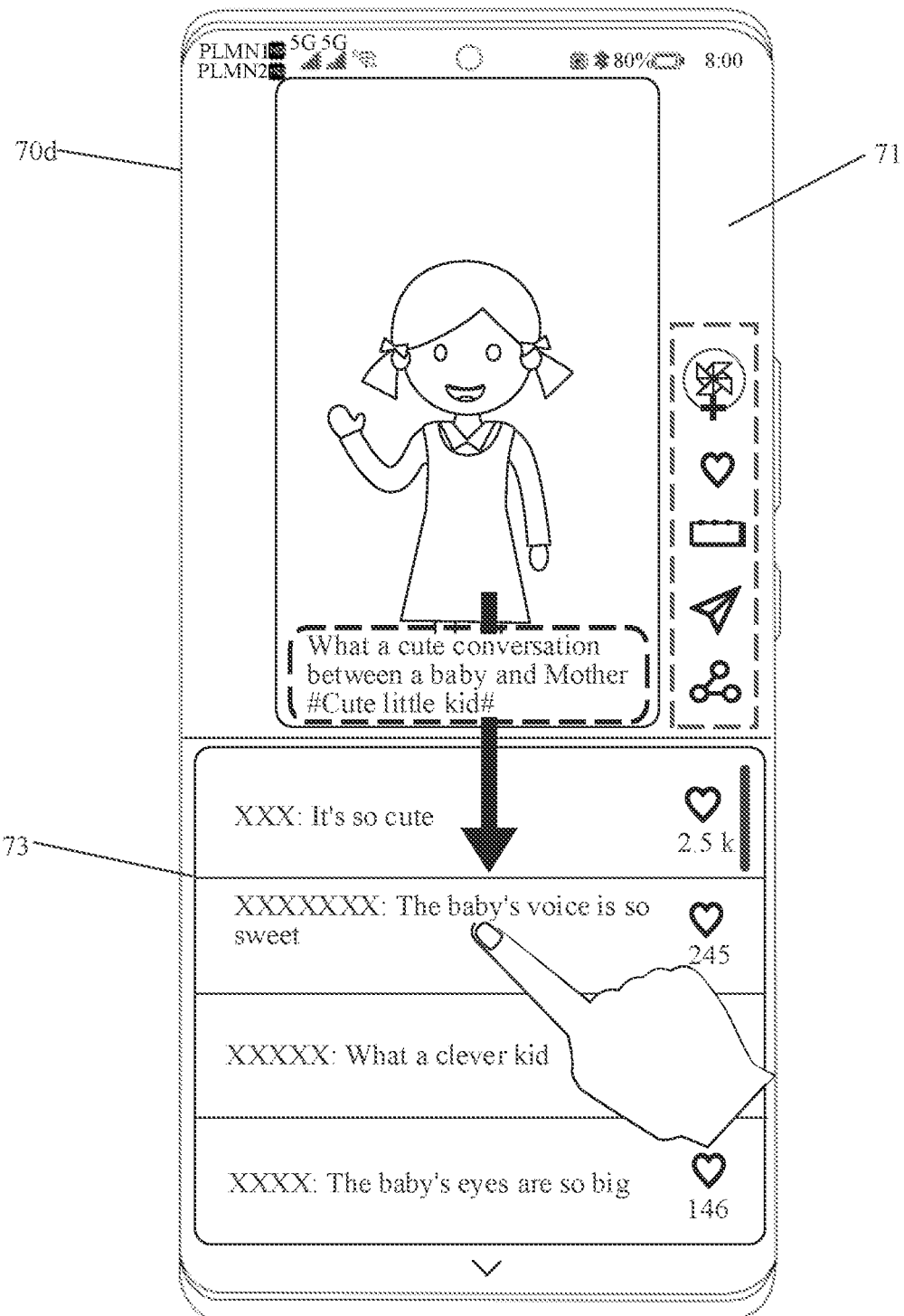
FIG. 7e is a schematic diagram of a graphical user interface of a twenty-fourth electronic device according to an embodiment of this application.
Figure 7F:
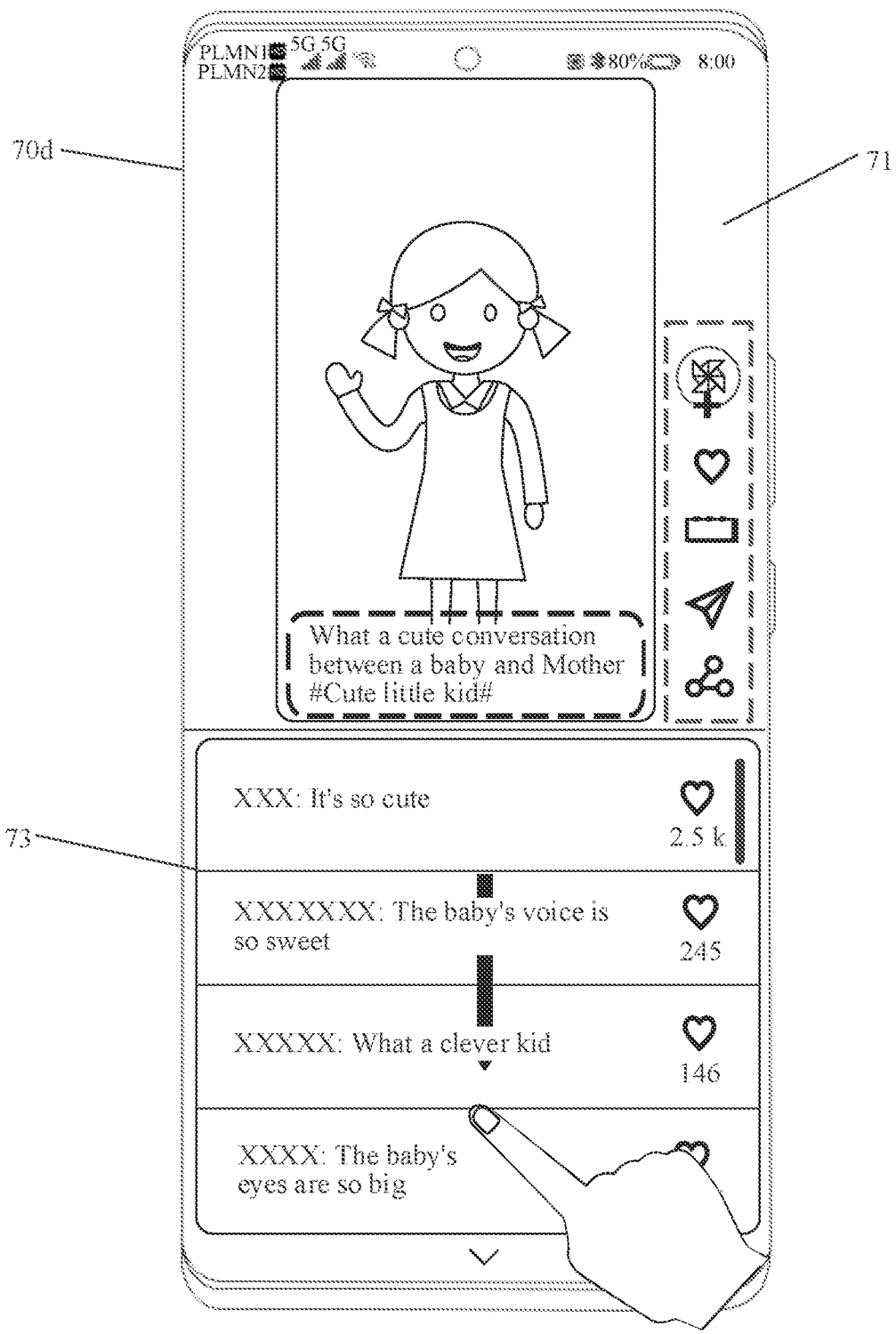
FIG. 7f is a schematic diagram of a graphical user interface of a twenty-fifth electronic device according to an embodiment of this application.

As an example, referring to FIG. 7e, in the example, a down point of the single-point swipe-down operation falls in the video playback area 71, and an up point falls in the comment area 73. In response to this operation, the comment area 73 pulled out is contracted, and the electronic device displays the interface 70a as shown in FIG. 7a. In another example, referring to FIG. 7f, the user performs a single-point swipe-down operation in an interface 70e, and comment content in the comment area 73 is scrolled up. When the comment content in the comment area 73 is pulled to the top, the comment area 73 pulled out is contracted, and the electronic device displays the interface 70a as shown in FIG. 7a. In another example, in response to a single-point swipe-down operation in which both a down point and an up point fall in the video playback area 71, a previous short video is displayed in the video playback area 71.

Figure 7G:
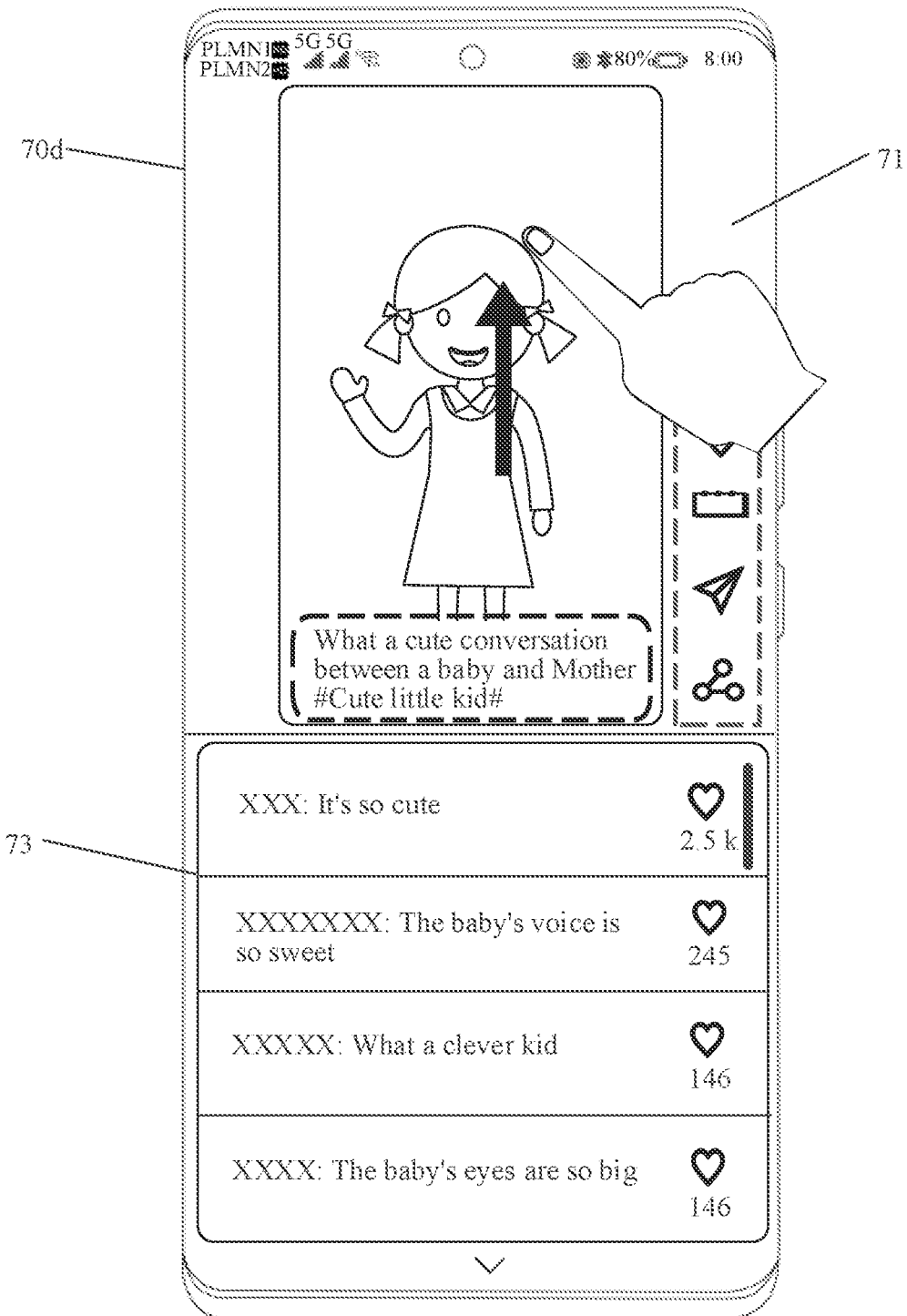
FIG. 7g is a schematic diagram of a graphical user interface of a twenty-sixth electronic device according to an embodiment of this application.

As an example, referring to FIG. 7g, the user performs a single-point swipe-up operation 77 in the interface 70e, and a down point and an up point of the operation fall in the video playback area 71. In response to this operation, next short video is displayed in the video playback area 71. When the video playback area 71 is switched from the current video to the next short video, the comment area 73 is automatically closed, and layout of the interface is the same as that of 70a.

It should be noted that the above operations are only used as an example to illustrate some of the operations allowed in the interface 70d, and other operation manners or combinations of operation manners may also be used for performing the above operations. Details are not described herein again.

The above embodiments provide layout changes in the task interface including the preview area in three different scenarios. It may be understood that, in addition to the above three scenarios, in other scenarios, in order to take into account both control and preview, interface layout schemes that correspondingly adapt to a size and a position of the preview area according to different operations all fall within the protection scope of the solution.

Still in the printing scenario, this solution may also have other implementations.

Figure 8A:
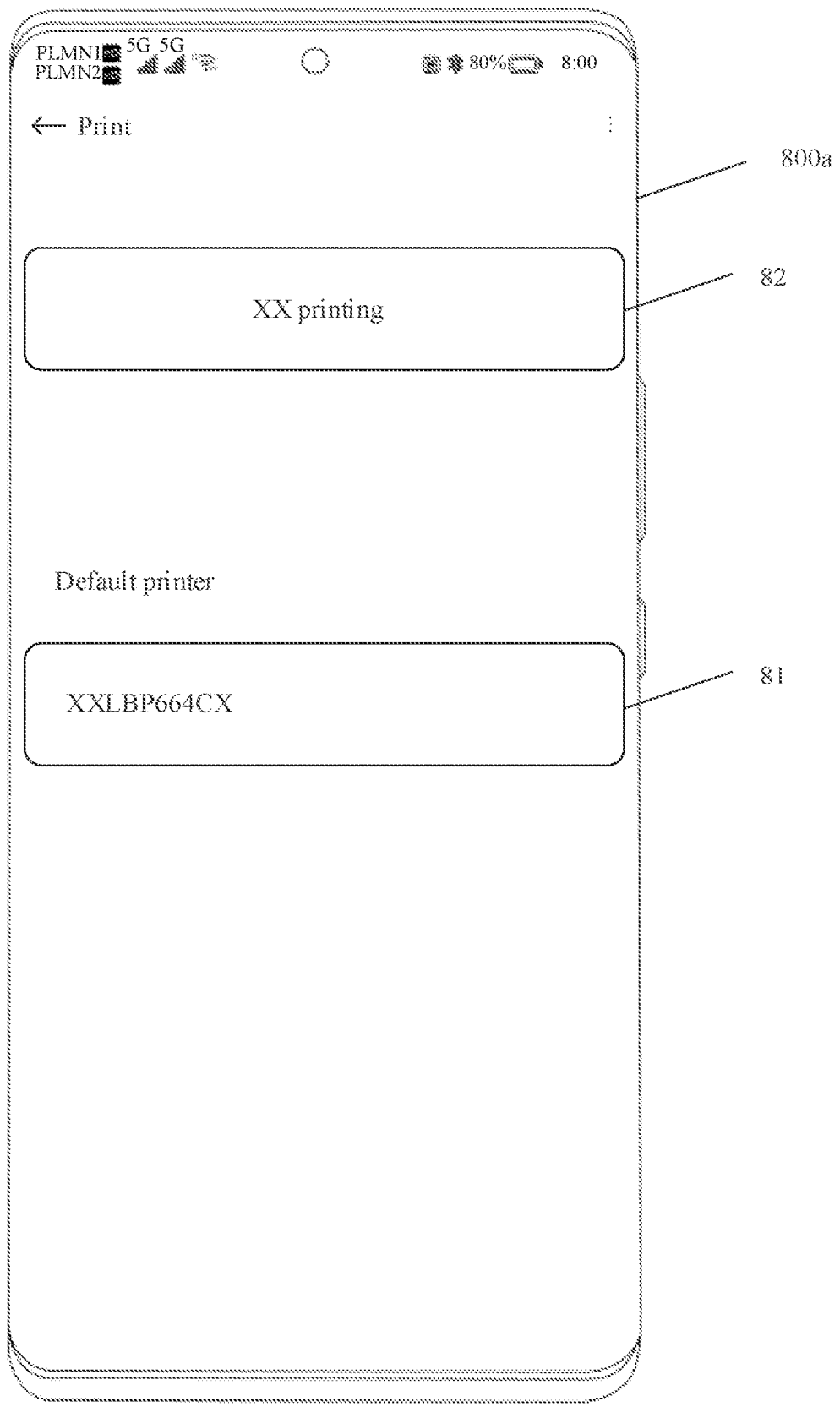
FIG. 8a is a schematic diagram of a graphical user interface of a twenty-seventh electronic device according to an embodiment of this application.
Figure 8B:
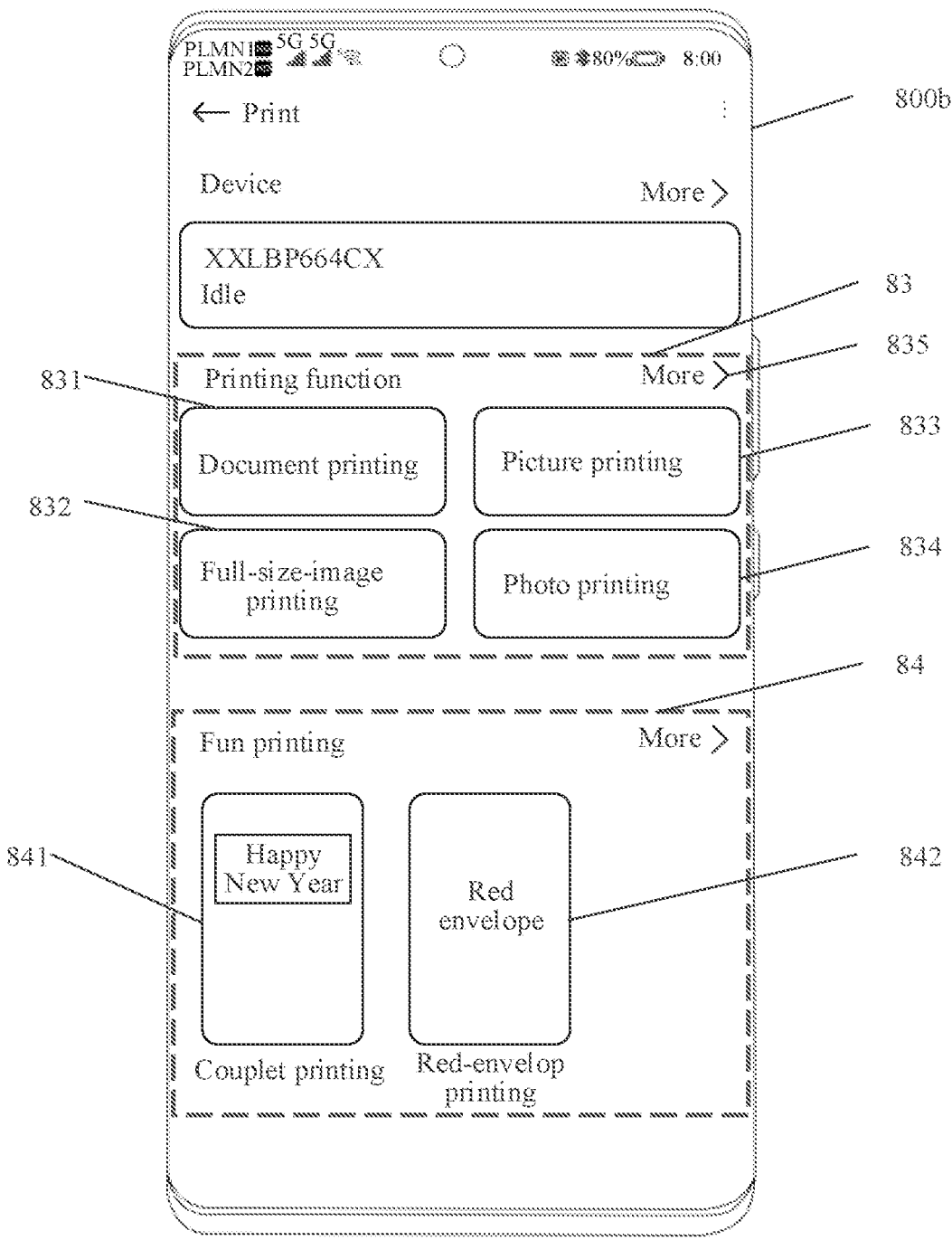
FIG. 8b is a schematic diagram of a graphical user interface of a twenty-eighteenth electronic device according to an embodiment of this application.
Figure 8C:
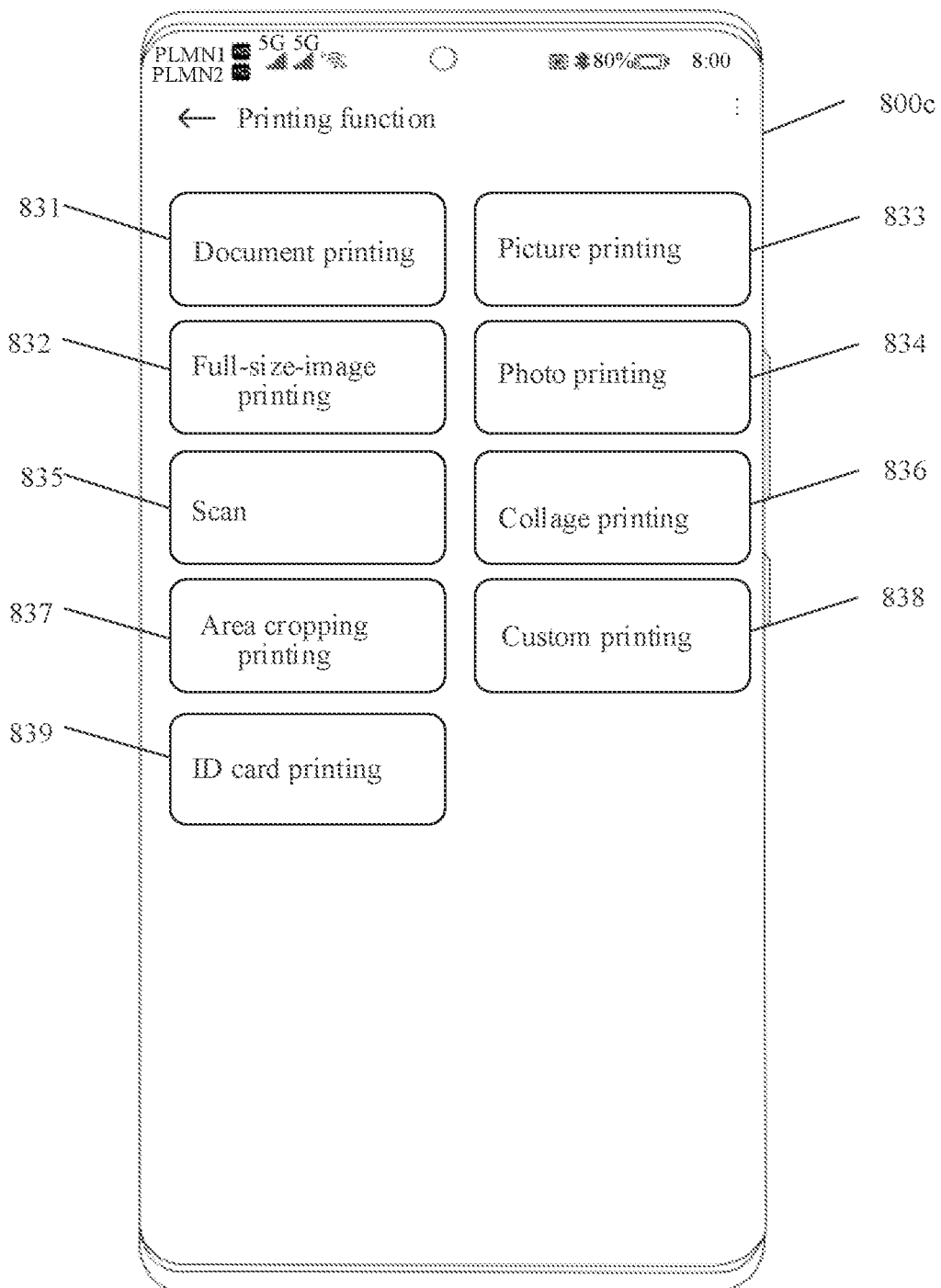
FIG. 8c is a schematic diagram of a graphical user interface of a twenty-ninth electronic device according to an embodiment of this application.
Figure 8D:
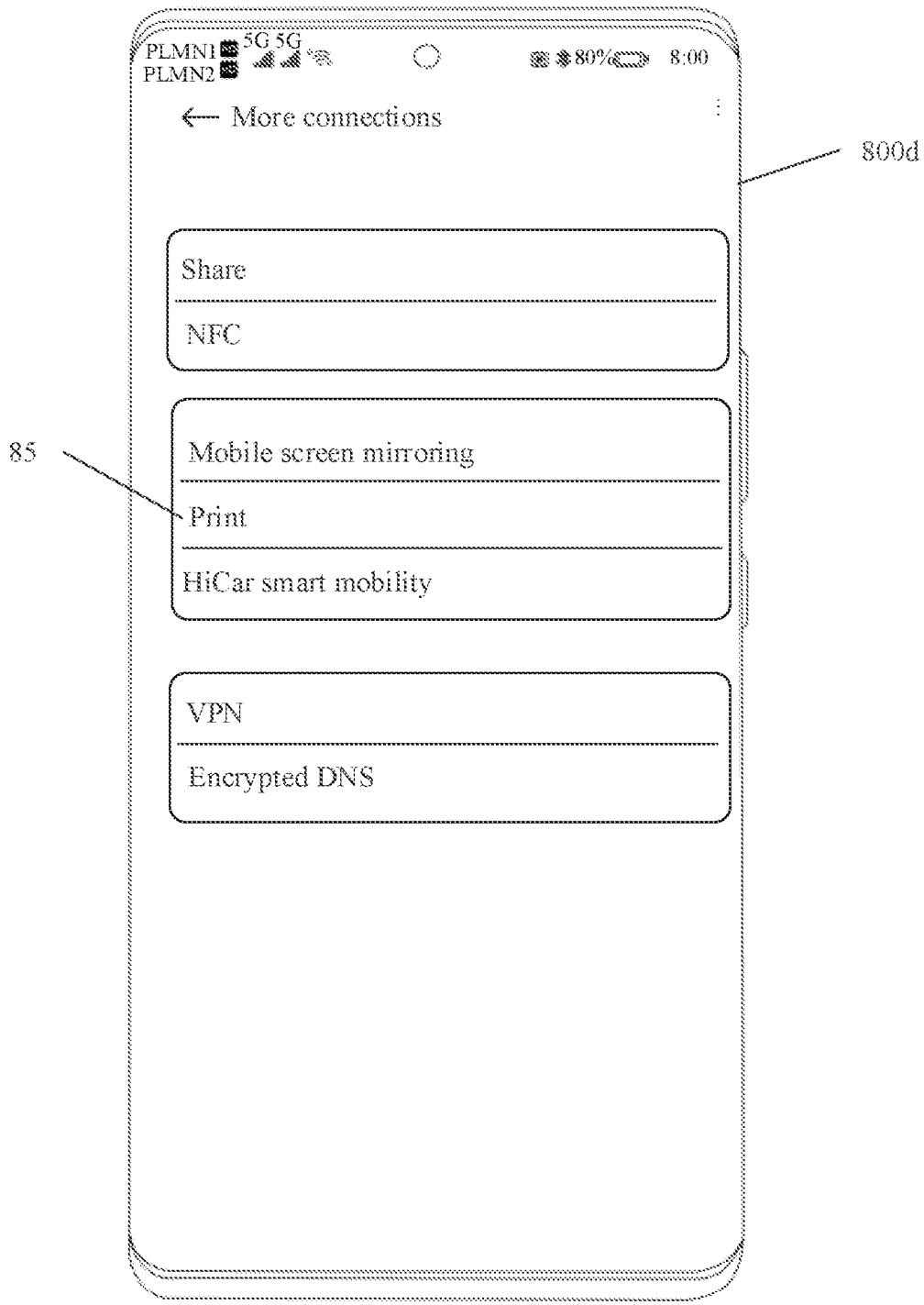
FIG. 8d is a schematic diagram of a graphical user interface of a thirtieth electronic device according to an embodiment of this application.

FIG. 8d is another schematic diagram of entering a printing task. An interface 800d as shown in FIG. 8d may be entered by setting more connections in the electronic device, a print control 85 in the interface 800d is triggered, and the interface 800a as shown in FIG. 8a is entered. Two entries are provided in the interface 800a. The first entry is a printer connection entry 81, and the other entry is a printing entry 82 for entering a printing task. The user touches the printing entry 82 to enter the printing task. After the second printing entry 82 is selected in the interface 800a, the electronic device displays a printing task interface 800b as shown in FIG. 8b. Two types of printing functions are provided in the interface 800b, which are specifically a first-type printing function 83 and a second-type printing function 84. In the interface 800b, the first-type printing function 83 includes: a document printing function 831, a full-size-image printing function 832, a picture printing function 833, and an album printing function 834.

In the interface 800b shown in FIG. 8b, there is also a sign control 835 in the printing function area 83, and the sign control 835 is used for indicating that other functions not displayed in the interface 800b may also be provided. The user clicks the sign control 835, and the electronic device displays an interface 800c as shown in FIG. 8c. More printing functions that the electronic device can provide are displayed in the interface 800c, including: a scanning function 835, a collage printing function 836, an area cropping printing function 837, a custom printing function 838, and an ID card printing function 839. In some examples, there may be more or fewer functions than in the interface 800c.

Figure 9A:
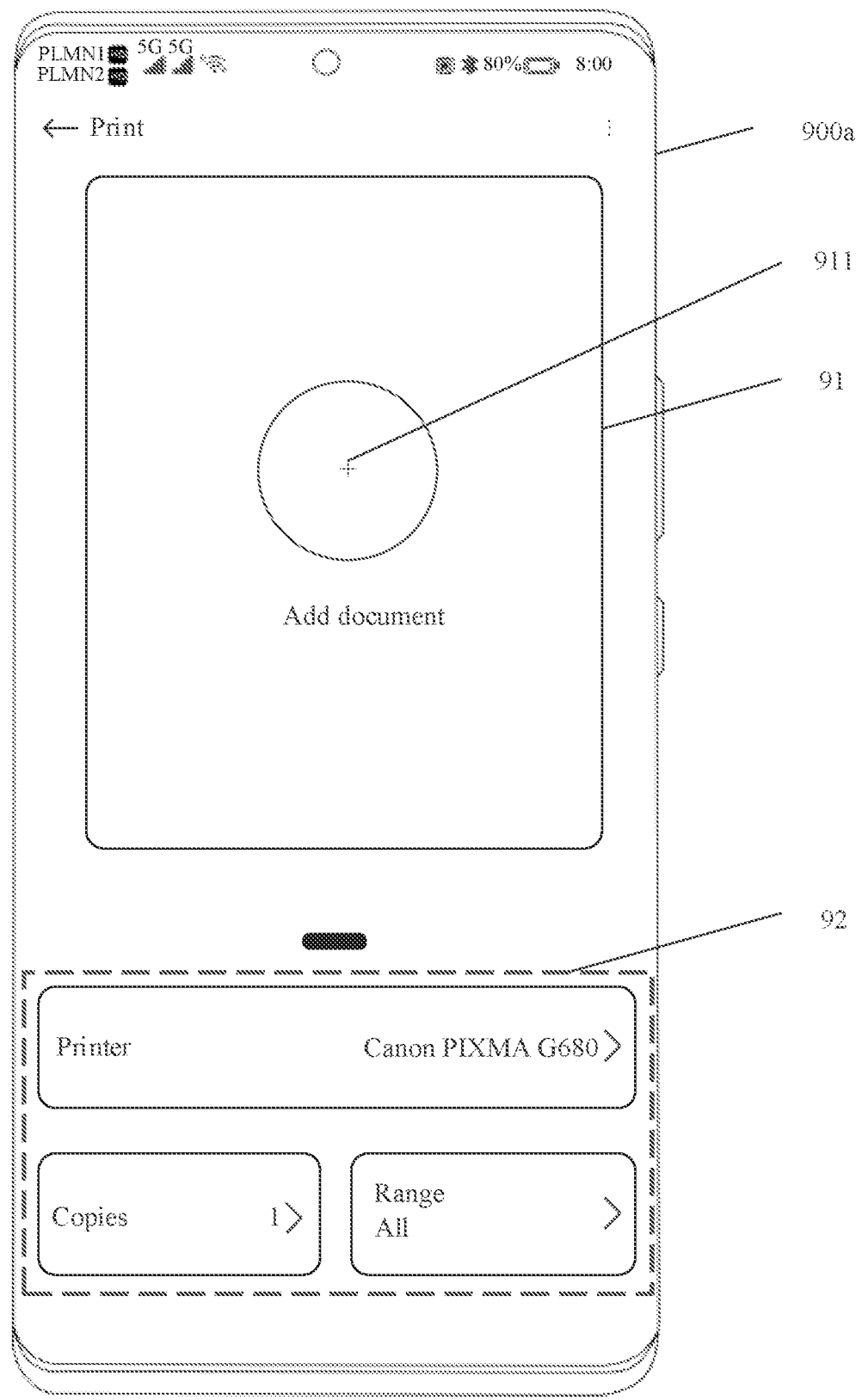
FIG. 9a is a schematic diagram of a graphical user interface of a thirty-first electronic device according to an embodiment of this application.
Figure 9B:
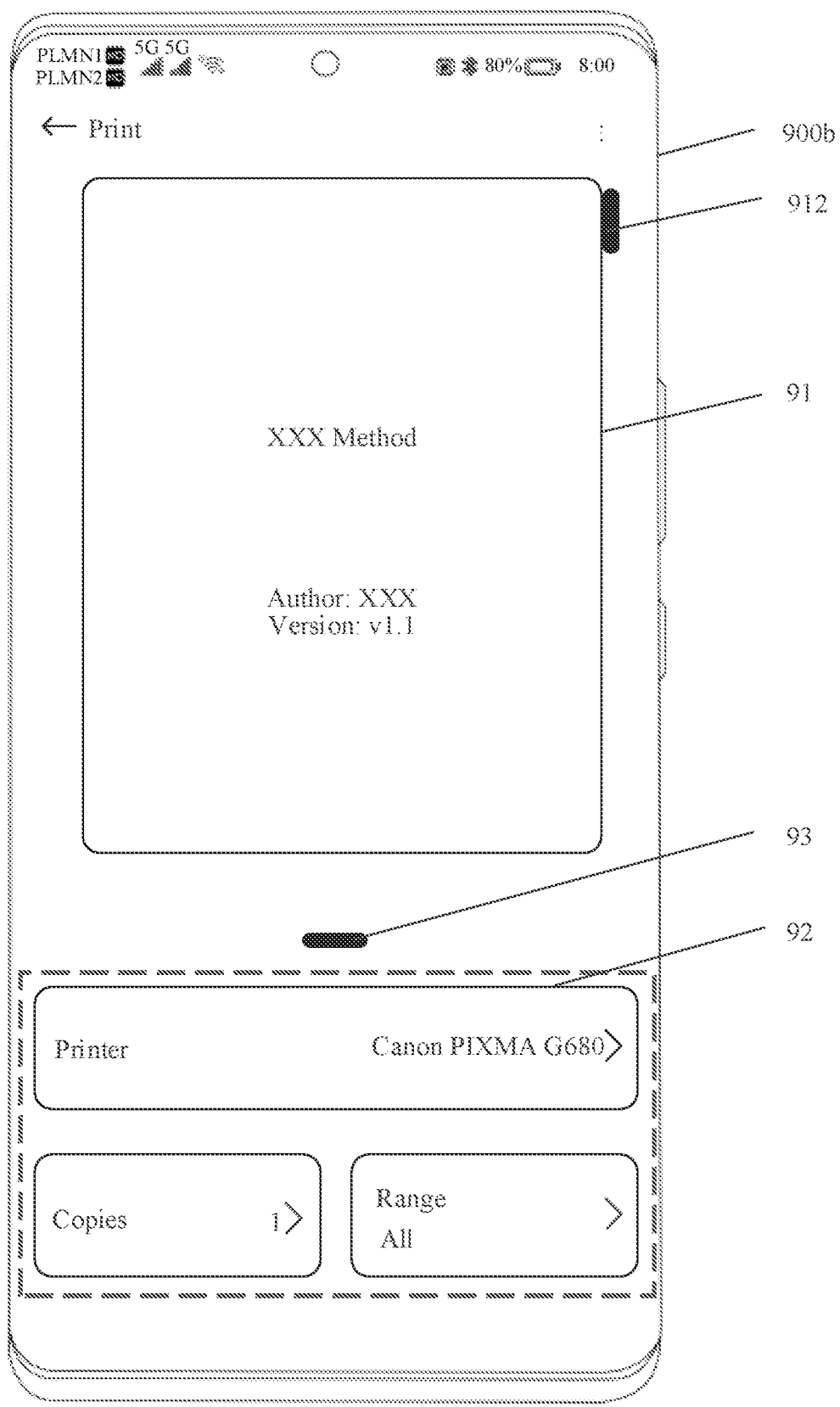
FIG. 9b is a schematic diagram of a graphical user interface of a thirty-second electronic device according to an embodiment of this application.

As an example, the user triggers the document printing function 831, and the electronic device displays an interface 900a as shown in FIG. 9a. The interface 900a includes a preview box 91 and a control area 92. A document adding control 911 is displayed at a preset position in the preview box 91. The user clicks the document adding control 911, and the electronic device displays a document selection interface 900e as shown in FIG. 9e. The user selects a to-be-printed document in the document selection interface 900e and clicks a completion control 96. The electronic device enters a printing interface with a same layout as the interface 40a and displays the to-be-printed document selected by the user in the preview area 41.

Figure 9C:
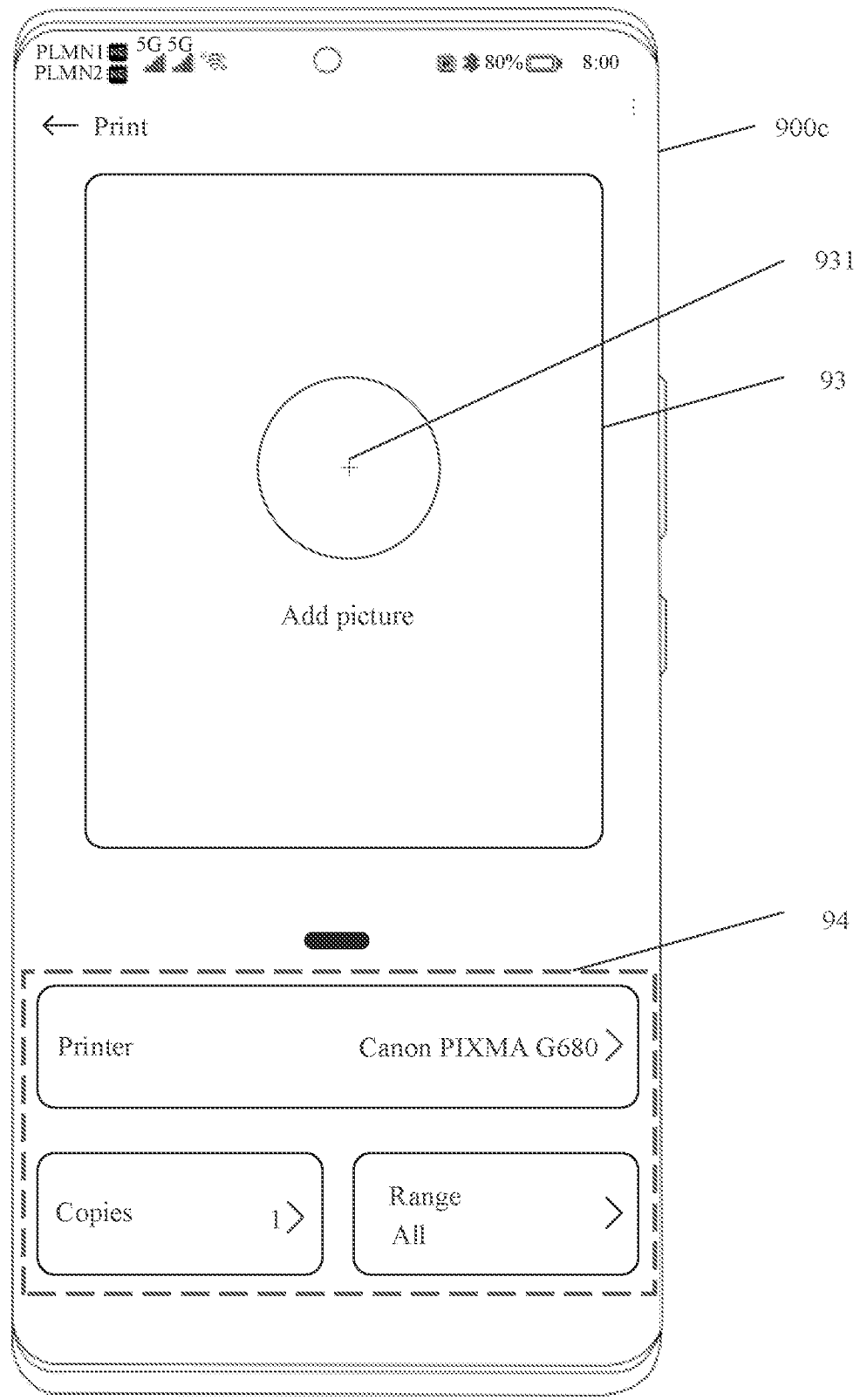
FIG. 9c is a schematic diagram of a graphical user interface of a thirty-third electronic device according to an embodiment of this application.
Figure 9D:
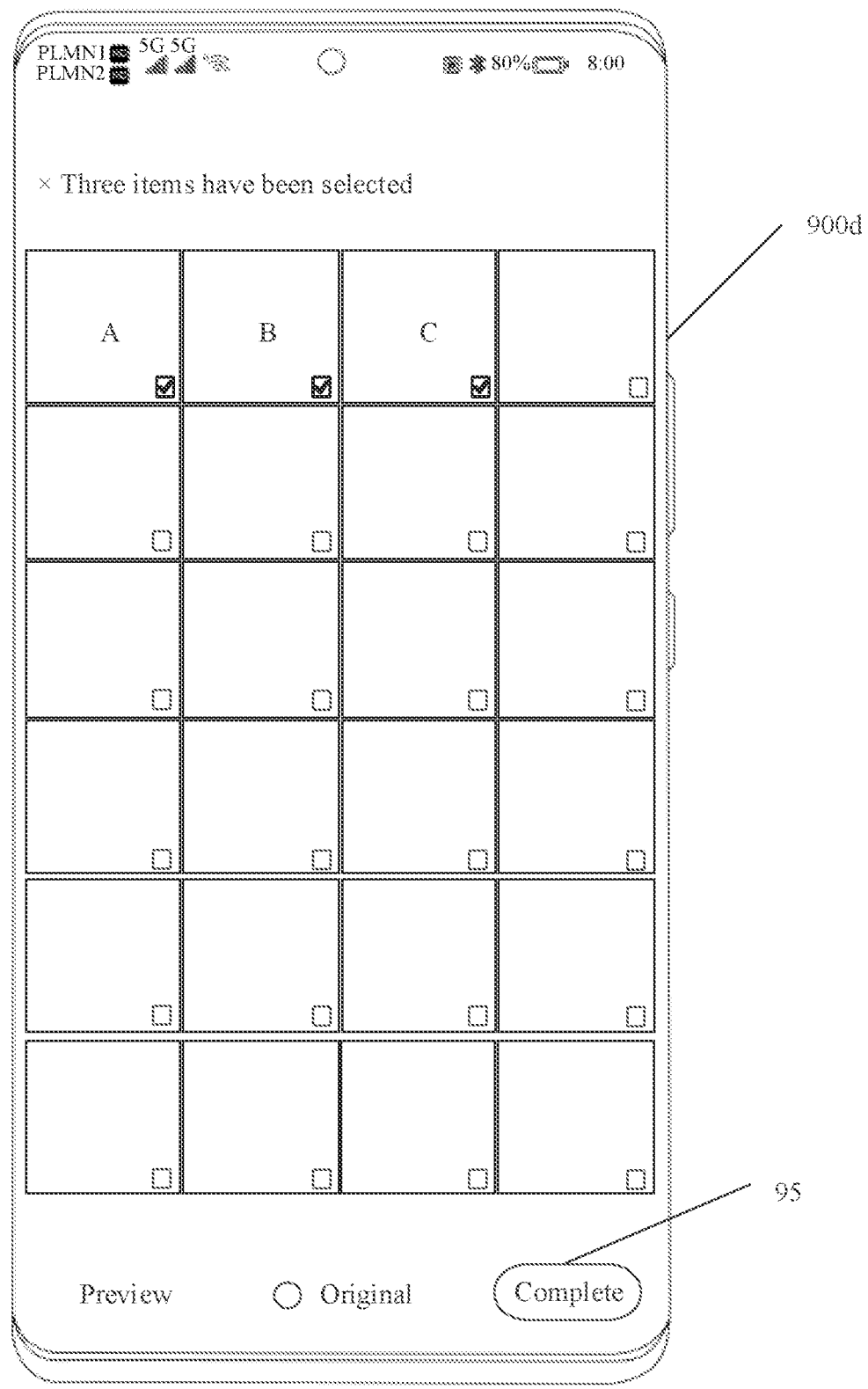
FIG. 9d is a schematic diagram of a graphical user interface of a thirty-fourth electronic device according to an embodiment of this application.
Figure 9E:
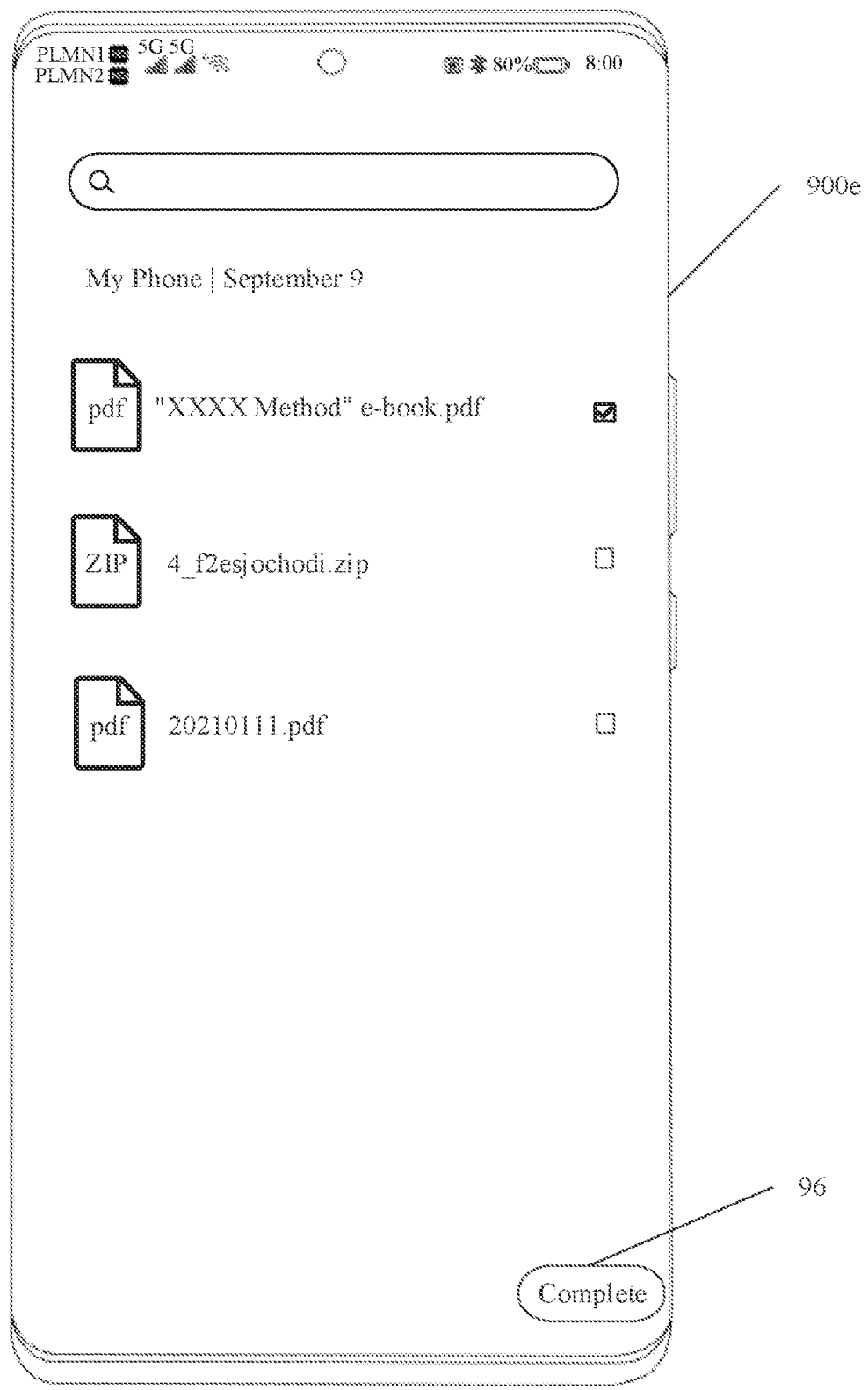
FIG. 9e is a schematic diagram of a graphical user interface of a thirty-fifth electronic device according to an embodiment of this application.

As an example, the user triggers the picture printing function 833, and the electronic device displays an interface 900c as shown in FIG. 9c. The interface 900c includes: a preview box 93 and a control area 94. A picture adding control 931 is displayed at a preset position in the preview box 93. The user clicks the picture adding control 931, and the electronic device displays a picture selection interface 900d as shown in FIG. 9d. The user selects a to-be-printed picture in the picture selection interface 900d and clicks the completion control 95. The electronic device enters a printing interface with a same layout as the interface 40a and displays the to-be-printed picture selected by the user in the preview area 41.

In the above embodiments, a document may be printed through the document printing function 831 or printed in the manner shown in FIG. 3c. Document printing services provided by the two are the same, and a difference is as follows. When the document is printed through the document printing function 831, the printing task is entered first, and then a to-be-printed document is selected. When the document is printed in the manner shown in FIG. 3c, the to-be-printed document is selected first, and then the printing task is entered.

In the above embodiments, a picture may be printed through the picture printing function 833 or printed in the manner shown in FIG. 3b. Picture printing services provided by the two are the same, and a difference is as follows. When the picture is printed through the picture printing function 833, the printing task is entered first, and then a to-be-printed picture is selected. When the picture is printed in the manner shown in FIG. 3b, the to-be-printed picture is selected first, and then the printing task is entered.

Figure 10A:
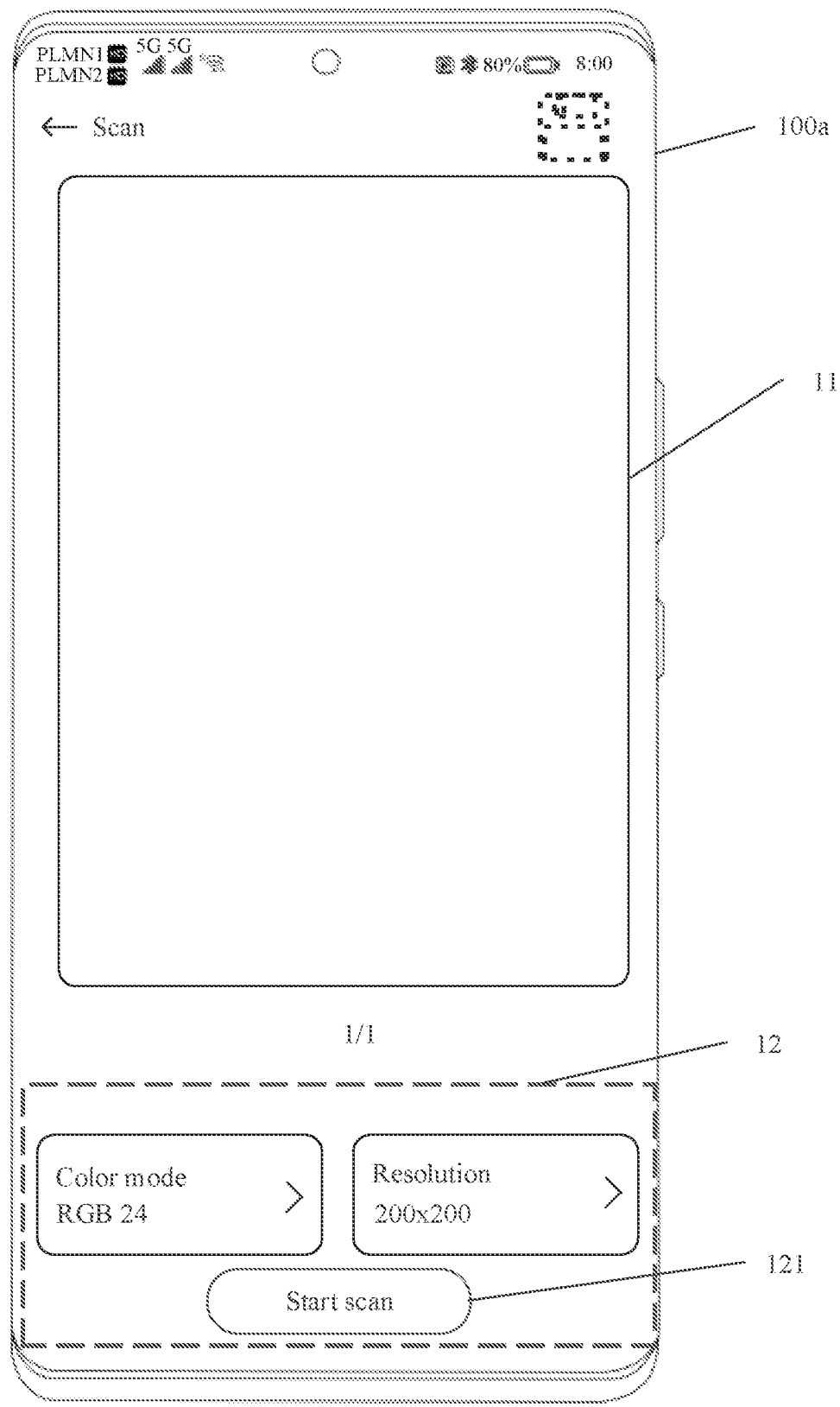
FIG. 10a is a schematic diagram of a graphical user interface of a thirty-sixth electronic device according to an embodiment of this application.
Figure 10B:
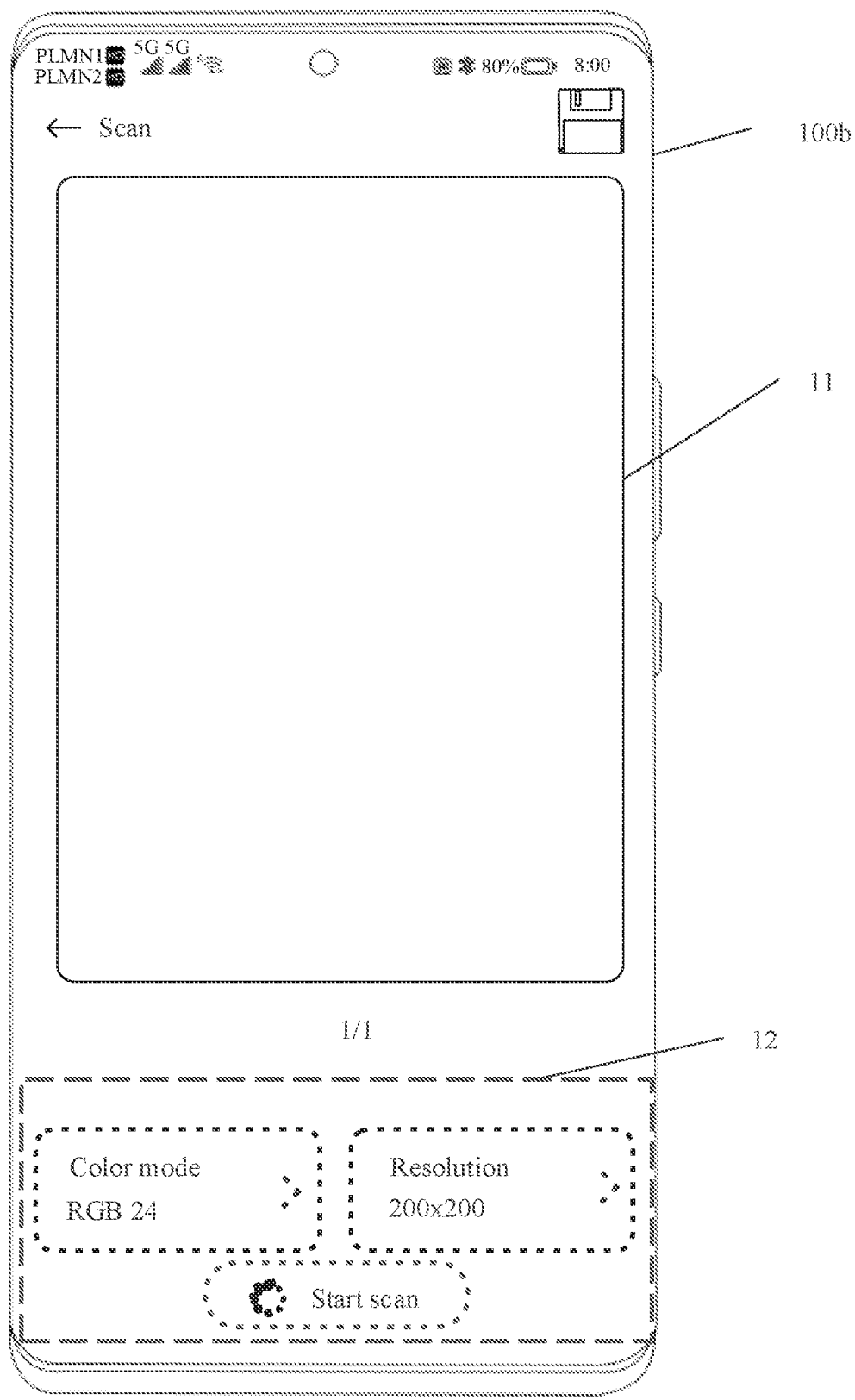
FIG. 10b is a schematic diagram of a graphical user interface of a thirty-seventh electronic device according to an embodiment of this application.
Figure 10C:
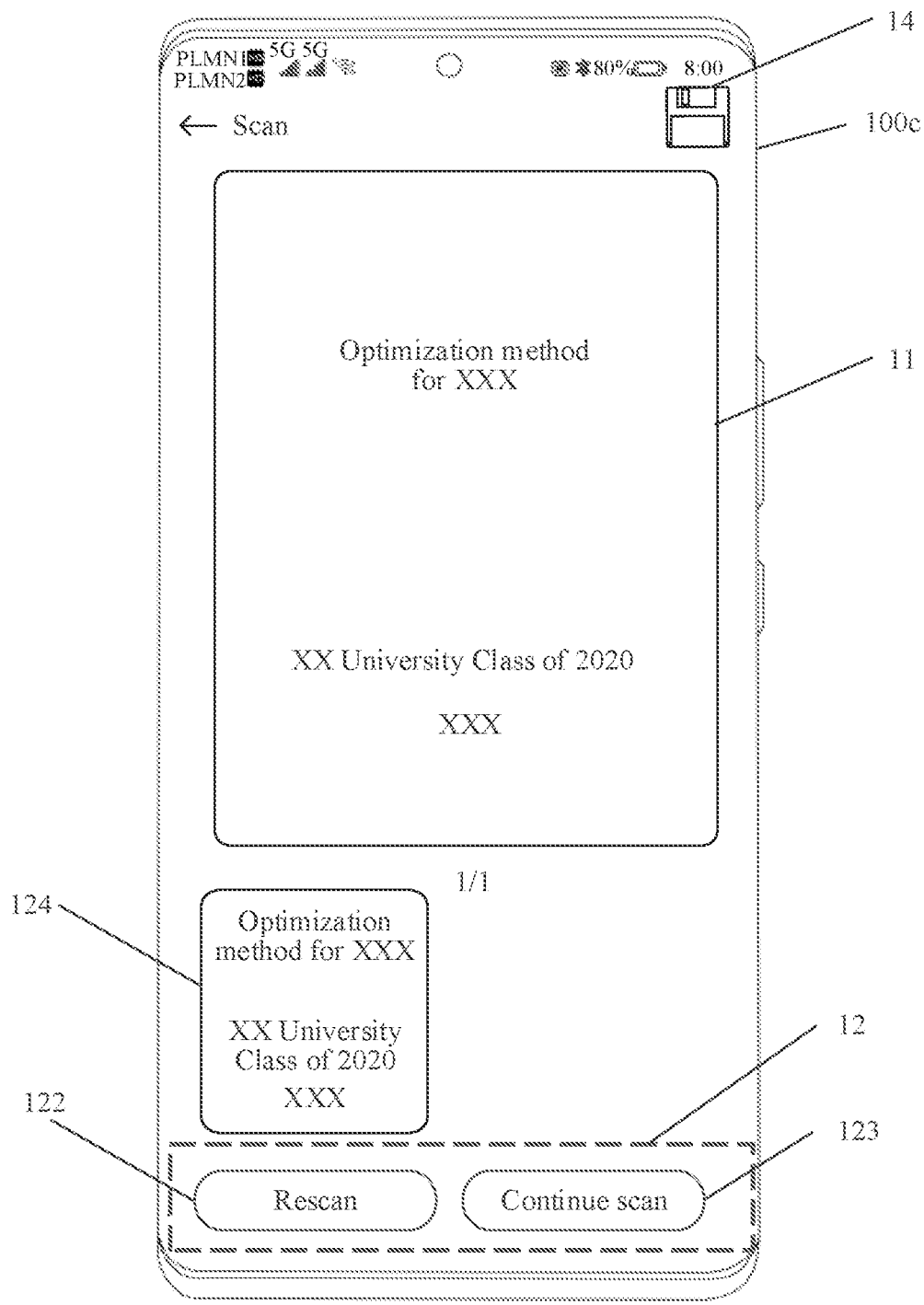
FIG. 10c is a schematic diagram of a graphical user interface of a thirty-eighth electronic device according to an embodiment of this application.

As an example, the user triggers the scanning function 835, and the electronic device displays an interface 100a as shown in FIG. 10a. The interface 100a includes a preview area 11 and a control area 12. The user clicks a scanning start control 121, and the electronic device executes a scanning task and displays an interface 100b as shown in FIG. 10b. In the interface 100b, a control in the control area 12 cannot be triggered, and the sign 111 is used for identifying a number of pages currently scanned, for example, 1/1 means that a currently scanned page number is the first page and a total of one page is scanned. After the scanning of the current page, the electronic device displays an interface 100c as shown in FIG. 10c. A scanning result, a scanning result thumbnail 124, a rescan control 122, and a continue scan control 123 are displayed in the preview area 11 of the interface 100c.

Figure 10D:
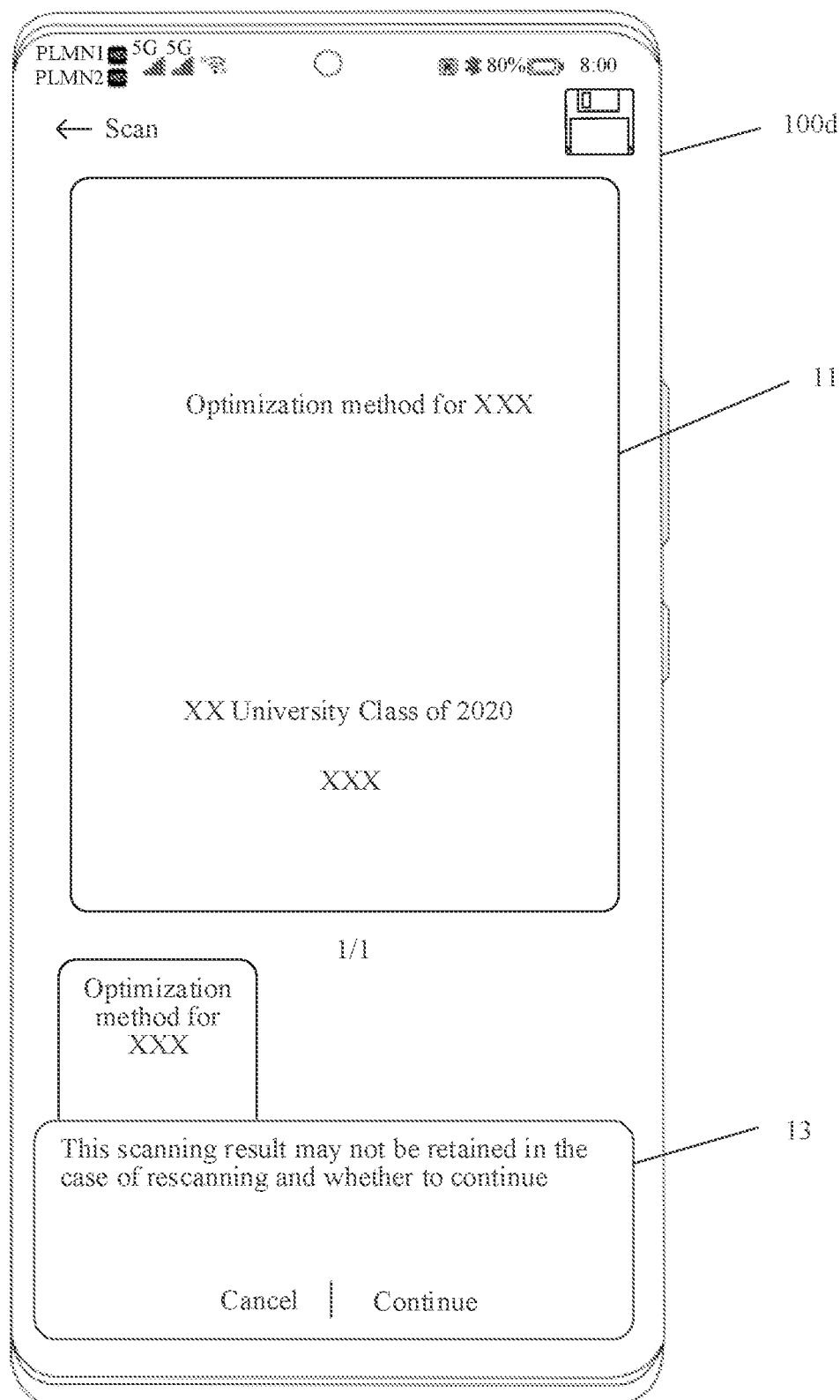
FIG. 10d is a schematic diagram of a graphical user interface of a thirty-ninth electronic device according to an embodiment of this application.

The user clicks the rescan control 122 in the interface 100c, and the electronic device displays an interface 100d as shown in FIG. 10d to display prompt information 13 in the interface 100d to prompt the user that this scanning result may not be retained in the case of rescanning and ask the user whether to continue the rescanning. If the user selects "continue", the electronic device clears content that has been scanned in the preview area 11 and enters the interface 100b for rescanning. If the user selects "cancel", the electronic device displays the interface 100c.

The user clicks the continue scan control 123 in the interface 100c, and the electronic device enters an interface similar to the interface 100b to continue scanning. The sign 111 is 2/2. After the current scanning is completed, the electronic device displays an interface 100f shown in FIG. 10f. A first-page scanning result thumbnail 124 and a second-page scanning result thumbnail 125 are displayed in the interface 100f.

Figure 10E:
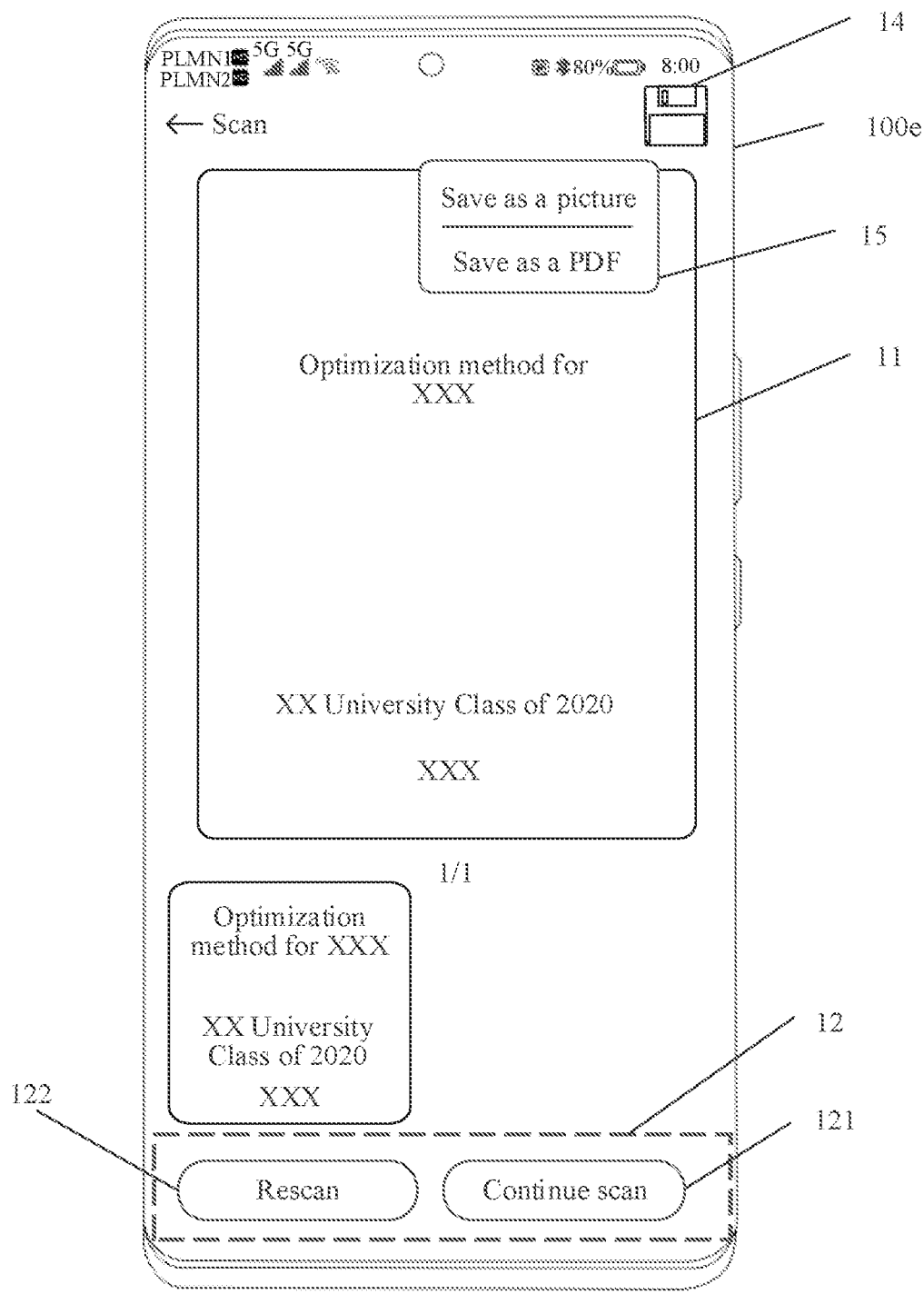
FIG. 10e is a schematic diagram of a graphical user interface of a fortieth electronic device according to an embodiment of this application.
Figure 10F:
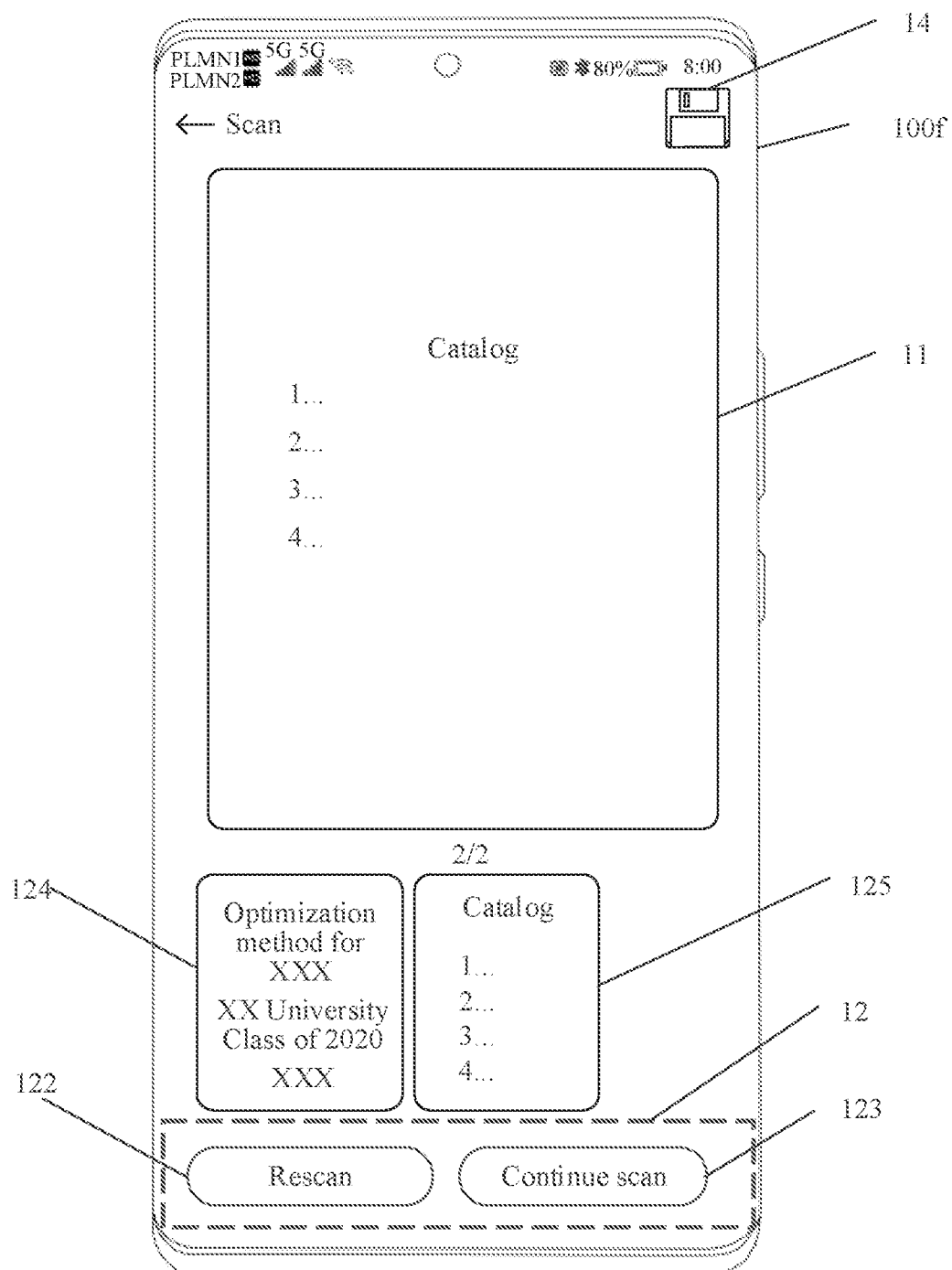
FIG. 10f is a schematic diagram of a graphical user interface of a forty-first electronic device according to an embodiment of this application.

The user may also click a control 14 in the interface 100c, and the electronic device displays an interface 100e as shown in FIG. 10e. A control window 15 is displayed in the interface 100e. If the user chooses to save as a picture, the scanning result may be saved to the electronic device in a format of a picture. If the user chooses to save as a PDF, the scanning result may be saved to the electronic device in a format of a PDF.

Figure 11A:
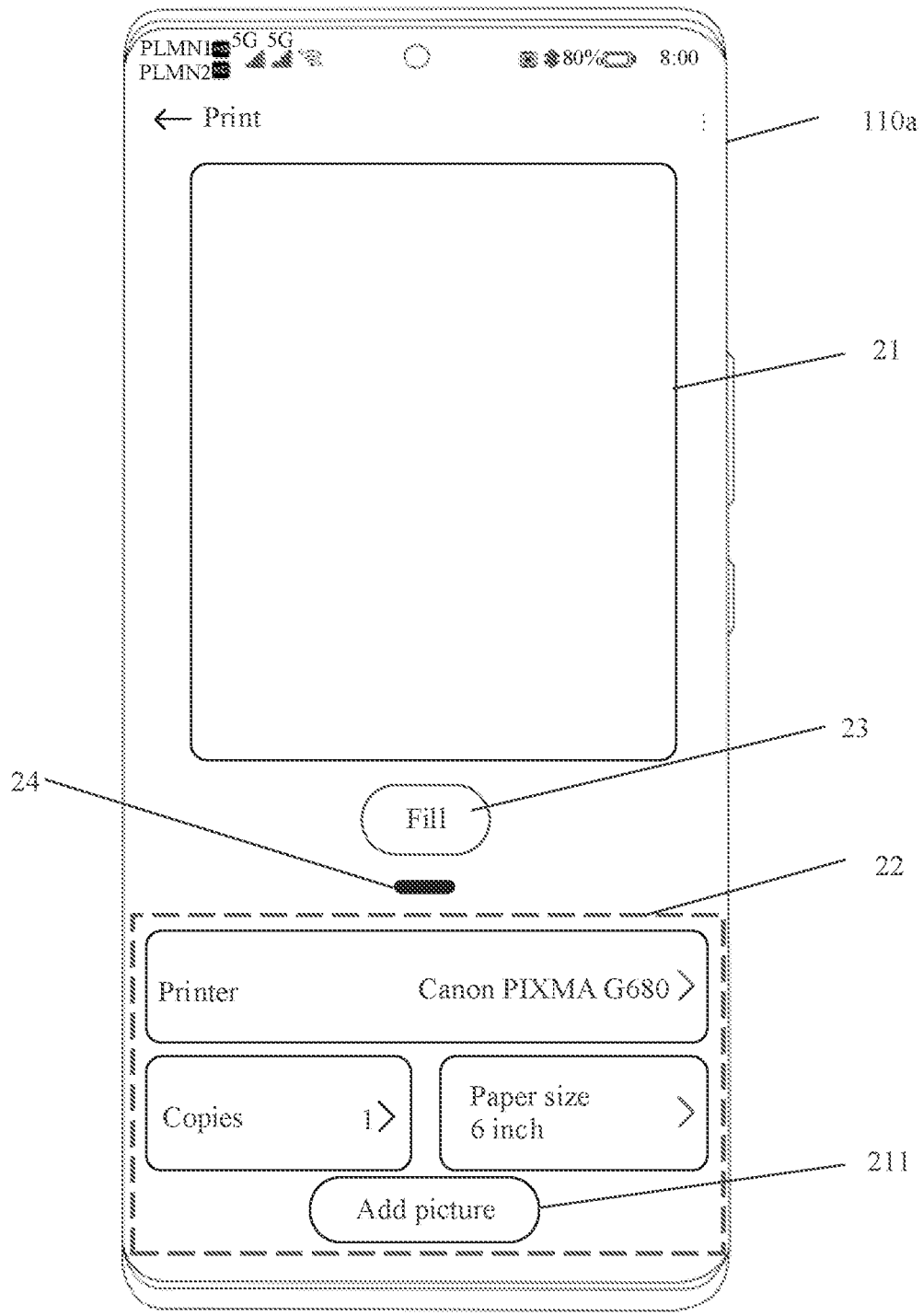
FIG. 11a is a schematic diagram of a graphical user interface of a forty-second electronic device according to an embodiment of this application.
Figure 11B:
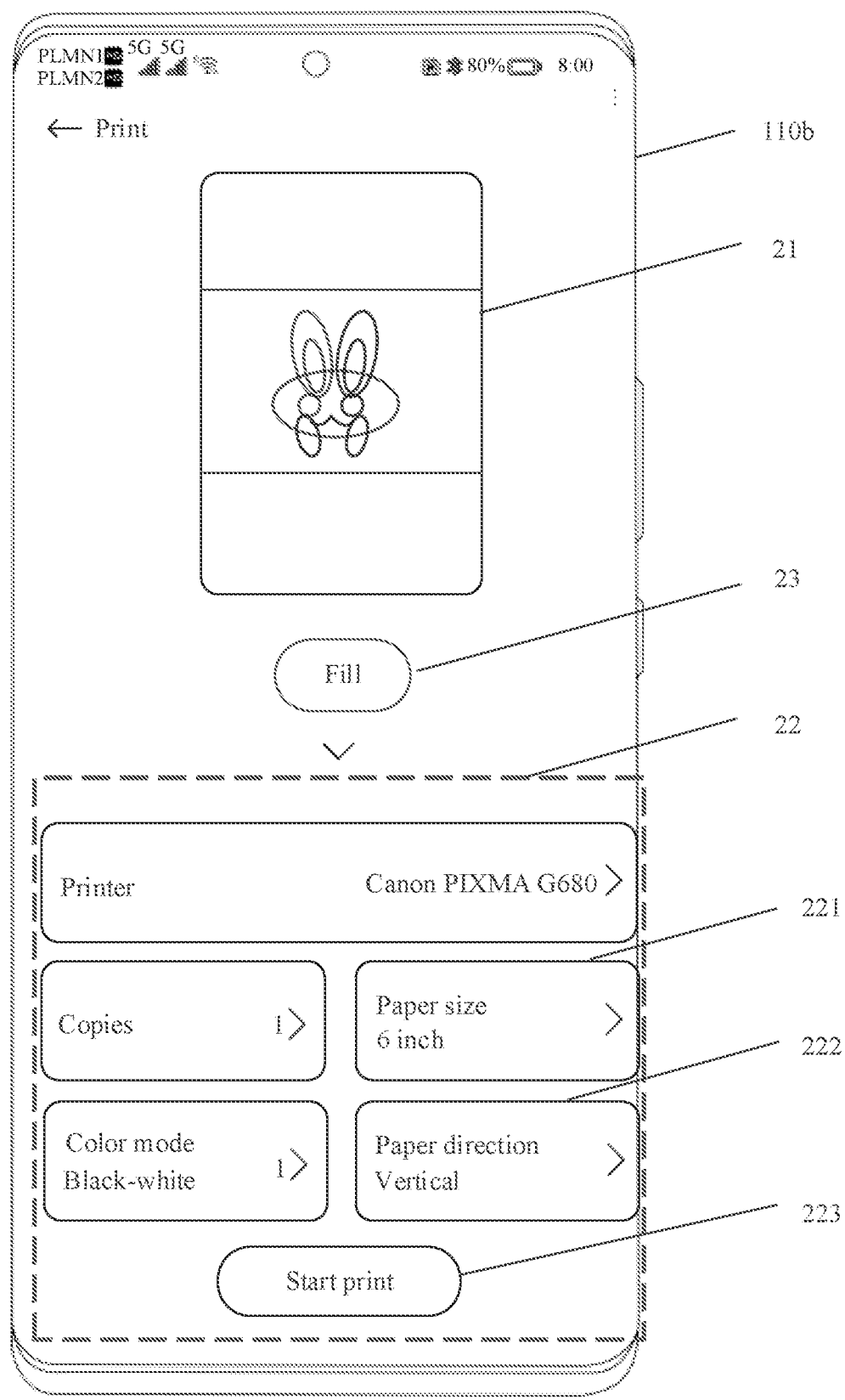
FIG. 11b is a schematic diagram of a graphical user interface of a forty-third electronic device according to an embodiment of this application.

As an example, the user triggers the album printing function 834, and the electronic device displays an interface 110a as shown in FIG. 11a. The interface 110a includes a preview box 21 and a control area 22. The user clicks an add picture control 211, and the electronic device displays an image selection interface. The user selects a to-be-printed image in the image selection interface, and the electronic device displays an interface 110b as shown in FIG. 11b. In the interface 110b, the to-be-printed image is displayed in the preview box 21 in a "suitable" display manner. The preview box 21 is not filled up with the to-be-printed image, the user may click a fill control 23, the preview box 21 may be filled up with a to-print control, and an excess part may be cropped.

In the interface 110a, the control area 22 also includes a printer selection control, a copies selection control, and a paper size selection control. A sign 24 is included above the control area 22. The sign 24 is used for indicating that more controls may also be provided in the control area 22, and controls currently hidden in the control area 22 in the interface 110a may be pulled out through a preset operation. After the controls currently hidden in the control area 22 are pulled out, the electronic device displays the interface 110b as shown in FIG. 11b. In the interface 110b, a size of each control remains unchanged, and the control area 22 expands. Correspondingly, the preview box 21 becomes smaller, and a preview object in the preview frame 21 becomes smaller.

A manner in which an interface layout changes as a result of the pulling or retraction of the hidden controls in the control area 22 is similar to the manner in which the preview area in FIG. 4a to FIG. 4e adapts to changes in the control area. Details are not described herein again.

In the interface 110b as shown in FIG. 11b, a printing parameter may be adjusted through a paper size selection control 221 and a paper direction selection control 222. After the user triggers the start print control 223, if a printer permits, the electronic device controls a printer to determine whether actually loaded paper meets a set printing parameter. If a judgment result is yes, the electronic device controls the printer to perform printing. If the judgment result is no, the electronic device displays prompt information: whether printing is continued when printing with paper of a current size may be different from a preview effect or printing fails, and the electronic device controls the printer to perform printing when the user confirms to continue printing.

Figure 12A:
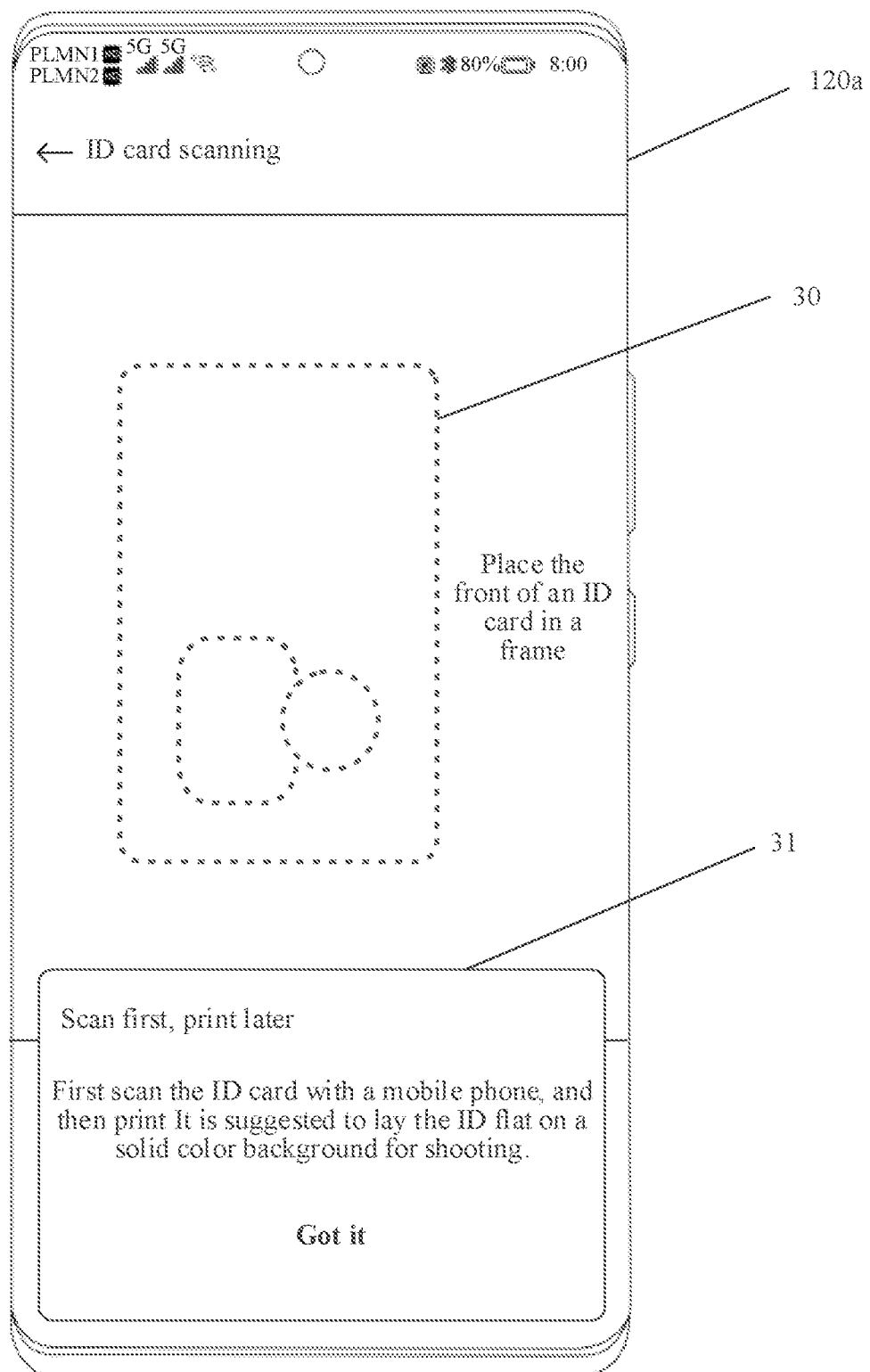
FIG. 12a is a schematic diagram of a graphical user interface of a forty-fourth electronic device according to an embodiment of this application.
Figure 12B:
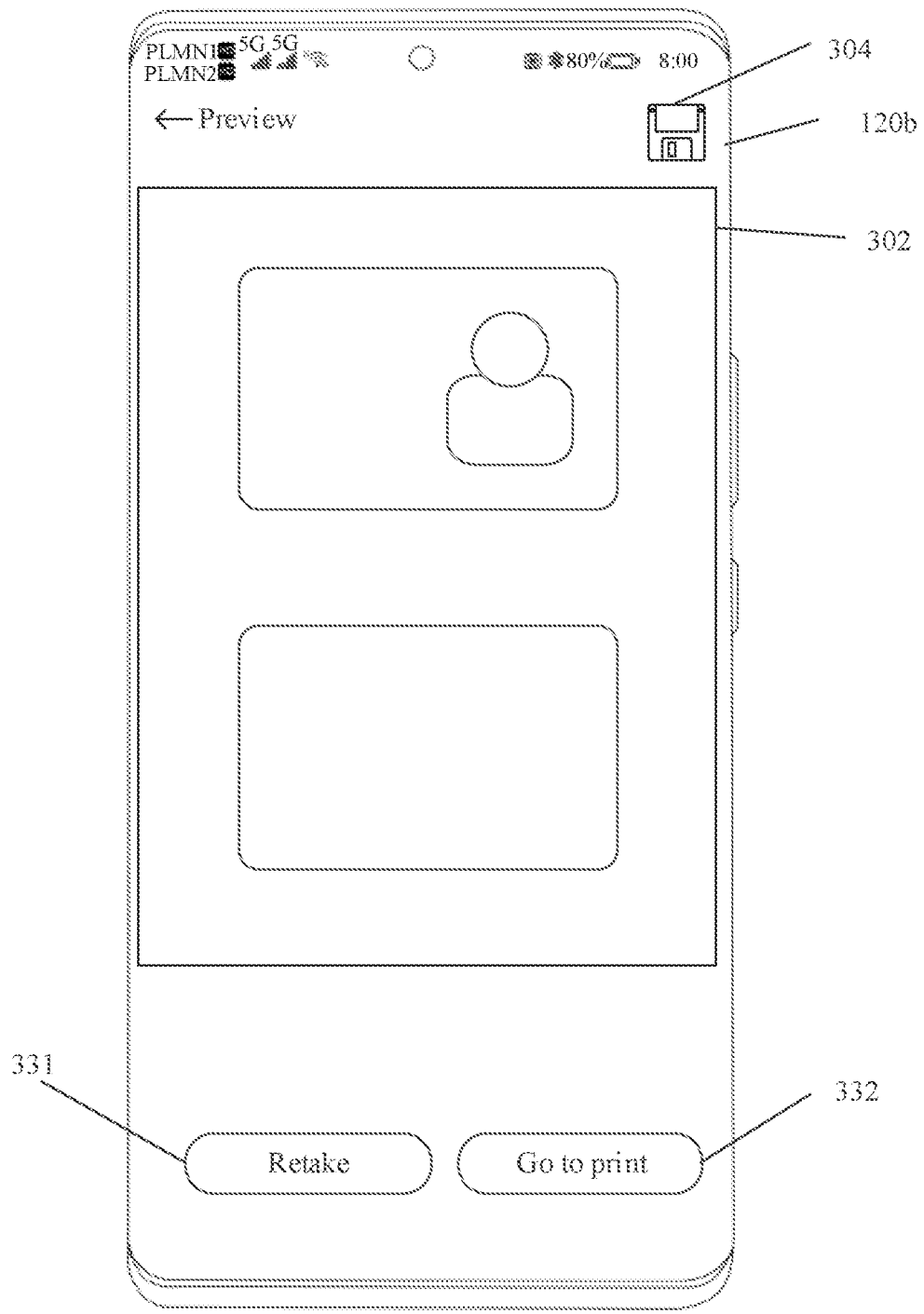
FIG. 12b is a schematic diagram of a graphical user interface of a forty-fifth electronic device according to an embodiment of this application.

As an example, the user triggers the ID card printing function 839, and the electronic device displays an interface 120a as shown in FIG. 12a. The interface 120a includes a scanning position prompt box 30 and prompt information 31. The user may scan an ID card by clicking "Got it" in the prompt information 31. The ID card two sides, and after scanning of one side, the electronic device prompts the user to scan the other side of the ID card. After scanning of the two sides of the ID card, the electronic device displays an interface 120b as shown in FIG. 12b. In the interface 120b, front and back images of the ID card obtained by scanning are displayed in a preview area 302.

The interface 120b also includes a save control 304, a retake control 331, and a go-to-print control 332. The user triggers the save control 304, and the electronic device saves a scanning result of the ID card in the preview area 302. The user triggers the retake control, and the electronic device returns to scan the ID card again. The user triggers the go-to-print control 332, and the electronic device enters an ID card printing task. The ID card printing task is similar to the picture printing task, and a difference is that the controls in the control area may be the same. Details are not described herein again.

Figure 13A:
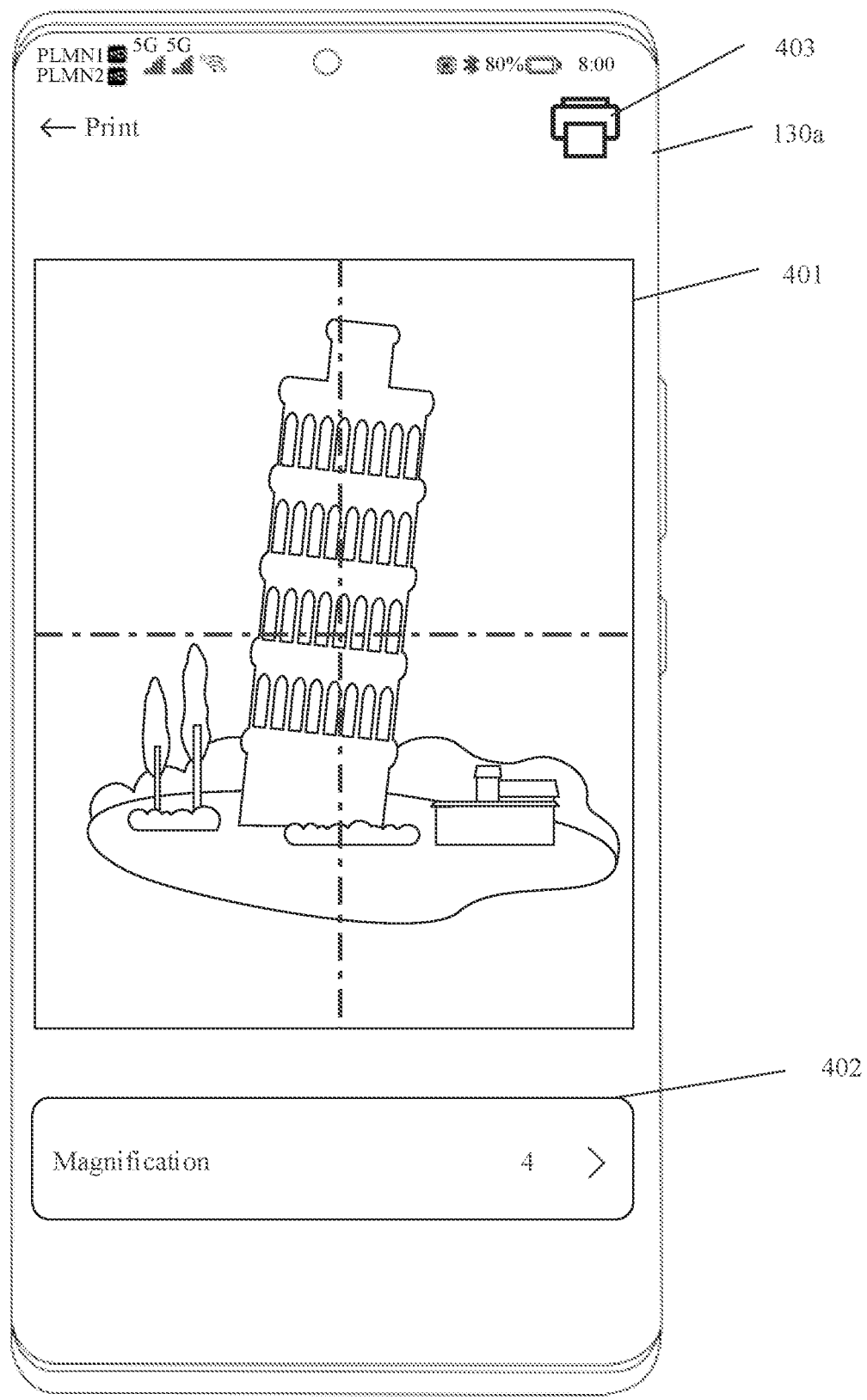
FIG. 13a is a schematic diagram of a graphical user interface of a forty-sixth electronic device according to an embodiment of this application.

As an example, the user triggers the full-size-image printing function 832. Full-size-image printing is used for enlarging a to-be-printed image, then dividing the image into a plurality of parts, and printing each part as a separate page. A magnification (i.e., a quantity of divisions) and a division manner may be selected. As shown in FIG. 13a, an interface 130a includes a preview area 401, a magnification selection control 402, and a print control 403. Dotted lines in the preview area 401 are used for indicating a manner in which the to-be-printed image is divided. In this example, the magnification is four.

Figure 13B:
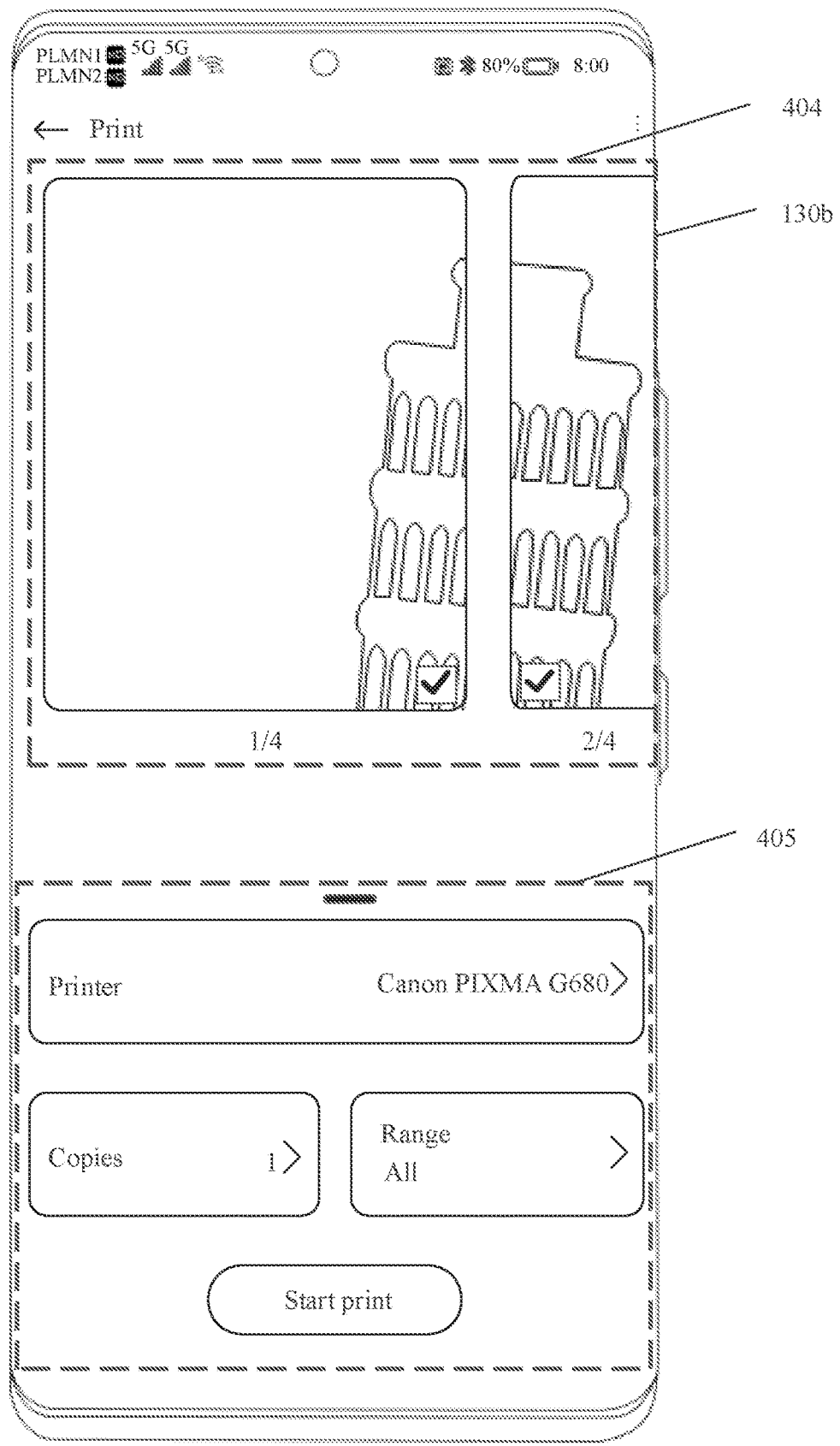
FIG. 13b is a schematic diagram of a graphical user interface of a forty-seventh electronic device according to an embodiment of this application.

The user triggers the print control 403 in the interface 130a, and the electronic device displays an interface 130b as shown in FIG. 13b. The interface 130b includes a preview area 404 and a control area 405. Each part of the divided to-be-printed image is previewed in the preview area 404 as a preview object. The control area 405 further includes more controls that can be pulled out. A manner in which an interface layout changes as a result of the pulling or retraction of the hidden controls in the control area 405 is similar to the manner in which the preview area in FIG. 4a to FIG. 4e adapts to changes in the control area. Details are not described herein again.

Figure 14A:
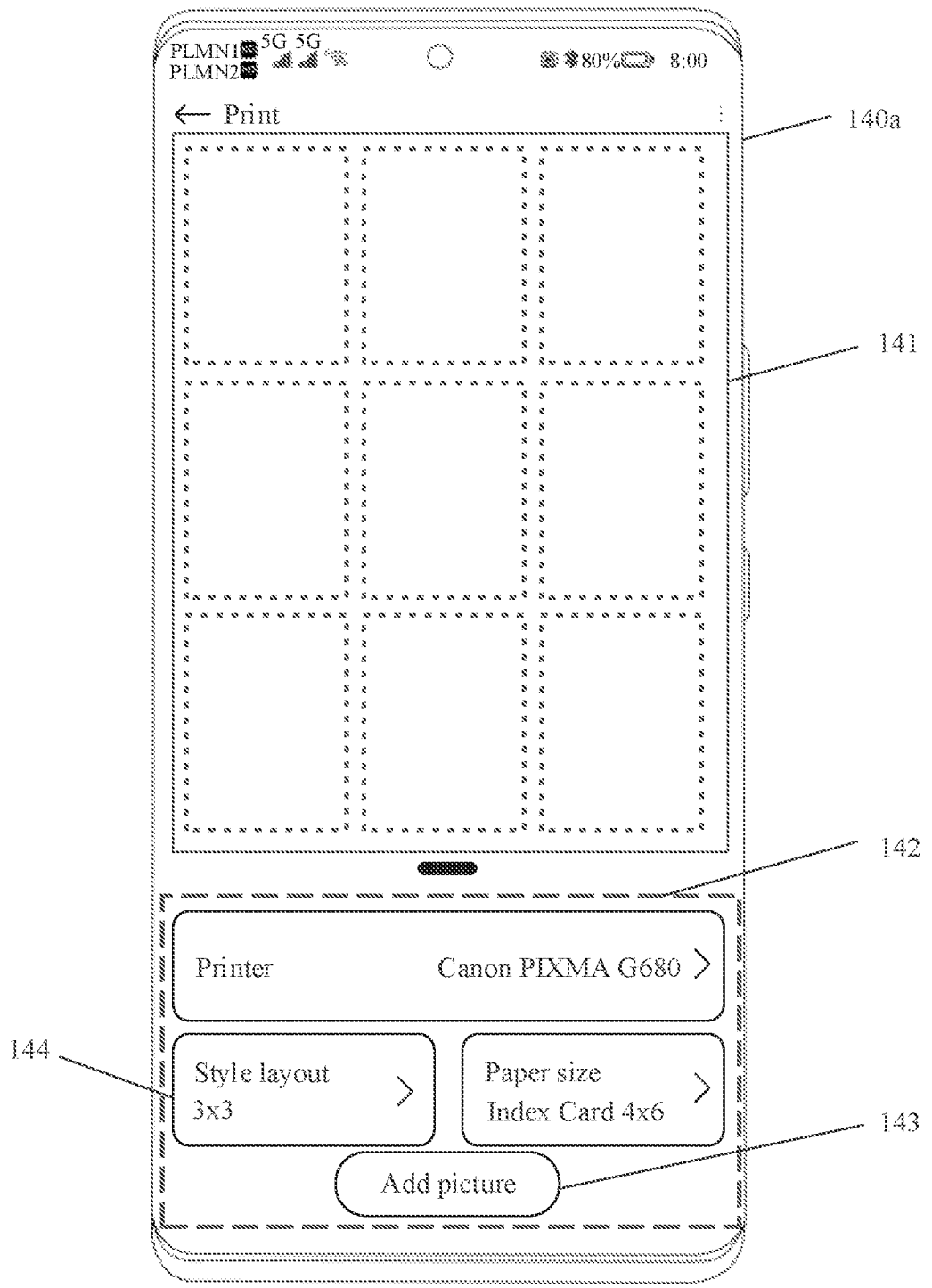
FIG. 14a is a schematic diagram of a graphical user interface of a forty-eighth electronic device according to an embodiment of this application.
Figure 14B:
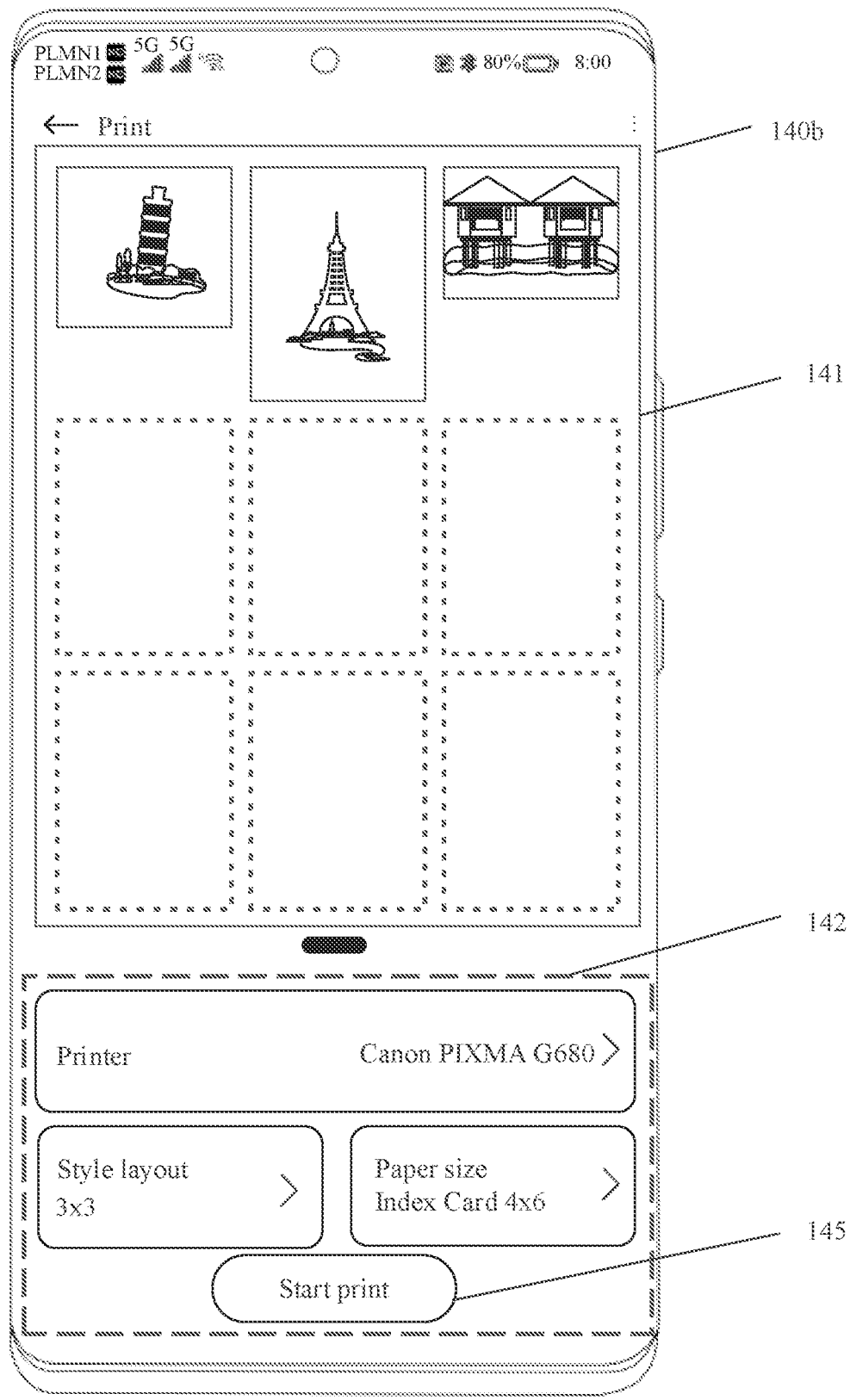
FIG. 14b is a schematic diagram of a graphical user interface of a forty-ninth electronic device according to an embodiment of this application.

As an optional example, the user clicks the collage printing function 836, and the electronic device displays an interface 140*a* as shown in FIG. 14*a*. A preview area 141 and a control area 142 are provided in the interface 140*a*. An add picture control 143 is provided in the control area 142. The user triggers the add picture control 143, and the electronic device may display the image selection interface. After the user selects and confirms three images on the image selection interface, the electronic device enters an interface 140*b* as shown in FIG. 14*b*. In the interface 140*b*, the three selected images are displayed in the preview area 141 as preview objects. Optionally, the user selects ten images, of which first nine images form a first collage in a 3×3 layout and the last image forms a second collage with eight blank images.

Figure 14C:
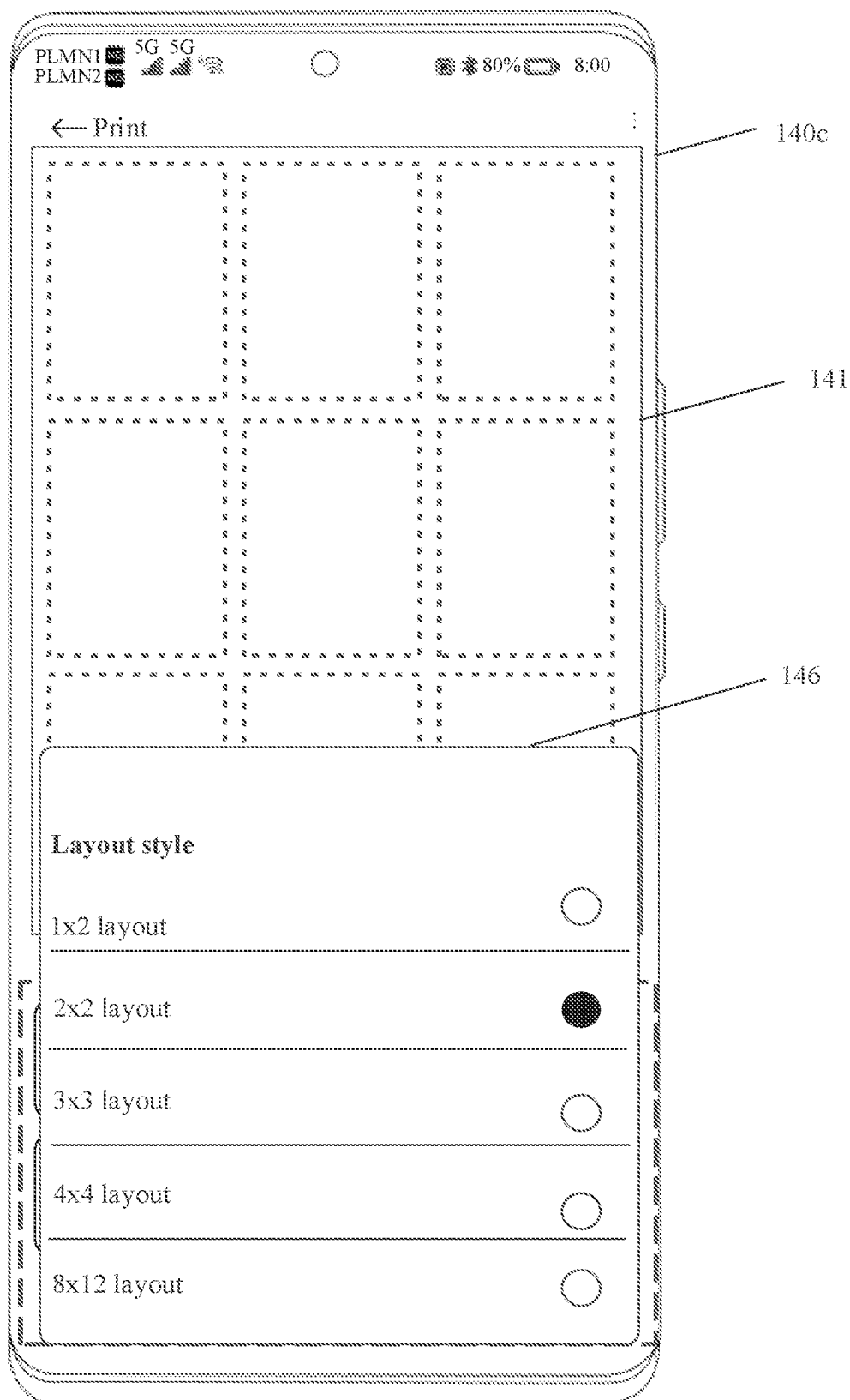
FIG. 14c is a schematic diagram of a graphical user interface of a fiftieth electronic device according to an embodiment of this application.
Figure 14D:
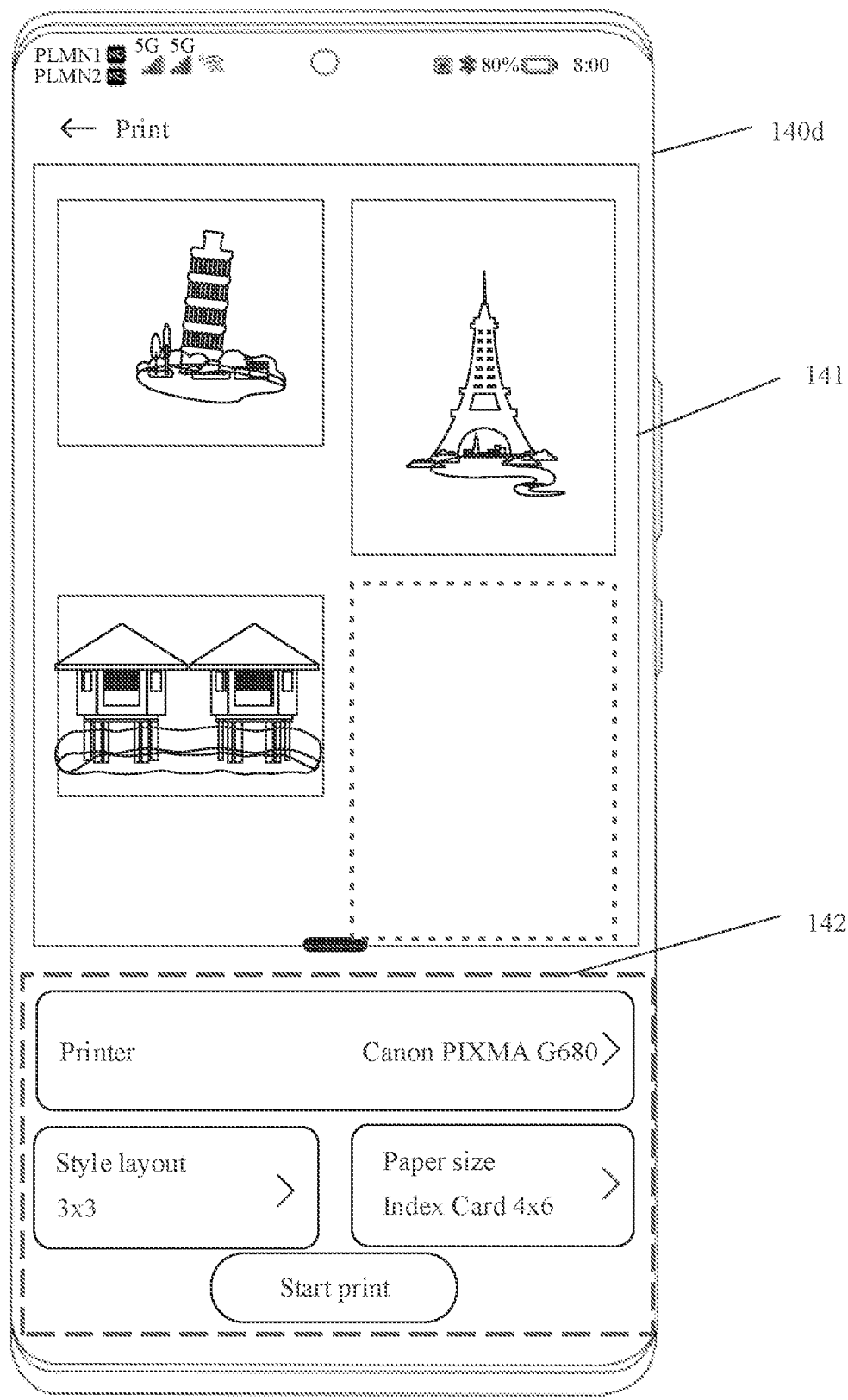
FIG. 14d is a schematic diagram of a graphical user interface of a fifty-first electronic device according to an embodiment of this application.

A layout style selection control 144 is provided in the control area 142. After the layout style selection control 144 is triggered, the electronic device enters an interface 140*c* as shown in FIG. 14*c*. Various optional layout styles are provided in the interface 140*c*, for example, 3×3, 2×2, 2×3, and the like. The user selects a 2×2 layout. The electronic device displays an interface 140*d* as shown in FIG. 14*d*. In the interface 140*d*, the three selected images are displayed in the 2×2 layout.

Similarly, in a collage printing scenario, the control area 142 may further include more controls that can be pulled out. A manner in which an interface layout changes as a result of the pulling or retraction of the hidden controls in the control area 142 is similar to the manner in which the preview area in FIG. 4*a* to FIG. 4*e* adapts to changes in the control area. Details are not described herein again.

Figure 15:
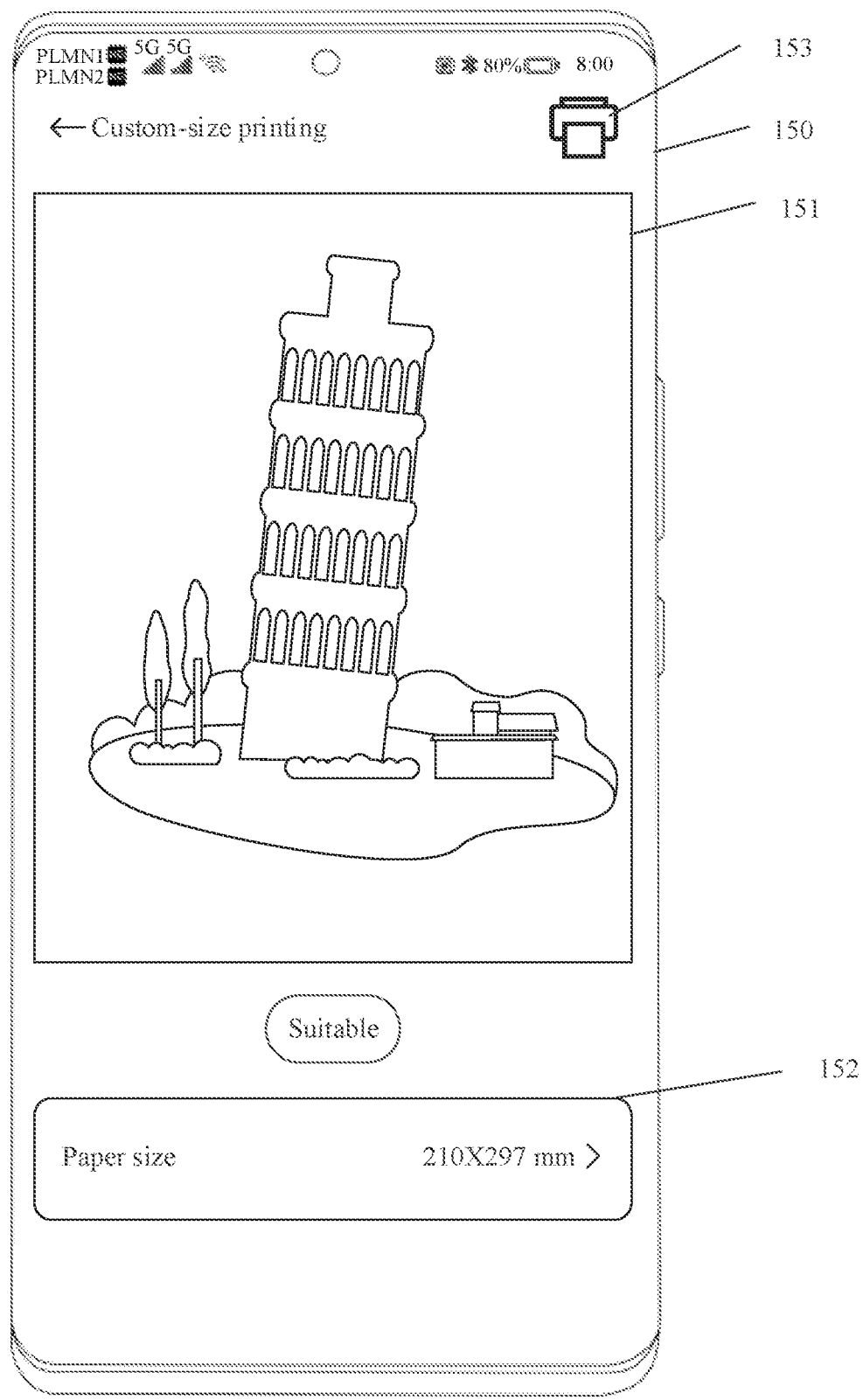
FIG. 15 is a schematic diagram of a graphical user interface of a fifty-second electronic device according to an embodiment of this application.

As an optional example, the user clicks the custom printing function 838, and the electronic device displays the image selection interface. After the user selects and confirms an image on the image selection interface, the electronic device displays an interface 150 as shown in FIG. 15. The interface 150 includes a preview area 151, a paper size selection control 152, and a print control 153. The user clicks the paper size selection control 152, the electronic device displays a paper size selection window, and the user may customize a paper size for printing in the window. After the user determines the paper size, the electronic device or printer determines whether the printer supports the paper size selected by the user. If a judgment result is no, the paper size selection window may pop up again. If a judgment result is yes, the paper size selection window is closed. After the user clicks the print control 153, the electronic device may prompt a size of paper needing to be loaded. The size is a paper size adjusted by the user in the paper size selection window.

Figure 16A:
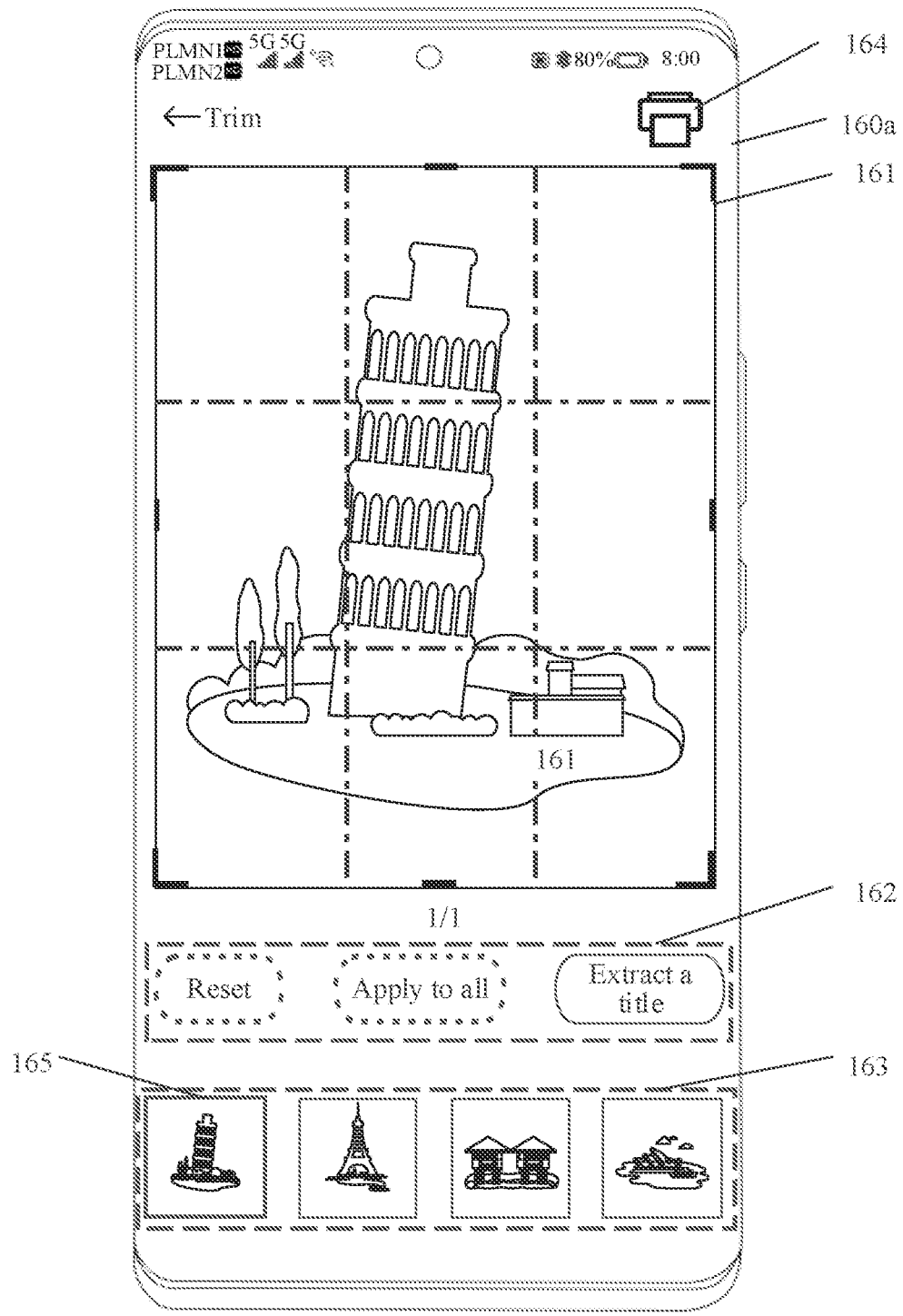
FIG. 16a is a schematic diagram of a graphical user interface of a fifty-third electronic device according to an embodiment of this application.

As an optional example, the user clicks the area cropping printing function 837, and the electronic device displays the image selection interface. After the user selects and confirms a plurality of images on the image selection interface, the electronic device displays an interface 160*a* as shown in FIG. 16*a*. The interface 160*a* includes a first preview area 161, an auxiliary function area 162, a second preview area 163, and a print control 164.

Figure 16B:
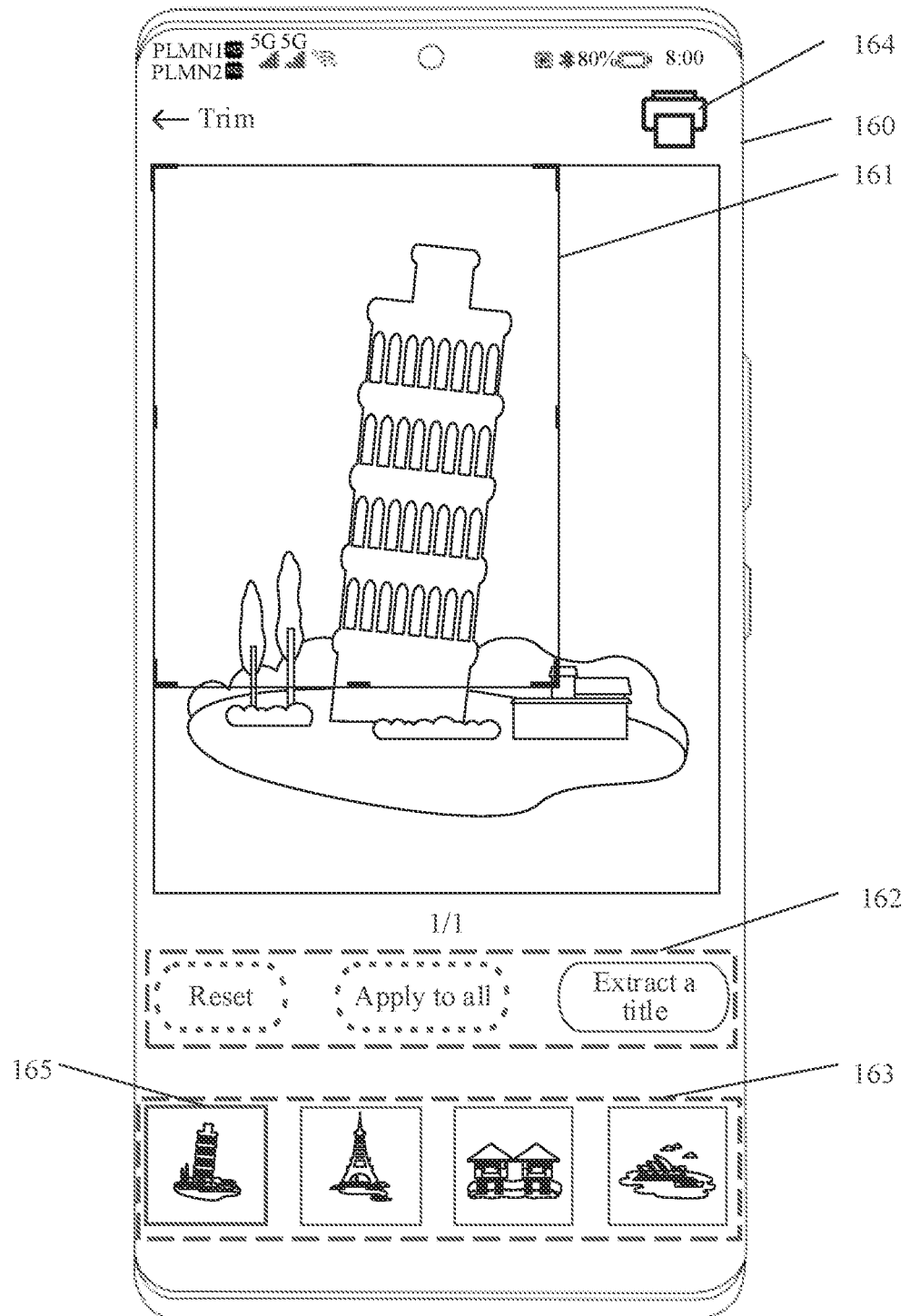
FIG. 16b is a schematic diagram of a graphical user interface of a fifty-fourth electronic device according to an embodiment of this application.
Figure 16C:
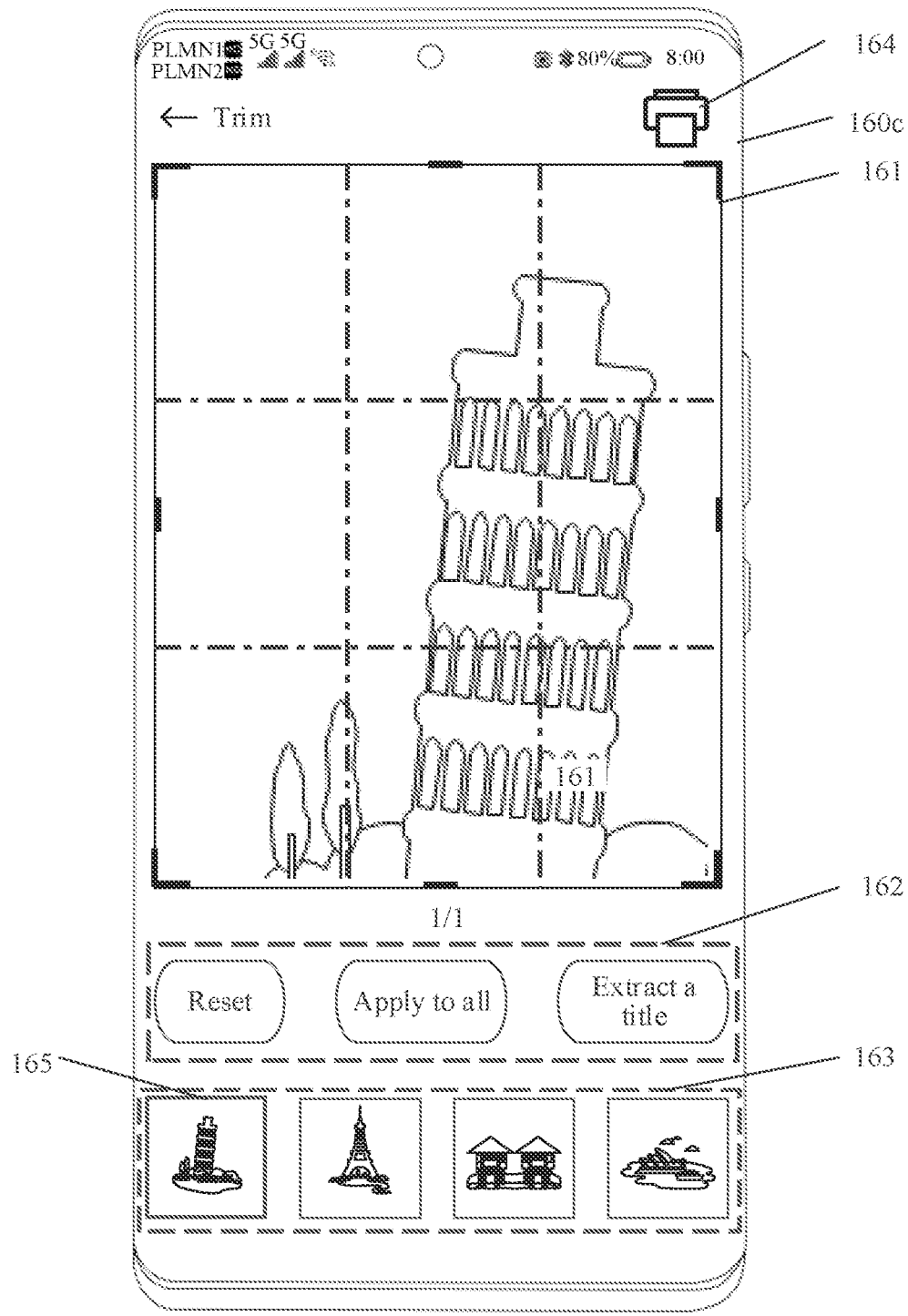
FIG. 16c is a schematic diagram of a graphical user interface of a fifty-fifth electronic device according to an embodiment of this application.

Thumbnails of the plurality of images selected by the user are displayed in the second preview area 163, and the user clicks a thumbnail 165 to select an image corresponding to the thumbnail. The image selected by the user in the second preview area 163 is displayed in the first preview area 161. A cropping grid is also displayed in the first preview area 161, and the user may crop a preview object in the first preview area 16 by adjusting the cropping grid. The user adjusts the cropping grid to a state in an interface 160*b* as shown in FIG. 16*b*, and the electronic device displays, in response to this cropping operation, a cropping effect in the first preview area 161, specifically an interface 160*c* as shown in FIG. 16*c*.

The auxiliary function area 162 includes Reset, Apply to all, and Extract a title. The user triggers Reset in the interface 160*c*, and the electronic device goes back to the interface 160*a*. The user triggers Apply to all in the interface 160*c*, and the electronic device applies the cropping effect in the first preview area 161 to the plurality of images selected in the image selection interface and displays prompt information: the cropping effect has been applied to all the images. The user triggers Extract a title in the interface 160*c*, and the electronic device displays a watermark position selection window. This window provides options for watermarking, including "Put on Top", "Put at Bottom", and "Close". The user triggers the print control 164, and the electronic device displays a printing interface similar to that in FIG. 4*a*. The preview object is a cropped image.

In the interface 800*b* shown in FIG. 8*b*, the second-type printing function 84 includes a couplet printing function 841 and a red-envelope printing function 842. In couplet printing function 841, an externally provided printing material may also be accessed to provide more printing functions. The couplet printing function 841 is taken as an example for illustration.

Figure 17A:
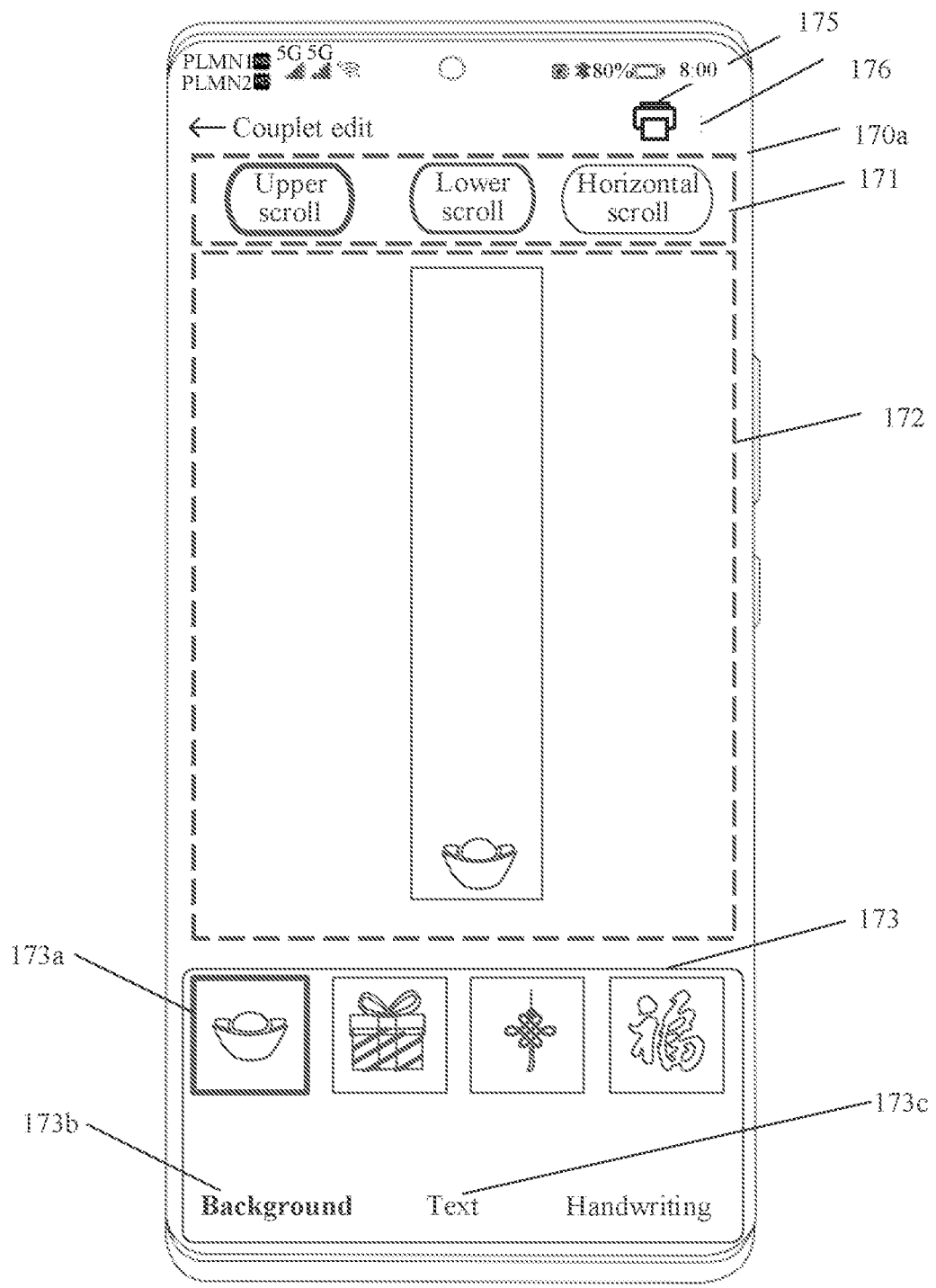
FIG. 17a is a schematic diagram of a graphical user interface of a fifty-sixth electronic device according to an embodiment of this application.

As an example, the user triggers the couplet printing function 841 in the second-type printing function 84 in the interface 80*b* shown in FIG. 8*b*. The electronic device displays an interface 170*a* as shown in FIG. 17*a*. The interface 170*a* includes: a first control area 171, a preview area 172, and a second control area 173. The first control area 171 includes a control for selecting an upper scroll, a lower scroll, and a horizontal scroll in a couplet. The preview area 172 is used for displaying a couplet being edited. The second control area 173 is used for providing a plurality of editing items (for example, background, text, and handwriting), and content in the plurality of editing items. When the electronic device enters the couplet printing function, the "upper scroll" in the first control area 171 and a background control 173*b* and a background option 173*a* in the second control area 173 are selected by default.

Figure 17B:
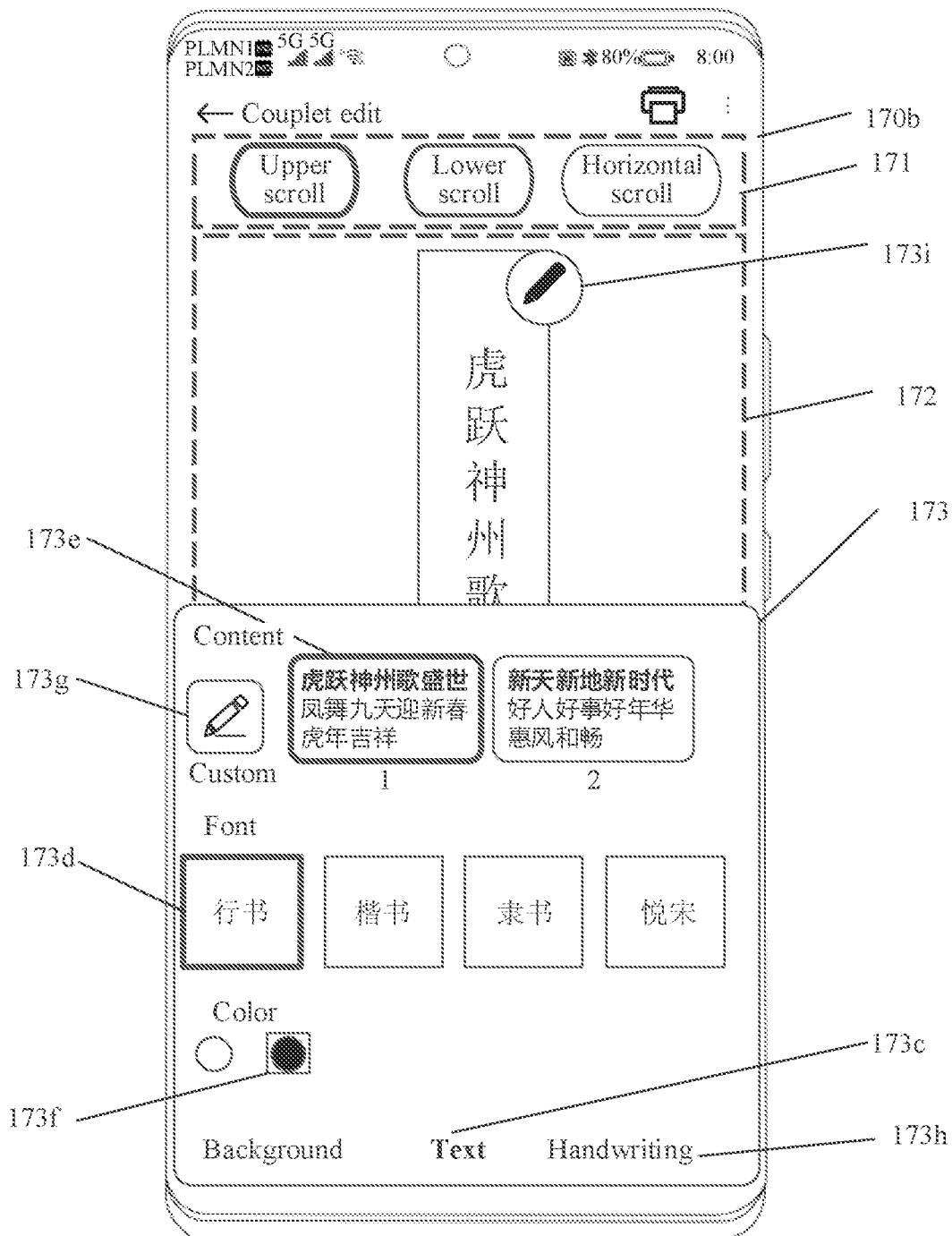
FIG. 17b is a schematic diagram of a graphical user interface of a fifty-seventh electronic device according to an embodiment of this application.

As an example, the user clicks a text option 173*c* in the second control area 173, and the electronic device displays an interface 170*b* as shown in FIG. 17*b*. Optional text contents, optional fonts, and optional colors are displayed in the second control area 173 of the interface 170*b*. In the example, a content 173*e*, a font 173*d*, and a color 173*f* are selected. Each content provided includes an upper scroll, a lower scroll, and a horizontal scroll. After selecting a content, the upper scroll, the lower scroll, and the horizontal scroll may all be determined according to the selected content. For example, if the content 173*e* is selected, the upper scroll is "虎跃神州歌盛世" the lower scroll is "凤舞九天迎新春", and the horizontal scroll is) "虎年吉祥". In the example, part of the preview area 172 is blocked by the second control area 173.

Figure 17C:
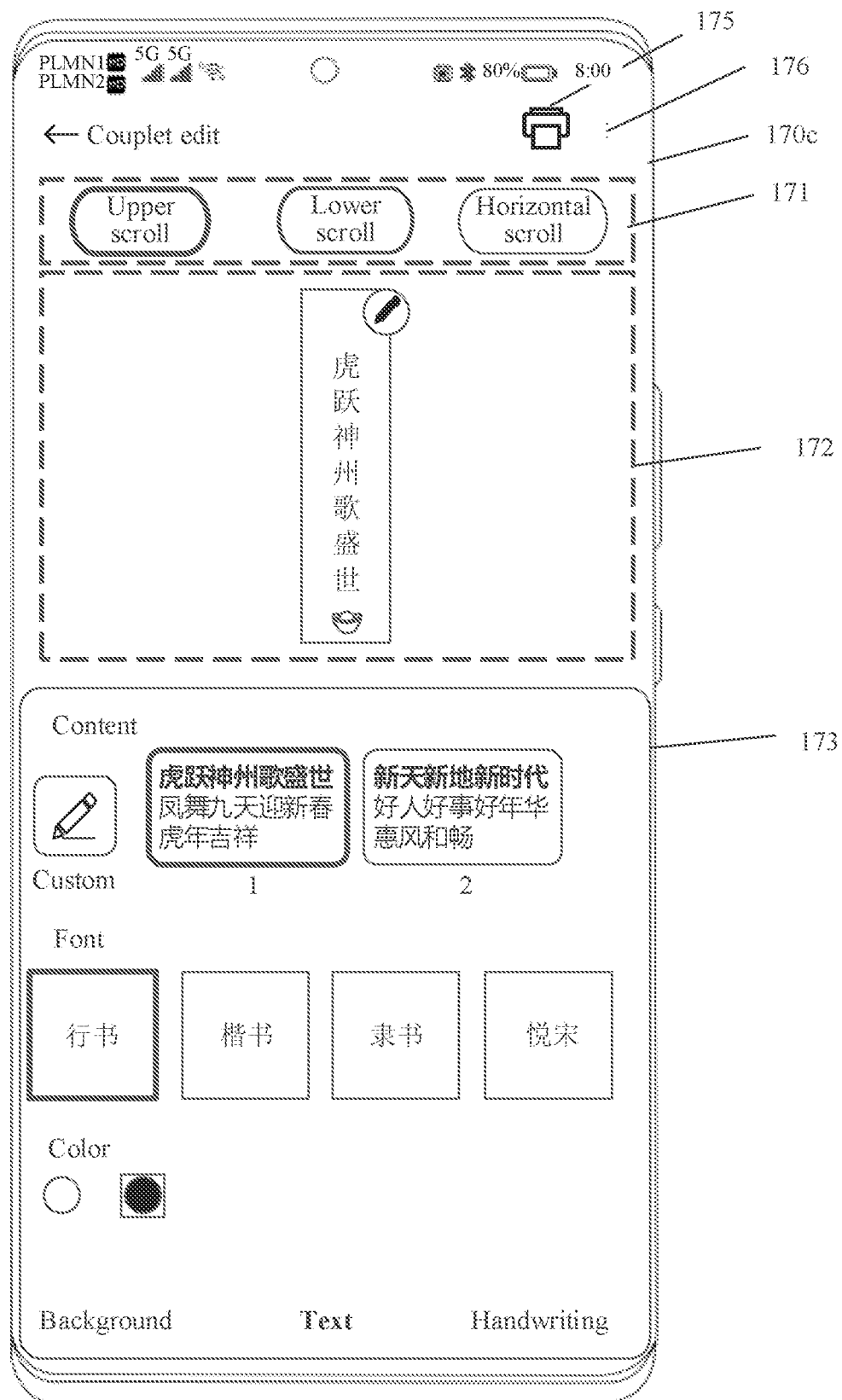
FIG. 17c is a schematic diagram of a graphical user interface of a fifty-eighth electronic device according to an embodiment of this application.

In another example, the user clicks a text option 173*c* in the second control area 173, and the electronic device displays an interface 170*c* as shown in FIG. 17*c*. In the example, in response to the operation of clicking the text option 173*c*, the preview area 172 is adaptively zoomed out and displayed, and the second control area 173 does not block the preview area 172. The interface 170*c* has same functions as other controls in the interface 170*b*. Details are not described herein again.

Figure 17D:
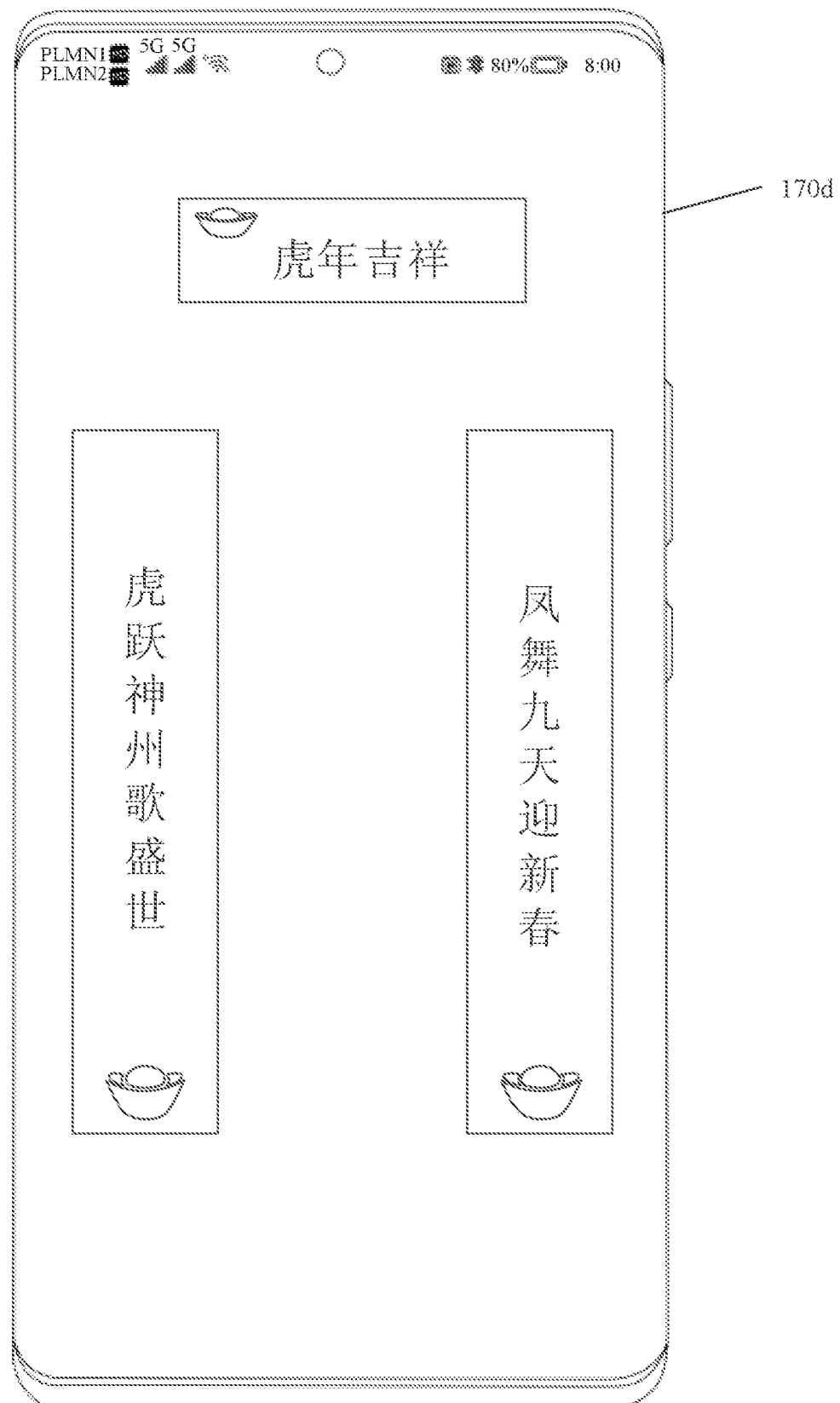
FIG. 17d is a schematic diagram of a graphical user interface of a fifty-ninth electronic device according to an embodiment of this application.

The user clicks a control 176 in the interface 170*c*, and a "preview" option and a "save" option may pop up in the interface 170*c*. The user clicks the "save" option, and the currently edited couplet may be saved in the form of three images corresponding to the upper scroll, the lower scroll, and the horizontal scroll respectively in an album. The user clicks the "preview" option, and the electronic device displays an interface 170*d* as shown in FIG. 17*d*. A preview effect of the entire couplet (including the upper scroll, the lower scroll, and the horizontal scroll) is displayed in the interface 170*d*.

Figure 17E:
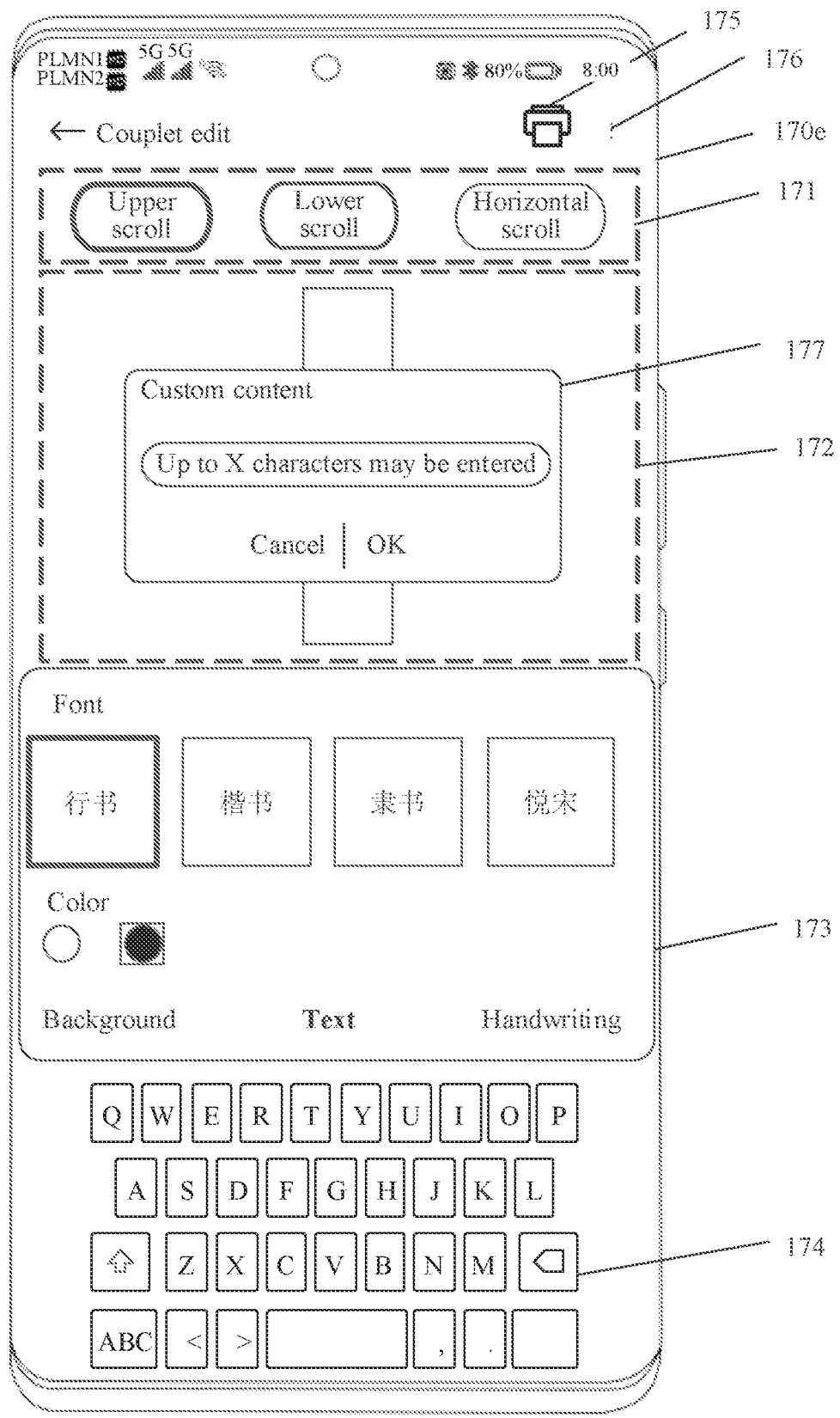
FIG. 17e is a schematic diagram of a graphical user interface of a sixtieth electronic device according to an embodiment of this application.

As shown in FIG. 17*b*, a control 173*g* in the second control area 173 may also be clicked. The electronic device enters an interface 170*e* as shown in FIG. 17*e*. A virtual keyboard 174 and a custom content window 177 are displayed in the interface 170*e*. The user operates the virtual keyboard 174 to enter custom text into the custom content window 177. The user may also select a font and a color of the custom text in the second control area 173.

Figure 17F:
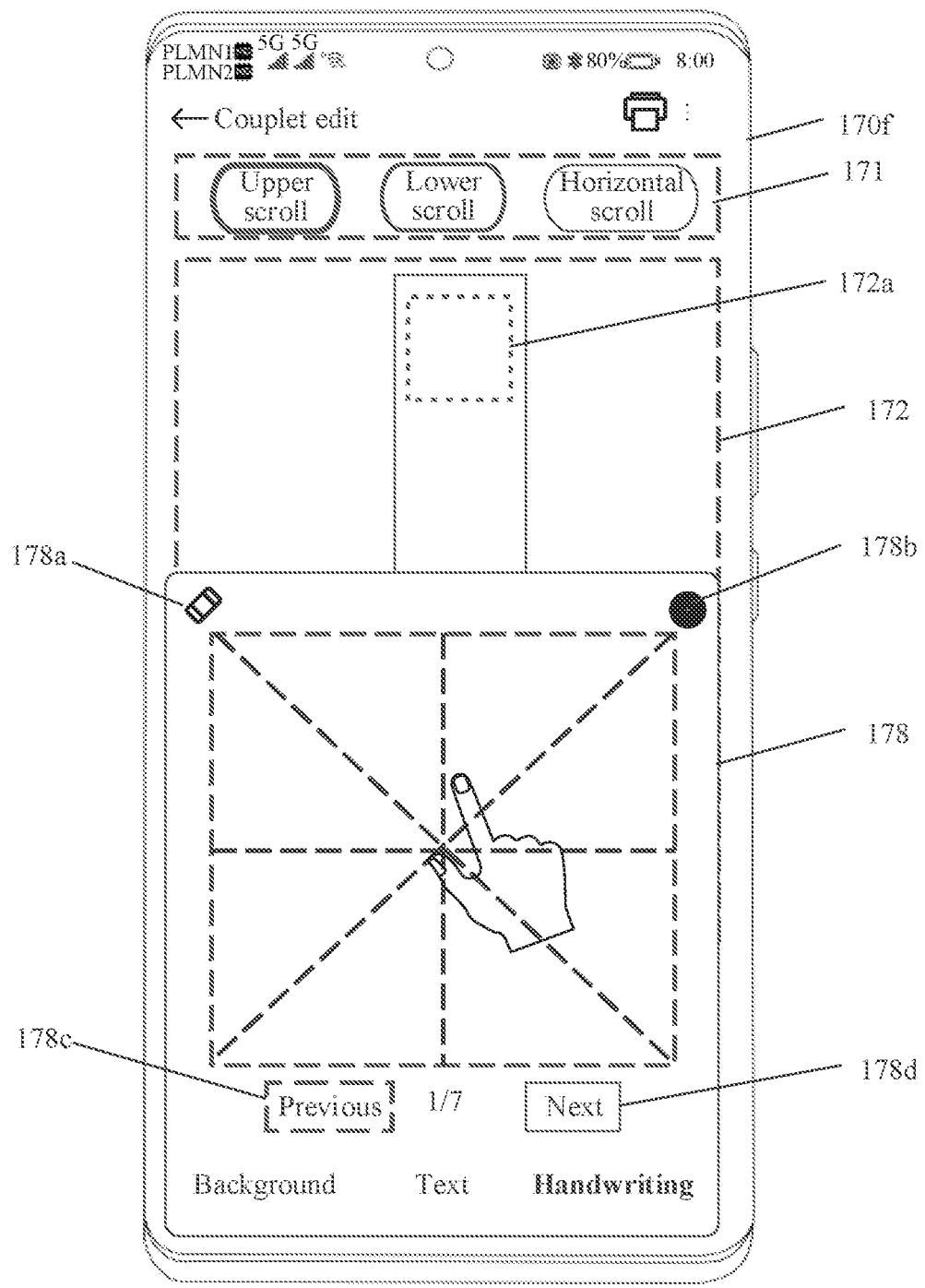
FIG. 17f is a schematic diagram of a graphical user interface of a sixty-first electronic device according to an embodiment of this application.

As shown in FIG. 17*b*, the user may also select controls 173*h* and 173*i* to enter a handwriting function. As an example, the electronic device displays an interface 170*f* as shown in FIG. 17*f*. An editing area 178 is displayed in the interface 170*f*. The editing area 178 also includes a control 178*a*, a control 178*b*, a control 178*c*, and a control 178*d*. The user writes in the editing area 178, and after one unit of handwriting (for example, a character) has been written, the user may click the control 178*d* to write next unit of the handwriting in the upper scroll. In this case, the first unit of the handwriting that has been written is displayed on the couplet in the preview area 172. Alternatively, if the handwriting already exists in the preview area 172, the control 178*c* may be clicked to write a previous unit of the handwriting. During the writing, a delete control 178*a* may be clicked to delete the currently edited handwriting, or a close control 178*b* may be clicked to exit the editing.

Optionally, each text has a corresponding position and size in the upper scroll in the preview area 172. In FIG. 17*f*, a size and a position of the first character of the upper scroll are shown in a virtual box 172*a* (172*a* is only for illustration and may not be displayed in the interface 170*f*). After the user finishes writing the first character and clicks the control 178*d*, the first character currently written may be reduced or enlarged so that the written handwriting conforms to a size of 172*a*, and then the reduced or enlarged handwriting is displayed at a location of 172*a*. In an interface 170*i* as shown in FIG. 17*i*, after the user clicks the control 178*d*, the written character "虎" is displayed at the location of 172*a* after zooming, and the user may write next character in the couplet in the editing area 178.

The editing area 178 further includes prompt information. The prompt information is displayed in the form of x/y. y indicates how many characters are included in the currently written upper scroll, and x is used for indicating a serial number of a currently written character in the upper scroll. In the example, the prompt information is 1/7. That is, there are 7 characters in the upper scroll, and the first character is currently being written. In the example, part of the preview area 172 is blocked by the second control area 173.

When the currently written character is the first character, the prompt information is 1/7, and the control 178*c* may be grayed out. When the currently written character is the last character, the prompt information is 7/7, and the control 178*d* may be changed from "next" to "complete". In this case, the user clicks the control 178*d*, and the editing area 178 is closed.

Figure 17G:
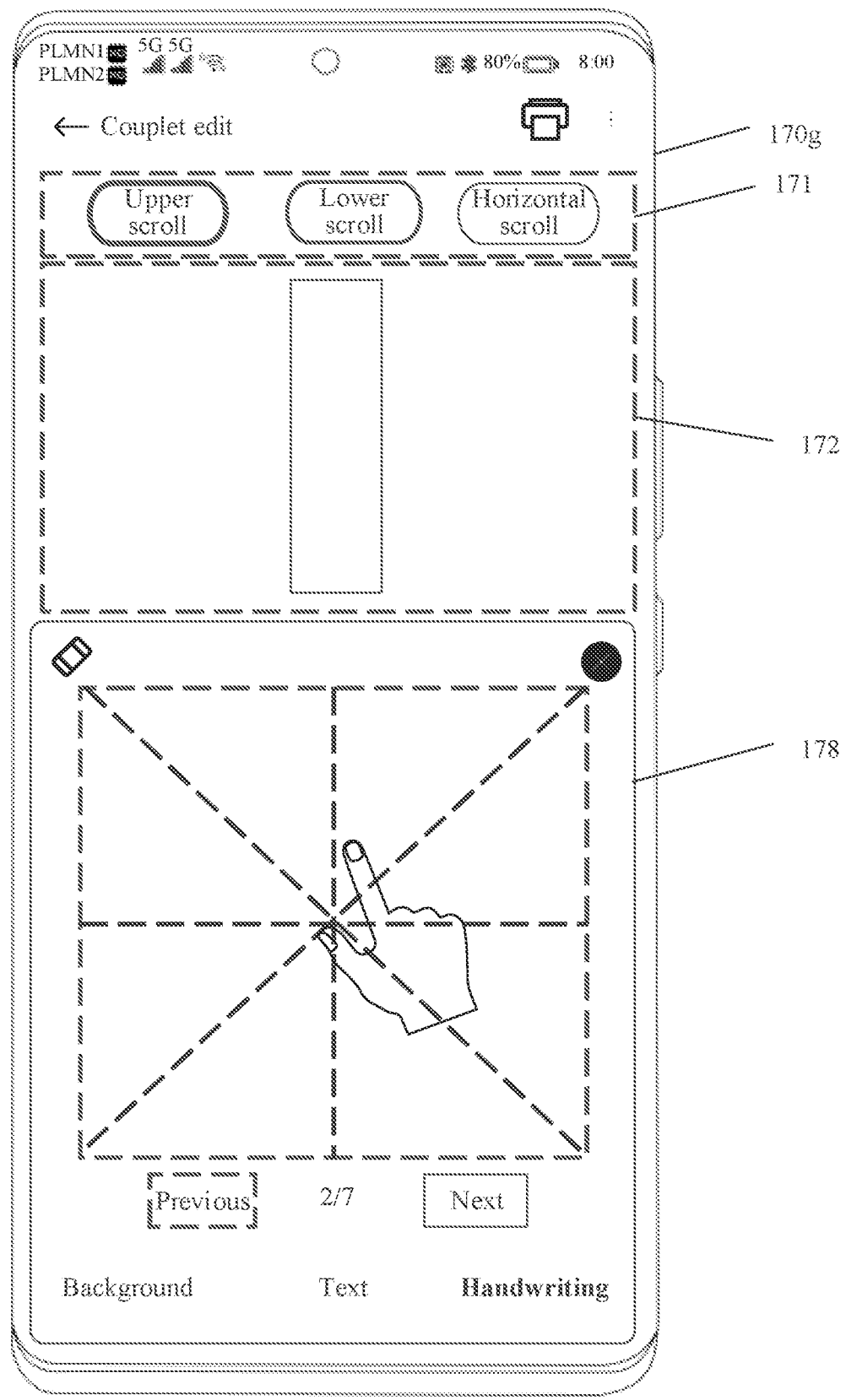
FIG. 17g is a schematic diagram of a graphical user interface of a sixty-second electronic device according to an embodiment of this application.

In another example, after the handwriting function is entered, the electronic device displays an interface 170*g* as shown in FIG. 17*g*. In the example, in response to the user's operation of selecting the controls 173*h* and 173*i*, the preview area 172 is adaptively reduced, and the second control area 173 does not block the preview area 172. After the editing area 178 is closed, the preview area 172 is restored to an original size.

Figure 17H:
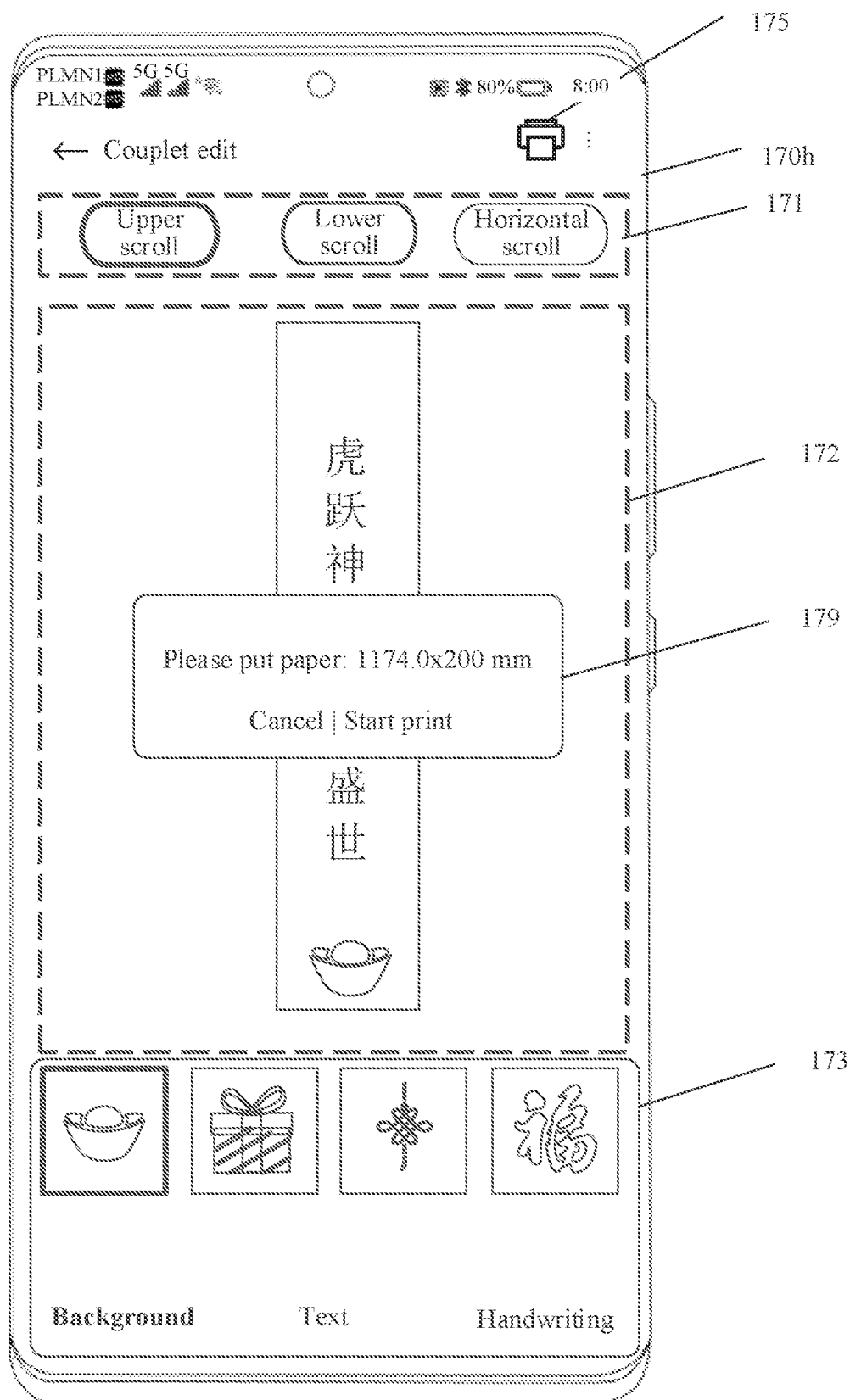
FIG. 17h is a schematic diagram of a graphical user interface of a sixty-third electronic device according to an embodiment of this application.
Figure 17I:
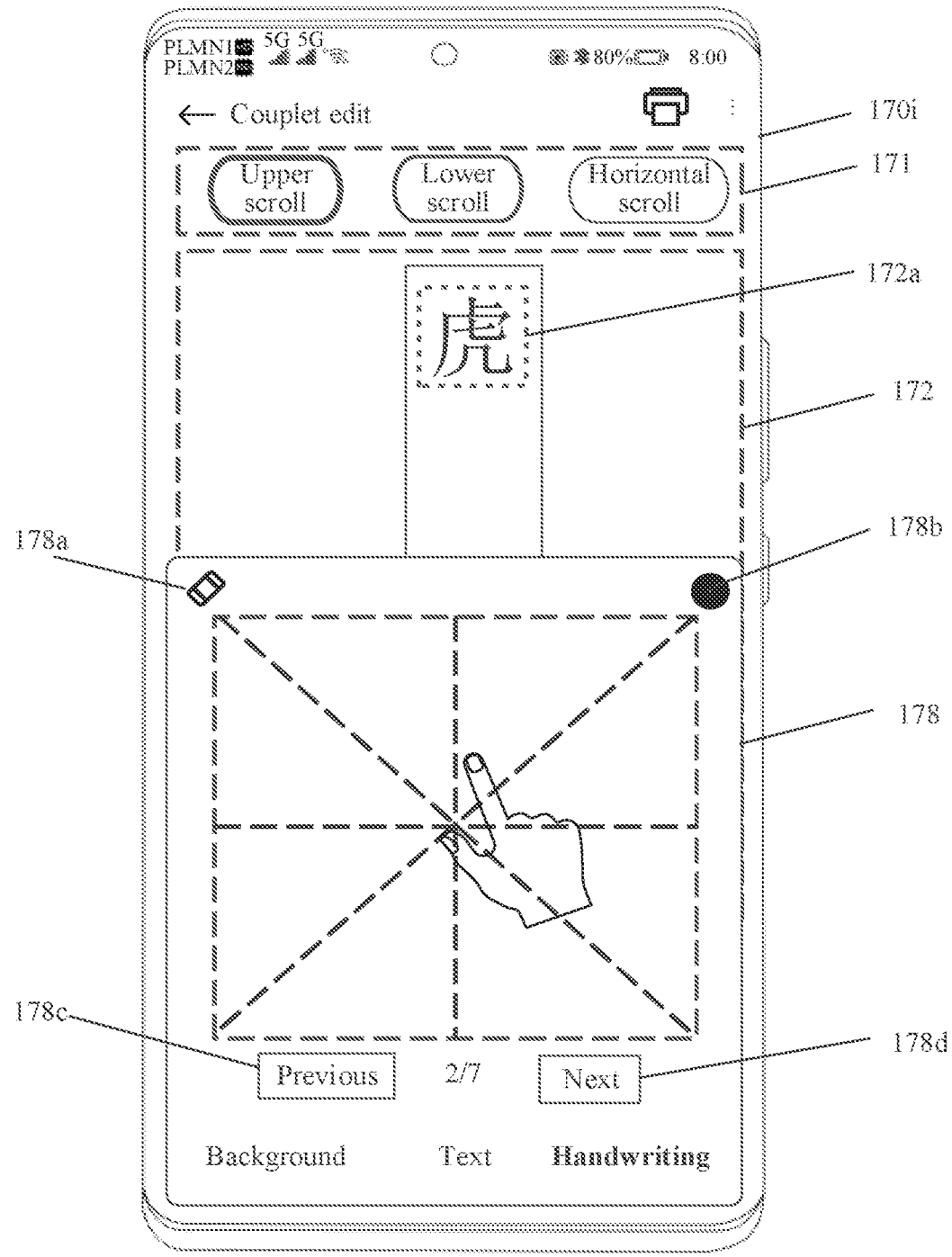
FIG. 17i is a schematic diagram of a graphical user interface of a sixty-fourth electronic device according to an embodiment of this application.

As shown in an interface 170*h* shown in FIG. 17*h*, the user clicks a print control 175, and prompt information 179 is displayed to prompt the user a paper size required to print the upper scroll. The user chooses to start printing after placing the paper size in the printer, the electronic device sends a printing instruction to the printing device, and the printing device prints the upper scroll. Paper that the user puts in the printer may be original paper without color.

The printing device, after printing the upper scroll, returns information indicating that the printing has been completed to the electronic device, and the electronic device automatically jumps to an editing interface for the lower scroll. Similarly, the user, after editing the lower scroll, may print the lower scroll by clicking the print control 175, the printing device, after printing the lower scroll, returns information indicating that the printing has been completed to the electronic device, and the electronic device automatically jumps to an editing interface for the horizontal scroll. The user, after editing the horizontal scroll, may print the horizontal scroll by clicking the print control 175.

Optionally, the size of the paper put into the printing device by the user does not match the paper size in the prompt information 179. The printing device detects that the paper size of the current paper does not match the paper size required for printing, and may send corresponding information to the electronic device. The electronic device may display prompt information to prompt the user to change paper.

Figure 18A:
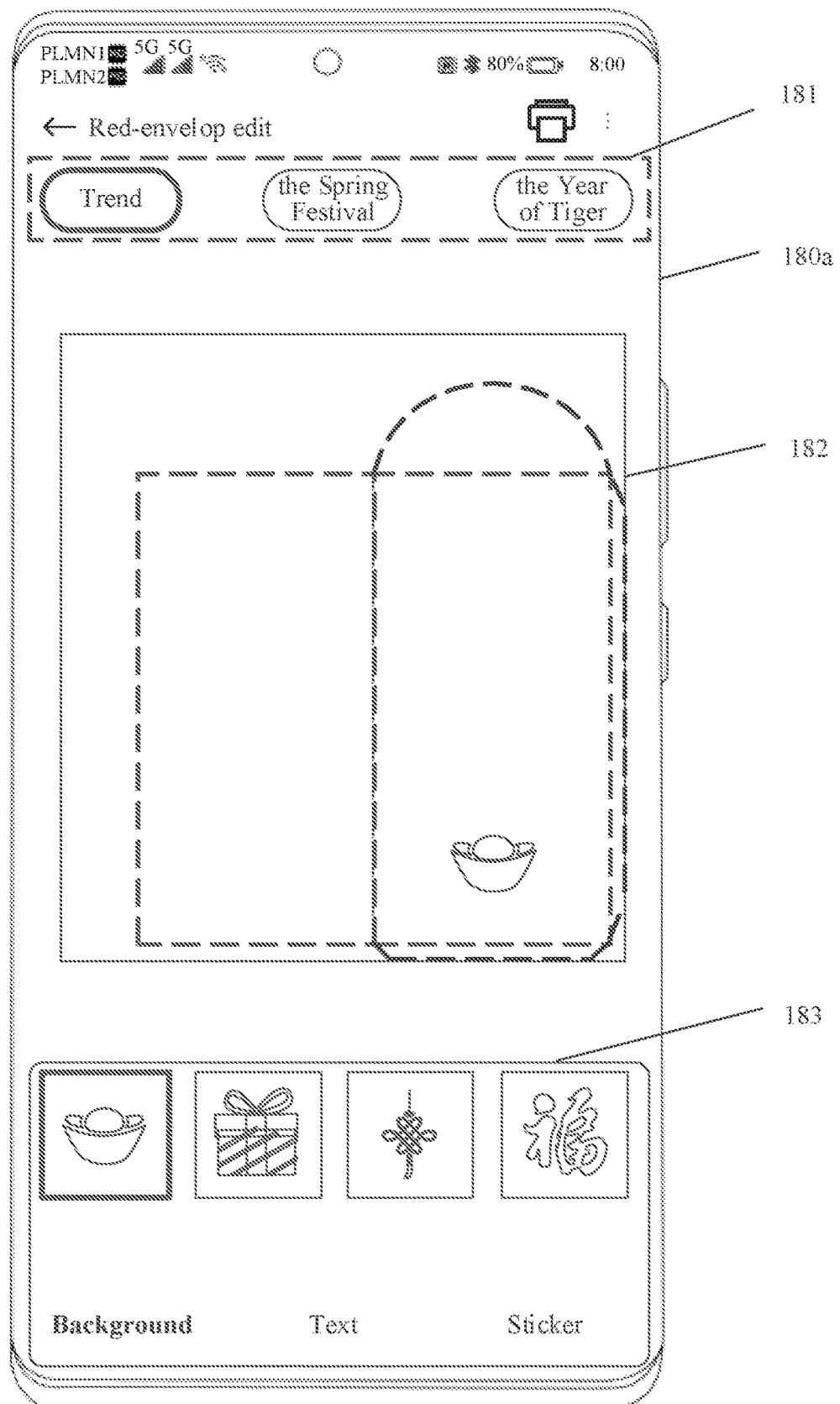
FIG. 18a is a schematic diagram of a graphical user interface of a sixty-fifth electronic device according to an embodiment of this application.

Then, red-envelope printing is described. In the interface 800*b* as shown in FIG. 8*b*, the user clicks the red-envelope printing function 842. An interface 180*a* as shown in FIG. 18*a* is entered. The interface 180*a* includes a first control area 181, a preview area 182, and a second control area 183. A variety of optional themes are provided in the first control area 181, such as trend, the Spring Festival, and the Year of Tiger. Each theme has a corresponding background. In the example, the trend theme is selected. A background in the second control area 183 is the background corresponding to the trend theme. A thumbnail of a to-be-printed red envelope is displayed in the preview area 182, in which dotted lines are used for indicating traces of folding and trimming. That is, the red envelope may be obtained by trimming and folding the printed paper according to the dotted lines. The traces of folding and trimming may be traces on the printed paper, or traces formed on the paper in a manner such as double-sided printing.

Figure 18B:
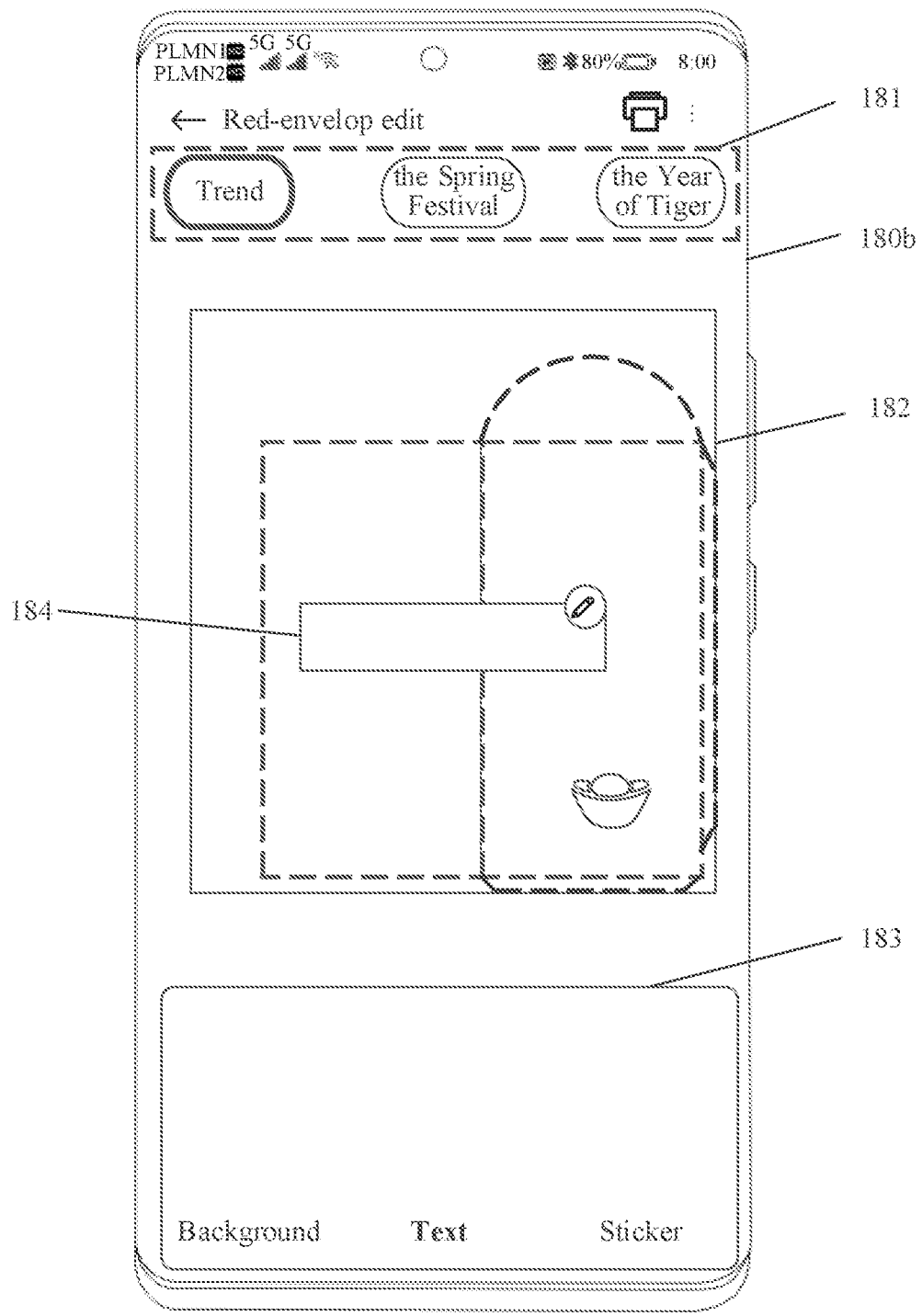
FIG. 18b is a schematic diagram of a graphical user interface of a sixty-sixth electronic device according to an embodiment of this application.
Figure 18C:
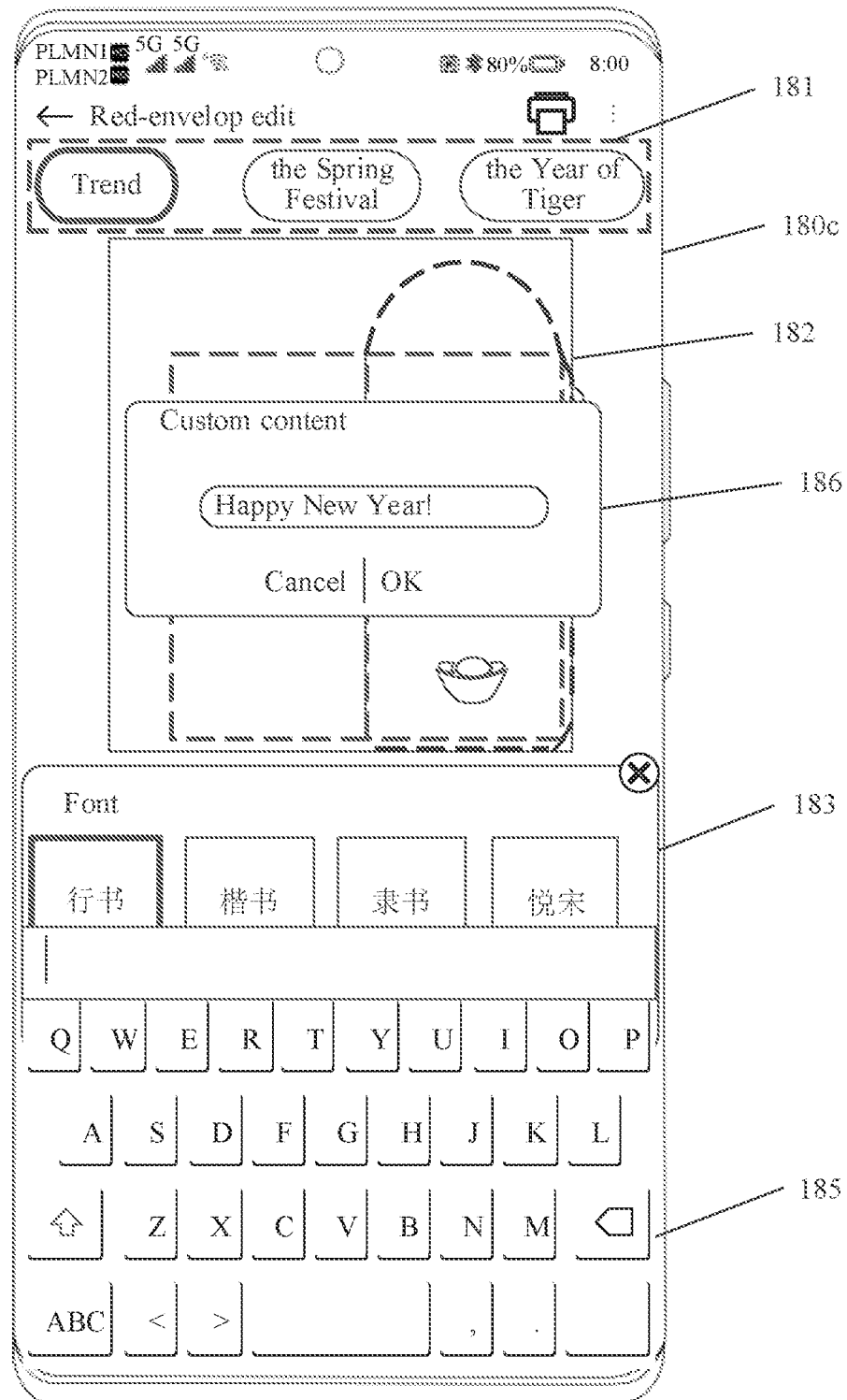
FIG. 18c is a schematic diagram of a graphical user interface of a sixty-seventh electronic device according to an embodiment of this application.

The user may add text to the red envelope. The user may enter an interface 180*b* shown in FIG. 18*b* by clicking a "text" control in the second control area 183 of the interface 180*a*. A text input box 184 is displayed on the interface 180*b*, the user clicks the text input box 184, and the electronic device displays an interface 180*c* as shown in FIG. 18*c*. A text input box 186, a virtual keyboard 185, and a second control area 183 are displayed in the interface 180*c*. The user selects the font as "cursive script" in the second control area 183, and enters "Happy New Year!" in the text input box 186 through the virtual keyboard 185. After the user clicks the OK control, the entered text "Happy New Year!" is displayed in the preview area 182 in the font of cursive script. The user may move a position of the text input box 186 or move a position of the entered text.

Figure 18D:
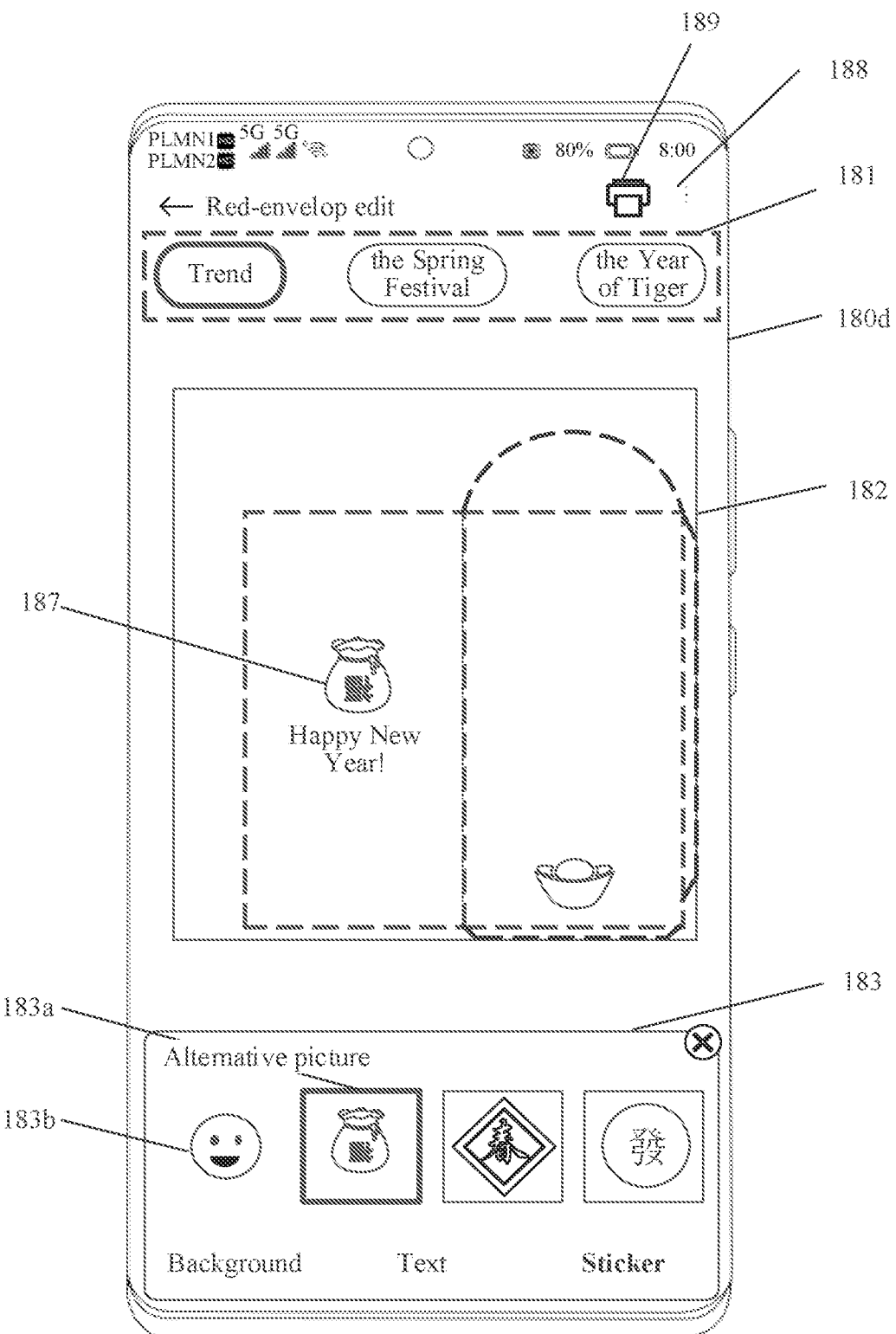
FIG. 18d is a schematic diagram of a graphical user interface of a sixty-eighth electronic device according to an embodiment of this application.

The user may also add a sticker to the red envelope. The user may enter an interface 180*d* shown in FIG. 18*d* by clicking a "sticker" control in the second control area 183 of the interface 180*a*. An alternative picture that may be used as a sticker is displayed in the interface 180*d*. In the example, the user selects a sticker 183*a*, and a sticker 187 is displayed in the preview area 182. The user may also move a position of the sticker 187 in the preview area 182. The user may also click the control 183*b*, and in response to the user's operation of clicking the control 183*b*, clear the sticker in the preview area 182.

Figure 18E:
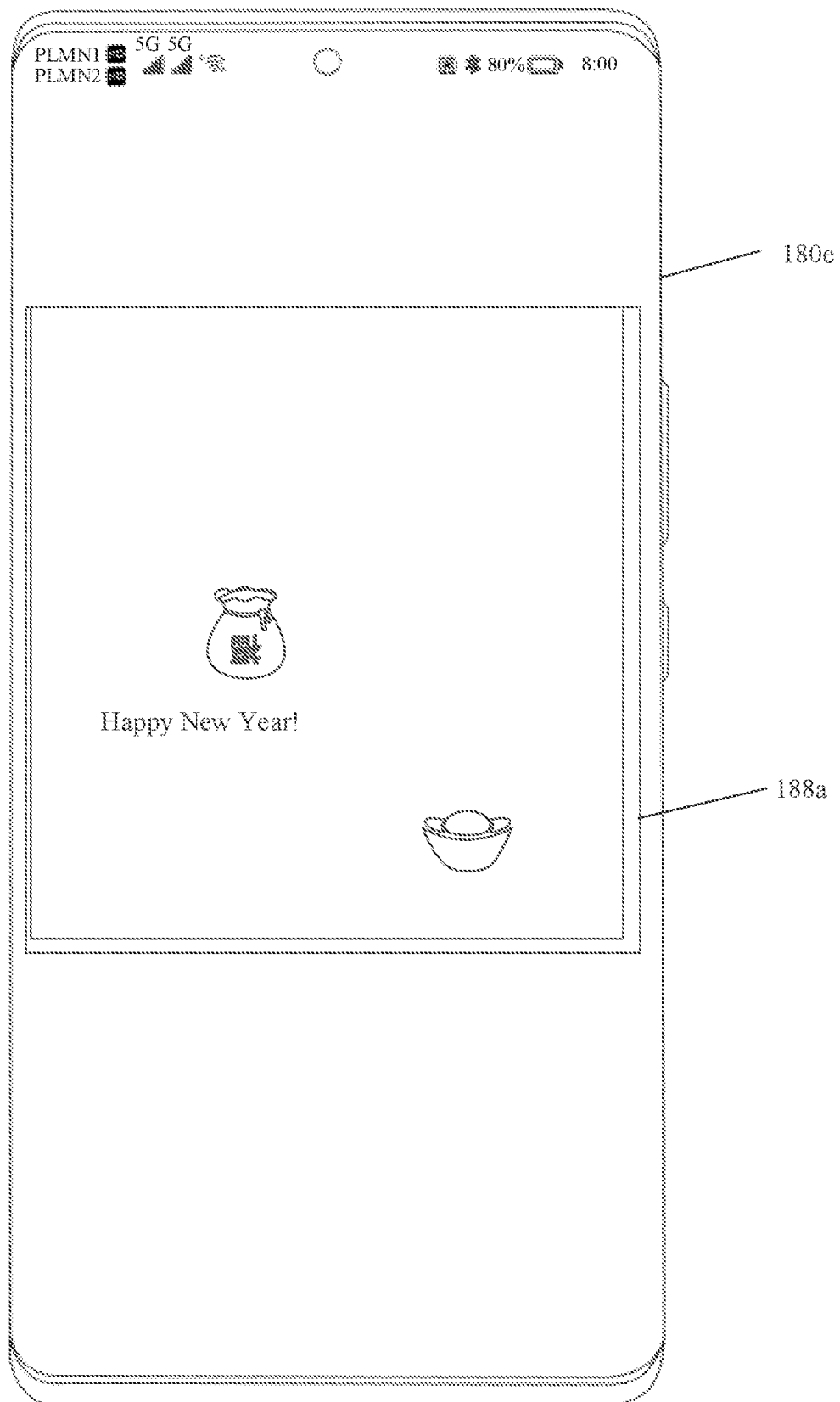
FIG. 18e is a schematic diagram of a graphical user interface of a sixty-ninth electronic device according to an embodiment of this application.

Still in the interface 180*d*, the user clicks a control 188, and a "preview" option and a "save" option may pop up. The user clicks the "save" option, and the currently edited red envelope may be saved in the album as an image. The user clicks the "preview" option to enter an interface 180*e* as shown in FIG. 18*e*. A preview effect 188*a* of the printed red envelope is displayed in the interface 180*e*. In the preview effect 188*a*, dotted lines in the preview area 182 may also be displayed to facilitate cropping and folding by the user. Double-sided printing is also possible, the front is as shown in the preview effect 188*a*, and the dotted lines in the preview area 182 are printed on the back.

Figure 18F:
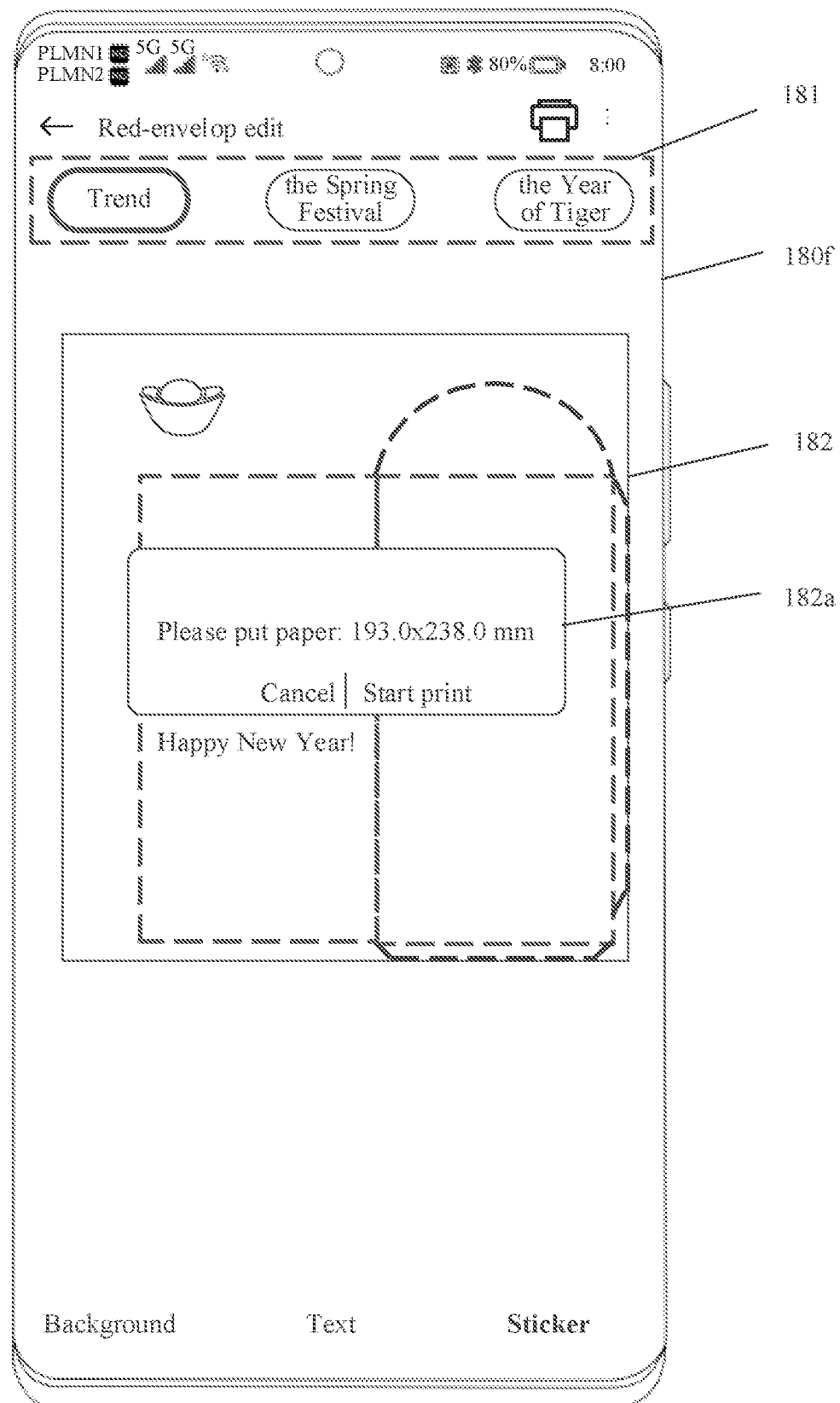
FIG. 18f is a schematic diagram of a graphical user interface of a seventieth electronic device according to an embodiment of this application.

Still in the interface 180*d*, the user clicks a control 189, and the electronic device enters an interface 180*f* as shown in FIG. 18*f*. In the interface 180*f*, prompt information 182*a* is displayed to prompt the user a paper size required to print the red envelope. The user chooses to start printing after preparing the paper size, the electronic device sends a printing instruction to the printing device, and the printing device prints the red envelop.

Figure 19:
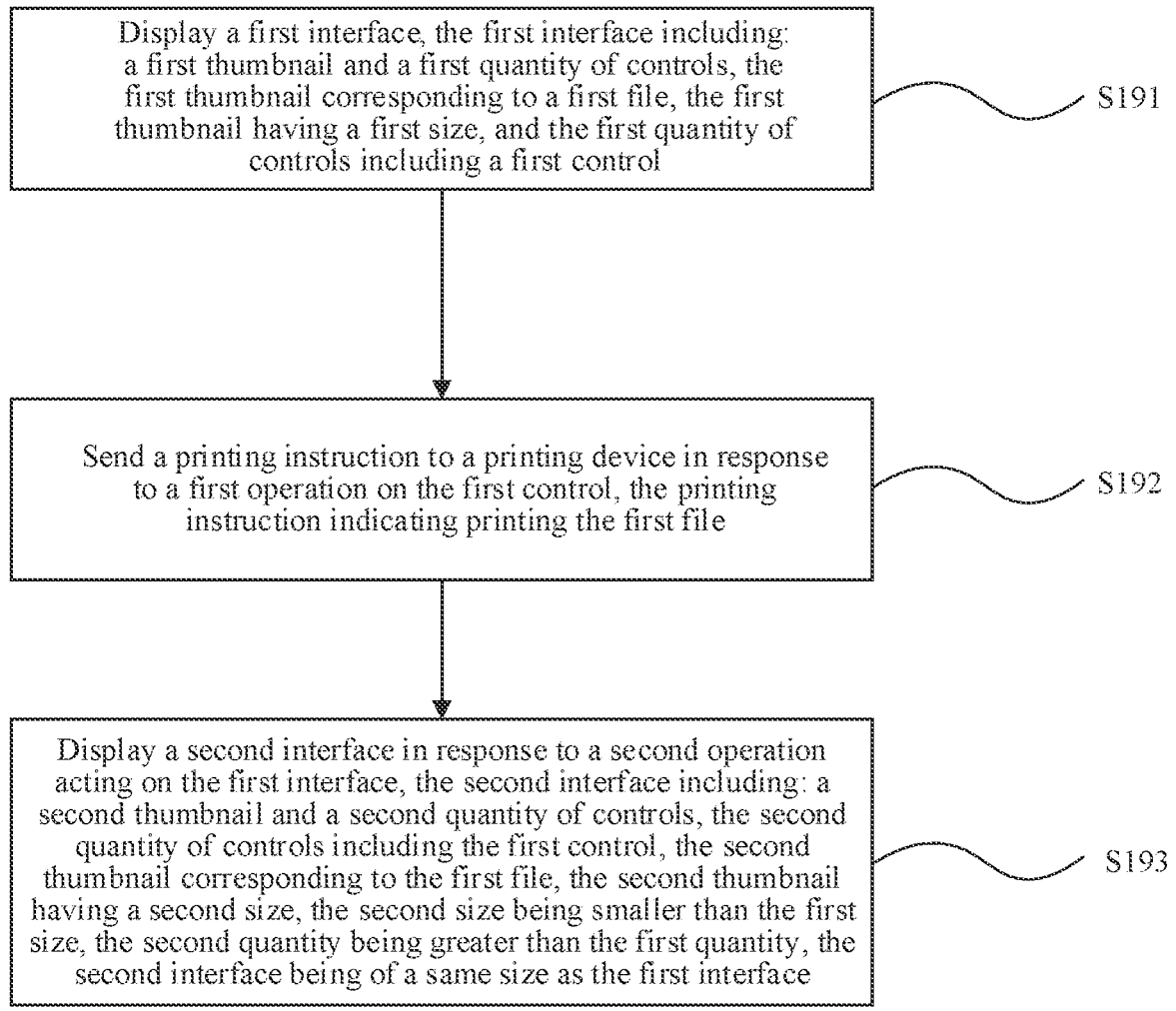
FIG. 19 is a flowchart of an electronic device control method according to an embodiment of this application.

FIG. 19 is a flowchart of a printing method according to an embodiment of this application. The method is applicable to the electronic device shown in FIG. 1. As shown in FIG. 19, the method mainly includes the following steps.

S191: Display a first interface, the first interface including: a first thumbnail and a first quantity of controls, the first thumbnail corresponding to a first file, the first thumbnail having a first size, and the first quantity of controls including a first control.

The first interface may be the interface 40*a* as shown in FIG. 4*a*. The first thumbnail may be a first preview object 411 and an incompletely displayed second preview object 412. The first quantity of controls may include: a start print control 421, a printer selection control 422, a copies selection control 423, and a range selection control 424. The first control may be the start print control 421.

S192: Send a printing instruction to a printing device in response to a first operation on the first control, the printing instruction indicating printing the first file.

The first operation may be an operation in which the user clicks the start print control 421, the user clicks the start print control 421, the electronic device sends an instruction to the printing device, and the printing device performs the printing task.

S193: Display a second interface in response to a second operation acting on the first interface, the second interface including: a second thumbnail and a second quantity of controls, the second quantity of controls including the first control, the second thumbnail corresponding to the first file, the second thumbnail having a second size, the second size being smaller than the first size, the second quantity being greater than the first quantity, the second interface being of a same size as the first interface.

Figure 4B:
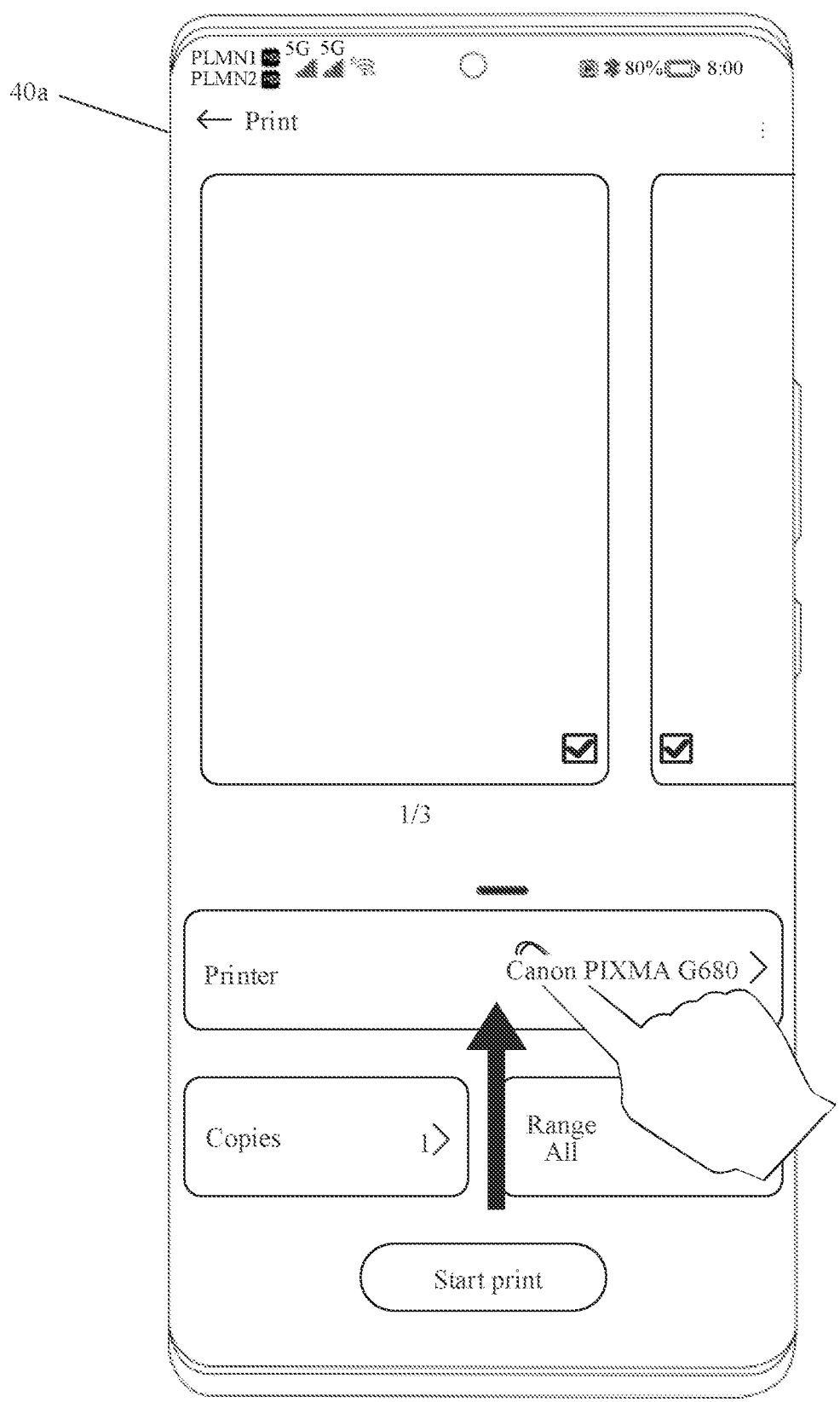
FIG. 4b is a schematic diagram of a graphical user interface of a sixth electronic device according to an embodiment of this application.
Figure 4C:
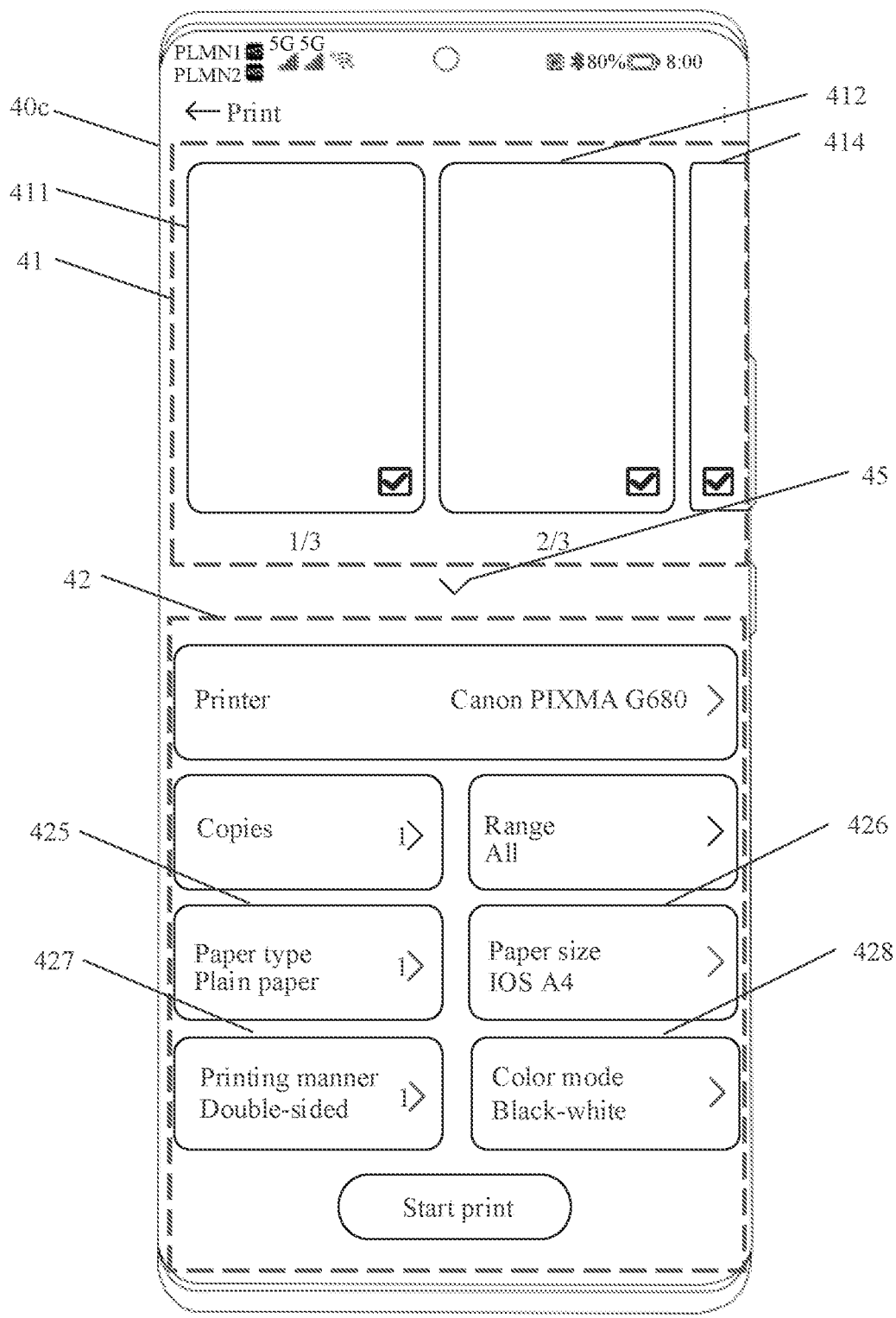
FIG. 4c is a schematic diagram of a graphical user interface of a seventh electronic device according to an embodiment of this application.
Figure 4D:
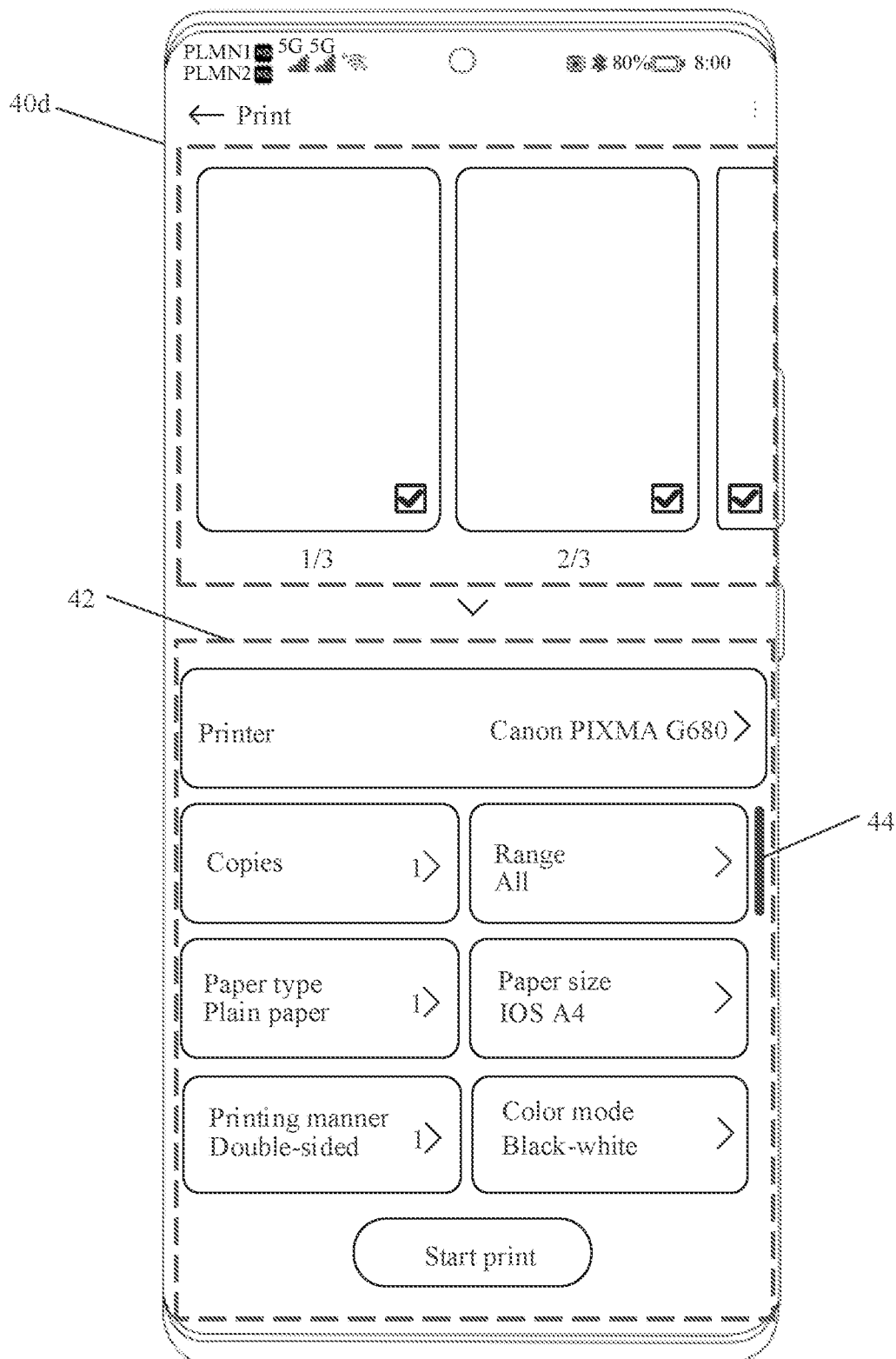
FIG. 4d is a schematic diagram of a graphical user interface of an eighth electronic device according to an embodiment of this application.
Figure 4E:
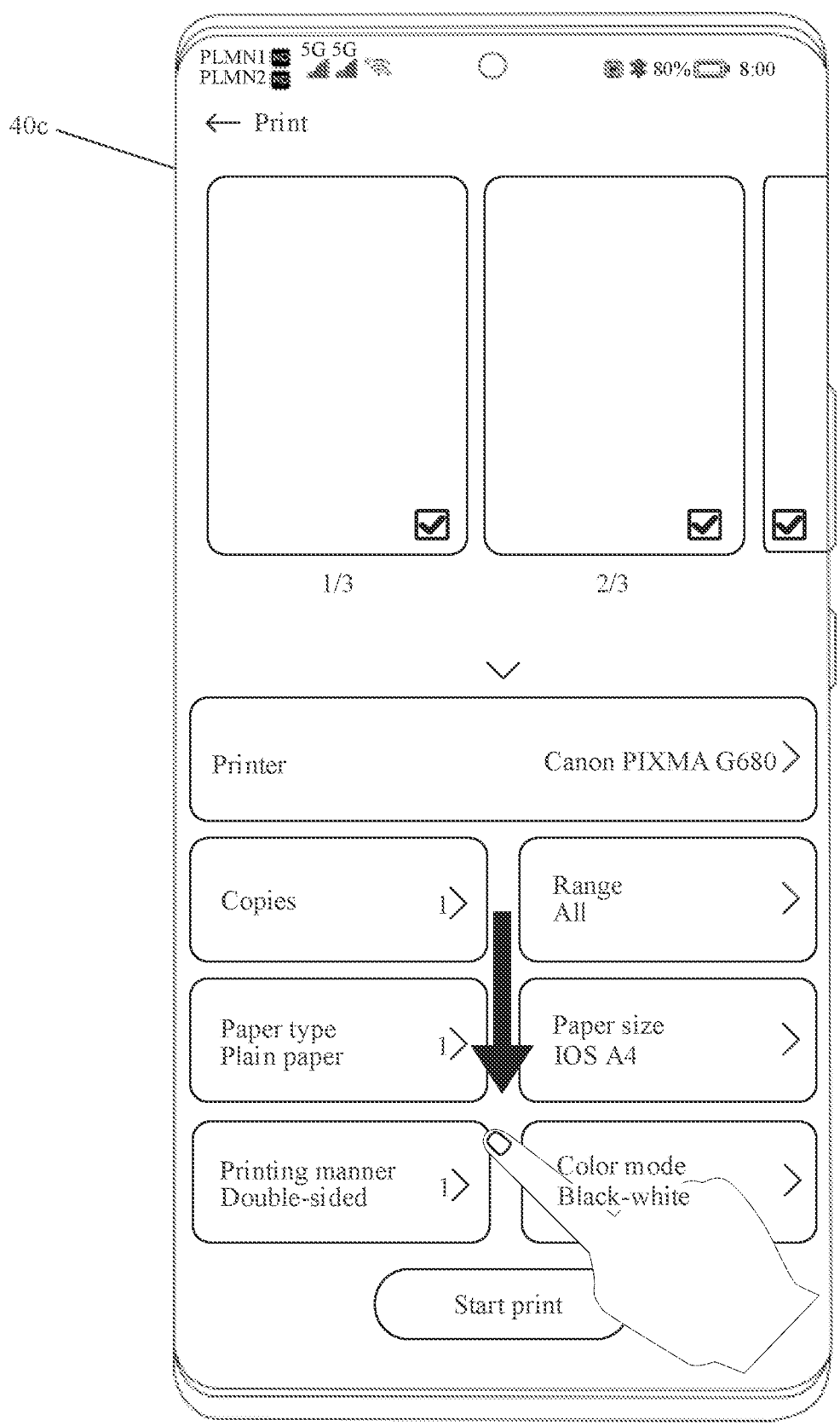
FIG. 4e is a schematic diagram of a graphical user interface of a ninth electronic device according to an embodiment of this application.

In the interface 40*b* as shown in FIG. 4*b*, the above second operation may be a swipe-up operation in the interface 40*b*. The second interface may be shown in the interface 40*c* as shown in FIG. 4*c*. The second thumbnail may be a complete first preview object 411, a complete second preview object 412, and an incomplete third preview object 414 in the interface 40*c*. The second quantity of controls include: a start print control 421, a printer selection control 422, a copies selection control 423, a range selection control 424, a paper type selection control 425, a paper size selection control 426, a printing manner selection control 427, and a color mode selection control 428.

As can be seen, in the above embodiment, the user performs a second operation on the first interface, so that more controls are displayed in the second interface than in the first interface, so as to provide more control items for the user. In addition, the first thumbnail is reduced to the second thumbnail, preventing occlusion of the thumbnail by the control, which is convenient for the user to view and improves user experience.

In an implementation, the displaying a second interface in response to a second operation acting on the first interface includes: reducing, in response to the second operation acting on the first interface, the first thumbnail from the first size to the second size to obtain the second thumbnail; and the first quantity of controls move according to the second operation, and a third quantity of controls are added to the second interface to obtain the second quantity of controls, where a sum of the first quantity and the third quantity is the second quantity.

Referring to FIG. 4*a*, FIG. 4*b*, and FIG. 4*c*, the user drags out more controls through a swipe-up operation, and the preview area 41 and the preview object in the preview area 41 are also adaptively reduced, thereby preventing occlusion of the preview object by the controls. The third quantity of controls may include: a paper type selection control 425, a paper size selection control 426, a printing manner selection control 427, and a color mode selection control 428.

In an implementation, the first thumbnail is located on an upper side of the first quantity of controls, and the second operation is a swipe-up operation.

In an implementation, after the displaying a second interface in response to a second operation acting on the first interface, the first interface is displayed in response to a third operation acting on the second interface.

As shown in FIG. 4*e*, the user swipes down in the second interface, some controls are retracted, and the preview area 41 and the preview area 41 are both enlarged and restored to the interface 40*a* as shown in FIG. 4*a*.

In an implementation, the first quantity of controls further include a second control, a third control, and a fourth control, and a third interface is displayed in response to a fourth operation acting on the second control, the third interface including: an option of a printing device; a fourth interface is displayed in response to a fifth operation acting on the third control, the fourth interface including: an option of print copies; and a fifth interface is displayed in response to a sixth operation acting on the fourth control, the fifth interface including: an option of a printing range; where the sending a printing instruction to a printing device in response to a first operation on the first control includes: sending, in response to the first operation on the first control, a printing instruction carrying a first printing parameter to a printing device selected in the third interface, the first printing parameter including print copies selected in the fourth interface and a printing range selected in the fifth interface.

The second control may be the printer selection control 422. The third control may be the copies selection control 423, and the fourth interface may be shown in FIG. 5*a*. The fourth control may be the range selection control 424, and the fifth interface may be shown in FIG. 5*d* or FIG. 5*e*.

In an implementation, the second quantity of controls further include a fifth control, a sixth control, a seventh control, and an eighth control, and a sixth interface is displayed in response to a seventh operation acting on the fifth control, the sixth interface including: an option of a paper type; a seventh interface is displayed in response to an eighth operation acting on the sixth control, the seventh interface including: an option of a paper size; an eighth interface is displayed in response to a ninth operation acting on the seventh control, the eighth interface including: an option of a printing manner, the printing manner including: double-sided printing and single-sided printing; and a ninth interface is displayed in response to a tenth operation acting on the eighth control, the ninth interface including: an option of a color mode, the option of the color mode including: a black-white mode and a colored mode; where the sending a printing instruction to a printing device in response to a first operation on the first control includes: sending, in response to the first operation on the first control, a printing instruction carrying a second printing parameter to the printing device, the second printing parameter including: a paper type selected in the sixth interface, a paper type selected in the seventh interface, a printing manner selected in the eighth interface, and a color mode selected in the ninth interface.

The fifth control may be the paper type selection control 425, and the sixth interface may be shown in FIG. 5*b*. The sixth control may be the paper size selection control 426, and the seventh interface may be shown in FIG. 5*f*. The seventh control may be the printing manner selection control 427, and the eighth interface may be shown in FIG. 5*c*. The eighth control may be the color mode selection control 428, and the ninth interface may be shown in FIG. 5*e*.

In an implementation, the first quantity of controls further include a ninth control, the ninth control corresponds to a background image, an icon of the ninth control is displayed as a third thumbnail of the corresponding background image, in response to an eleventh operation on the ninth control, the first thumbnail is displayed on a background image selected by the eleventh operation, and the background image selected by the eleventh operation is the background image corresponding to the ninth control selected by the eleventh operation.

In the example, the first interface may be shown in FIG. 6*b*. The first control may be the start print control. The ninth control may be a background selection control in the background selection area 63. Each background selection control corresponds to an optional background image. An icon of each background selection control is a thumbnail of the background image corresponding thereto, that is, the third thumbnail. In the example of FIG. 6*b*, the user selects a background 631, and the first preview object 411 is displayed over the background 631. The second interface may be shown in FIG. 6*c*.

In an implementation, the second quantity of controls further include a tenth control, the tenth control corresponds to a position relationship between the first thumbnail and the background image, an icon of the tenth control is a schematic diagram of the corresponding position relationship, in response to a twelfth operation on the tenth control and according to a position relationship selected by the twelfth operation, the first thumbnail is displayed on the background image selected by the eleventh operation, and the position relationship selected by the twelfth operation is the position relationship corresponding to the tenth control selected by the twelfth operation.

Referring to FIG. 6*c*, the second quantity of controls may include controls in the background selection area 63 and the position selection area 65. The tenth control may be a position selection control in the position selection area 65. Each position selection control corresponds to a position relationship (the position relationship is used for representing a position relationship between the first thumbnail and a background thereof), and the icon of each position selection control is a schematic diagram of the position relationship corresponding thereto. In the schematic diagram of FIG. 6*c*, the user clicks the center option 651, and the first preview object is centered and displayed on the selected background 631.

In an implementation, the first thumbnail is located on an upper side of the first quantity of controls, and a tenth interface is displayed in response to a thirteenth operation acting on the first interface. The tenth interface includes the first thumbnail and a fourth quantity of controls. The first thumbnail has the first size, and the fourth quantity of controls are located on an upper side of the first thumbnail.

In FIG. 6*b*, the user causes, through a swipe-down operation, the electronic device to display the third interface as shown in FIG. 6*a*. In the third interface, the fourth quantity of controls may include the control in the control area 61.

In an implementation, the thirteenth operation is a swipe-down operation.

An embodiment of this application further provides an electronic device, including a memory configured to store a computer program instruction and a processor configured to execute the program instruction. When the computer program instruction is executed by the processor, the electronic device is triggered to perform the above related method steps to implement the method in the foregoing embodiments.

An embodiment of this application further provides a computer-readable storage medium. The computer-readable storage medium stores a computer instruction, and the computer instruction, when running on a terminal device, causes the terminal device to perform the related method steps, to implement the method in the foregoing embodiments.

An embodiment of this application further provides a computer storage medium. The computer storage medium stores a computer instruction, and the computer instruction, when running on a terminal device, causes the terminal device to perform the related method steps to implement the method in the foregoing embodiments.

An embodiment of this application further provides a computer program product. When the computer program product runs on a computer, a computer is enabled to perform the related steps to implement the method in the foregoing embodiments.

In addition, an embodiment of this application further provides an apparatus. The apparatus may be specifically a chip, a component, or a module. The apparatus may include a processor and a memory that are connected. The memory is configured to store computer-executable instructions. When the apparatus runs, the processor may execute the computer-executable instructions stored in the memory, to cause the chip to perform the method in the foregoing method embodiments.

The electronic device, the computer storage medium, the computer program product, or the chip provided in the embodiments of this application may be configured to perform the corresponding method provided above. Therefore, for beneficial effects that can be achieved, refer to the beneficial effects of the corresponding method provided above. Details are not described herein again.

Based on the foregoing descriptions of the implementations, a person skilled in the art may understand that, for the purpose of convenient and brief description, division of the foregoing functional modules is taken as an example for illustration. In actual application, the foregoing functions may be allocated to different functional modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely exemplary. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed in multiple different places. Some or all of the units may be selected according to actual needs to achieve the objectives of the solutions of the embodiments.

In addition, functional units in the embodiments of this application may be integrated into one processing unit, or each of the units may be physically separated, or two or more units may be integrated into one unit. The integrated unit may be implemented in the form of hardware, or may be implemented in a form of a software functional unit.

If the integrated unit is implemented in the form of a software functional unit and sold or used as an independent product, the integrated unit may be stored in a readable storage medium. Based on such understanding, the technical solutions in the embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in the embodiments of the present disclosure. The foregoing storage medium includes: any medium that may store program code, such as a USB flash drive, a removable hard disk, a read only memory (ROM), a random access memory (RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device, comprising:
   one or more processors; and
   a memory coupled to the one or more processors, wherein the memory is configured to store instructions that, when executed by the one or more processors, cause the electronic device to:
      display a first interface, the first interface comprising a first thumbnail and a first quantity of controls, the first thumbnail corresponding to a first file, the first thumbnail having a first size, and the first quantity of controls comprising a first control;
      send a printing instruction to a printing device in response to a first operation on the first control, the printing instruction indicating printing the first file; and
      display a second interface in response to a second operation acting on the first interface, the second interface comprising a second thumbnail and a second quantity of controls, the second quantity of controls comprising the first control, the second thumbnail corresponding to the first file, the second thumbnail having a second size, the second size being smaller than the first size, the second quantity being greater than the first quantity, the second interface being of a same size as the first interface;
   wherein the first quantity of controls further comprises a ninth control, wherein the ninth control corresponds to a background image, wherein an icon of the ninth control is displayed as a third thumbnail of the corresponding background image, and the instructions, when executed by the one or more processors, further cause the electronic device to:
      display, in response to an eleventh operation on the ninth control, the first thumbnail on a background image selected by the eleventh operation, the background image selected by the eleventh operation being the background image corresponding to the ninth control selected by the eleventh operation.

2. The electronic device according to claim 1, wherein the instructions, when executed by the one or more processors, further cause the electronic device to be configured to:
   in response to the second operation acting on the first interface, reduce the first thumbnail from the first size to the second size to obtain the second thumbnail; and
   move the first quantity of controls according to the second operation, and add a third quantity of controls to the second interface to obtain the second quantity of controls, wherein a sum of the first quantity and the third quantity is the second quantity.

3. The electronic device according to claim 1, wherein the first thumbnail is located on an upper side of the first quantity of controls, and the second operation is a swipe-up operation.

4. The electronic device according to claim 1, wherein after the displaying the second interface in response to the second operation acting on the first interface, the instructions, when executed by the one or more processors, further cause the electronic device to be configured to:
   display the first interface in response to a third operation acting on the second interface.

5. The electronic device according to claim 1, wherein the first quantity of controls further comprises a second control, a third control, and a fourth control, and the instructions, when executed by the one or more processors, further cause the electronic device to be configured to:
   display a third interface in response to a fourth operation acting on the second control, the third interface comprising: an option of a printing device;

display a fourth interface in response to a fifth operation acting on the third control, the fourth interface comprising: an option of print copies;

display a fifth interface in response to a sixth operation acting on the fourth control, the fifth interface comprising: an option of a printing range; and in response to the first operation on the first control, send a printing instruction carrying a first printing parameter to a printing device selected in the third interface, the first printing parameter comprising print copies selected in the fourth interface and a printing range selected in the fifth interface.

6. The electronic device according to claim 5, wherein the second quantity of controls further comprises a fifth control, a sixth control, a seventh control, and an eighth control, and the instructions, when executed by the one or more processors, further cause the electronic device to be configured to:

display a sixth interface in response to a seventh operation acting on the fifth control, the sixth interface comprising: an option of a paper type;

display a seventh interface in response to an eighth operation acting on the sixth control, the seventh interface comprising: an option of a paper size;

display an eighth interface in response to a ninth operation acting on the seventh control, the eighth interface comprising: an option of a printing manner, the printing manner comprising: double-sided printing and single-sided printing;

display a ninth interface in response to a tenth operation acting on the eighth control, the ninth interface comprising: an option of a color mode, the option of the color mode comprising: a black-white mode and a colored mode; and in response to the first operation on the first control, send a printing instruction carrying a second printing parameter to the printing device, the second printing parameter comprising: a paper type selected in the sixth interface, a paper type selected in the seventh interface, a printing manner selected in the eighth interface, and a color mode selected in the ninth interface.

7. The electronic device according to claim 1, wherein the second quantity of controls further comprises a tenth control, wherein the tenth control corresponds to a position relationship between the first thumbnail and the background image, wherein an icon of the tenth control is a schematic diagram of the corresponding position relationship, and the instructions, when executed by the one or more processors, further cause the electronic device to be configured to:

display, in response to a twelfth operation on the tenth control and according to a position relationship selected by the twelfth operation, the first thumbnail on the background image selected by the eleventh operation, the position relationship selected by the twelfth operation being the position relationship corresponding to the tenth control selected by the twelfth operation.

8. The electronic device according to claim 1, wherein the first thumbnail is located on an upper side of the first quantity of controls, and the instructions, when executed by the one or more processors, further cause the electronic device to be configured to:

display a tenth interface in response to a thirteenth operation acting on the first interface, the tenth interface comprising the first thumbnail and a fourth quantity of controls, wherein the first thumbnail has the first size, and the fourth quantity of controls are located on an upper side of the first thumbnail.

9. The electronic device according to claim 8, wherein the thirteenth operation is a swipe-down operation.

10. An electronic device control method, the method comprising:

displaying a first interface, the first interface comprising a first thumbnail and a first quantity of controls, the first thumbnail corresponding to a first file, the first thumbnail having a first size, and the first quantity of controls comprising a first control;

sending a printing instruction to a printing device in response to a first operation on the first control, the printing instruction indicating printing the first file; and displaying a second interface in response to a second operation acting on the first interface, the second interface comprising a second thumbnail and a second quantity of controls, the second quantity of controls comprising the first control, the second thumbnail corresponding to the first file, the second thumbnail having a second size, the second size being smaller than the first size, the second quantity being greater than the first quantity, and the second interface being of a same size as the first interface;

wherein the first quantity of controls further comprises a ninth control, wherein the ninth control corresponds to a background image, wherein an icon of the ninth control is displayed as a third thumbnail of the corresponding background image, and method further comprises:

displaying, in response to an eleventh operation on the ninth control, the first thumbnail on a background image selected by the eleventh operation, the background image selected by the eleventh operation being the background image corresponding to the ninth control selected by the eleventh operation.

11. The method according to claim 10, wherein the second quantity of controls further comprises a tenth control, wherein the tenth control corresponds to a position relationship between the first thumbnail and the background image, wherein an icon of the tenth control is a schematic diagram of the corresponding position relationship, and the method further comprises:

displaying, in response to a twelfth operation on the tenth control and according to a position relationship selected by the twelfth operation, the first thumbnail on the background image selected by the eleventh operation, the position relationship selected by the twelfth operation being the position relationship corresponding to the tenth control selected by the twelfth operation.

12. The method according to claim 10, wherein the first thumbnail is located on an upper side of the first quantity of controls, and the method further comprises:

displaying a tenth interface in response to a thirteenth operation acting on the first interface, the tenth interface comprising the first thumbnail and a fourth quantity of controls, wherein the first thumbnail has the first size, and the fourth quantity of controls are located on an upper side of the first thumbnail.

13. The method according to claim 12, wherein the thirteenth operation is a swipe-down operation.

14. A non-transitory computer-readable storage medium storing a program, wherein, when the program is executed, a computing device is controlled to perform operations comprising:

displaying a first interface, the first interface comprising a first thumbnail and a first quantity of controls, the first thumbnail corresponding to a first file, the first thumbnail having a first size, and the first quantity of controls comprising a first control;

sending a printing instruction to a printing device in response to a first operation on the first control, the printing instruction indicating printing the first file; and displaying a second interface in response to a second operation acting on the first interface, the second interface comprising a second thumbnail and a second quantity of controls, the second quantity of controls comprising the first control, the second thumbnail corresponding to the first file, the second thumbnail having a second size, the second size being smaller than the first size, the second quantity being greater than the first quantity, and the second interface being of a same size as the first interface;

wherein the first quantity of controls further comprises a ninth control, wherein the ninth control corresponds to a background image, wherein an icon of the ninth control is displayed as a third thumbnail of the corresponding background image, and wherein, when the program is executed, the computing device is controlled to perform operations comprising:

displaying, in response to an eleventh operation on the ninth control, the first thumbnail on a background image selected by the eleventh operation, the background image selected by the eleventh operation being the background image corresponding to the ninth control selected by the eleventh operation.

15. The computer-readable storage medium according to claim 14, wherein the second quantity of controls further comprises a tenth control, wherein the tenth control corresponds to a position relationship between the first thumbnail and the background image, wherein an icon of the tenth control is a schematic diagram of the corresponding position relationship, and wherein, when the program is executed, the computing device is controlled to perform operations comprising:

displaying, in response to a twelfth operation on the tenth control and according to a position relationship selected by the twelfth operation, the first thumbnail on the background image selected by the eleventh operation, the position relationship selected by the twelfth operation being the position relationship corresponding to the tenth control selected by the twelfth operation.

16. The computer-readable storage medium according to claim 14, wherein the first thumbnail is located on an upper side of the first quantity of controls, and wherein, when the program is executed, the computing device is controlled to perform operations comprising:

displaying a tenth interface in response to a thirteenth operation acting on the first interface, the tenth interface comprising the first thumbnail and a fourth quantity of controls, wherein the first thumbnail has the first size, and the fourth quantity of controls are located on an upper side of the first thumbnail.

17. The computer-readable storage medium according to claim 16, wherein the thirteenth operation is a swipe-down operation.

* * * * *